US012629888B2

(12) United States Patent
Yang et al.

(10) Patent No.: US 12,629,888 B2
(45) Date of Patent: May 19, 2026

(54) SYSTEMS AND METHODS FOR ADDITIVE MANUFACTURING

(71) Applicant: General Electric Company, Schenectady, NY (US)

(72) Inventors: Xi Yang, Mason, OH (US); Meredith Elissa Dubelman, Liberty Township, OH (US); Christopher David Barnhill, Cincinnati, OH (US); William Joseph Steele, Lawrenceburg, IN (US); Mary Kathryn Thompson, Fairfield Township, OH (US)

(73) Assignee: General Electric Company, Evendale, OH (US)

( * ) Notice: Subject to any disclaimer, the term of this patent is extended or adjusted under 35 U.S.C. 154(b) by 148 days.

(21) Appl. No.: 18/343,284

(22) Filed: Jun. 28, 2023

(65) Prior Publication Data

US 2024/0033992 A1     Feb. 1, 2024

Related U.S. Application Data

(60) Provisional application No. 63/393,023, filed on Jul. 28, 2022.

(51) Int. Cl.
*B29C 64/209*          (2017.01)
*B29C 64/124*          (2017.01)
(Continued)

(52) U.S. Cl.
CPC .......... *B29C 64/245* (2017.08); *B29C 64/124* (2017.08); *B29C 64/264* (2017.08);
(Continued)

(58) Field of Classification Search
CPC .......... B29C 2033/0005; B29C 64/124; B29C 64/209; B29C 64/232; B29C 64/236;
(Continued)

(56) References Cited

U.S. PATENT DOCUMENTS

| | | | |
|---|---|---|---|
| 1,990,749 A | 2/1935 | Phillips et al. | |
| 2,259,517 A | 10/1941 | Drenkard, Jr. | |

(Continued)

FOREIGN PATENT DOCUMENTS

| | | |
|---|---|---|
| CN | 103522546 A | 1/2014 |
| CN | 104175559 A | 12/2014 |

(Continued)

OTHER PUBLICATIONS

Admatec, Admaflex 300 DLP 3D Printer, Specifications, Features, Design and Functions, Netherlands, 2 Pages. Retrieved Nov. 5, 2020 from Webpage: https://admateceurope.com/files/10fla369c2239943 e6506f27ba920bd4dd9359078e744369695ab6ffbde75c6c?filename= Admaflex%20300%20brochure.pdf&sig=hQvDlzxkSmFOZwiM.

(Continued)

*Primary Examiner* — Leo B Tentoni
(74) *Attorney, Agent, or Firm* — Dinsmore & Shohl LLP

(57) ABSTRACT

An additive manufacturing apparatus includes a support plate including a window. A stage is configured to hold one or more cured layers of the resin to form a component. A radiant energy device positioned on an opposite side of the support plate from the stage and operable to generate and project radiant energy in a patterned image through the window. An actuator is operably coupled with the stage and is configured to move the stage between a curing position and a removal position. The curing position can be offset from the removal position.

18 Claims, 23 Drawing Sheets

(51) Int. Cl.

| | |
|---|---|
| *B29C 64/232* | (2017.01) |
| *B29C 64/236* | (2017.01) |
| *B29C 64/245* | (2017.01) |
| *B29C 64/264* | (2017.01) |
| *B29C 64/30* | (2017.01) |
| *B33Y 40/20* | (2020.01) |
| *B29C 33/00* | (2006.01) |
| *B33Y 10/00* | (2015.01) |
| *B33Y 30/00* | (2015.01) |
| *B33Y 40/00* | (2020.01) |

(52) U.S. Cl.
    CPC ...... *B29C 64/30* (2017.08); *B29C 2033/0005*
        (2013.01); *B33Y 10/00* (2014.12); *B33Y 30/00*
                (2014.12); *B33Y 40/00* (2014.12)

(58) Field of Classification Search
    CPC ..... B29C 64/245; B29C 64/264; B29C 64/30;
            B33Y 10/00; B33Y 30/00; B33Y 40/20
    USPC ....................... 264/401; 425/174.4, 215, 470
    See application file for complete search history.

(56)                    References Cited

U.S. PATENT DOCUMENTS

| | | | |
|---|---|---|---|
| 3,264,103 A | 8/1966 | Cohen et al. |
| 3,395,014 A | 7/1968 | Cohen et al. |
| 3,486,482 A | 12/1969 | Hunger |
| 3,710,846 A | 1/1973 | Properzi |
| 3,875,067 A | 4/1975 | DeSorgo et al. |
| 3,991,149 A | 11/1976 | Hurwitt |
| 4,041,476 A | 8/1977 | Swainson |
| 4,292,827 A | 10/1981 | Waugh |
| 4,575,330 A | 3/1986 | Hull |
| 4,752,498 A | 6/1988 | Fudim |
| 4,945,032 A | 7/1990 | Murphy et al. |
| 5,015,312 A | 5/1991 | Kinzie |
| 5,026,146 A | 6/1991 | Hug et al. |
| 5,031,120 A | 7/1991 | Pomerantz et al. |
| 5,058,988 A | 10/1991 | Spence et al. |
| 5,059,021 A | 10/1991 | Spence et al. |
| 5,088,047 A | 2/1992 | Bynum |
| 5,094,935 A | 3/1992 | Vassiliou et al. |
| 5,096,530 A | 3/1992 | Cohen |
| 5,104,592 A | 4/1992 | Hull et al. |
| 5,123,734 A | 6/1992 | Spence et al. |
| 5,126,259 A | 6/1992 | Weiss et al. |
| 5,126,529 A | 6/1992 | Weiss et al. |
| 5,133,987 A | 7/1992 | Spence et al. |
| 5,162,167 A | 11/1992 | Minh et al. |
| 5,174,931 A | 12/1992 | Almquist et al. |
| 5,175,077 A | 12/1992 | Grossa |
| 5,182,055 A | 1/1993 | Allison et al. |
| 5,183,598 A | 2/1993 | Helle et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,236,326 A | 8/1993 | Grossa |
| 5,236,637 A | 8/1993 | Hull |
| 5,236,812 A | 8/1993 | Vassiliou et al. |
| 5,247,180 A | 9/1993 | Mitcham et al. |
| 5,248,456 A | 9/1993 | Evans, Jr. et al. |
| 5,258,146 A | 11/1993 | Almquist et al. |
| 5,314,711 A | 5/1994 | Baccini |
| 5,340,656 A | 8/1994 | Sachs et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,460,758 A | 10/1995 | Langer et al. |
| 5,496,682 A | 3/1996 | Quadir et al. |
| 5,607,540 A | 3/1997 | Onishi |
| 5,610,824 A | 3/1997 | Vinson et al. |

| | | | |
|---|---|---|---|
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,688,464 A | 11/1997 | Jacobs et al. |
| 5,693,144 A | 12/1997 | Jacobs et al. |
| 5,697,043 A | 12/1997 | Baskaran et al. |
| 5,717,599 A | 2/1998 | Menhennett et al. |
| 5,718,279 A | 2/1998 | Saoth et al. |
| 5,746,833 A | 5/1998 | Gerhardt |
| 5,764,521 A | 6/1998 | Batchelder et al. |
| 5,807,437 A | 9/1998 | Sachs et al. |
| 5,824,184 A | 10/1998 | Kamijo et al. |
| 5,851,465 A | 12/1998 | Bredt |
| 5,866,058 A | 2/1999 | Batchelder et al. |
| 5,895,547 A | 4/1999 | Kathrein et al. |
| 5,900,207 A | 5/1999 | Danforth et al. |
| 5,939,008 A | 8/1999 | Comb et al. |
| 5,940,674 A | 8/1999 | Sachs et al. |
| 5,945,058 A | 8/1999 | Manners et al. |
| 5,968,561 A | 10/1999 | Batchelder et al. |
| 5,980,813 A | 11/1999 | Narang et al. |
| 5,985,204 A | 11/1999 | Otsuka et al. |
| 6,051,179 A | 4/2000 | Hagenau |
| 6,067,480 A | 5/2000 | Stuffle et al. |
| 6,068,367 A | 5/2000 | Fabbri |
| 6,110,411 A | 8/2000 | Clausen et al. |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson et al. |
| 6,375,451 B1 | 4/2002 | Robinson et al. |
| 6,376,148 B1 | 4/2002 | Liu et al. |
| 6,391,245 B1 | 5/2002 | Smith |
| 6,399,010 B1 | 6/2002 | Guertin et al. |
| 6,401,002 B1 | 6/2002 | Jang et al. |
| 6,403,002 B1 | 6/2002 | van der Geest |
| 6,436,520 B1 | 8/2002 | Yamamoto |
| 6,450,393 B1 | 9/2002 | Doumanidis et al. |
| 6,463,349 B2 | 10/2002 | White et al. |
| 6,471,800 B2 | 10/2002 | Jang et al. |
| 6,500,378 B1 | 12/2002 | Smith |
| 6,512,869 B1 | 1/2003 | Imayama et al. |
| 6,543,506 B1 | 4/2003 | Phillips |
| 6,575,218 B1 | 6/2003 | Burns et al. |
| 6,596,224 B1 | 7/2003 | Sachs et al. |
| 6,641,897 B2 | 11/2003 | Gervasi |
| 6,649,113 B1 | 11/2003 | Manners et al. |
| 6,660,209 B2 | 12/2003 | Leyden et al. |
| 6,668,892 B2 | 12/2003 | Vasilakes et al. |
| 6,682,598 B1 | 1/2004 | Steinmueller et al. |
| 6,780,368 B2 | 8/2004 | Liu et al. |
| 6,786,711 B2 | 9/2004 | Koch et al. |
| 6,838,035 B1 | 1/2005 | Ederer et al. |
| 6,850,334 B1 | 2/2005 | Gothait |
| 6,852,272 B2 | 2/2005 | Artz et al. |
| 6,896,839 B2 | 5/2005 | Kubo et al. |
| 6,914,406 B1 | 7/2005 | Wilkes et al. |
| 6,930,144 B2 | 8/2005 | Oriakhi |
| 6,947,058 B1 | 9/2005 | Elmquist |
| 6,966,960 B2 | 11/2005 | Boyd et al. |
| 6,974,521 B2 | 12/2005 | Schermer |
| 6,986,654 B2 | 1/2006 | Imiolek et al. |
| 7,008,209 B2 | 3/2006 | Iskra et al. |
| 7,016,738 B1 | 3/2006 | Karunasiri |
| 7,022,207 B2 | 4/2006 | Hirsch |
| 7,045,738 B1 | 5/2006 | Kovacevic et al. |
| 7,052,263 B2 | 5/2006 | John |
| 7,070,250 B2 | 7/2006 | Lester et al. |
| 7,074,029 B2 | 7/2006 | Stockwell et al. |
| 7,084,875 B2 | 8/2006 | Plante |
| 7,087,109 B2 | 8/2006 | Bredr et al. |
| 7,158,849 B2 | 1/2007 | Huang et al. |
| 7,164,420 B2 | 1/2007 | Ard |
| 7,195,472 B2 | 3/2007 | John |
| 7,261,542 B2 | 8/2007 | Hickerson et al. |
| 7,270,528 B2 | 9/2007 | Sherwood |
| 7,300,613 B2 | 11/2007 | Sano et al. |

(56) References Cited

U.S. PATENT DOCUMENTS

| | | | |
|---|---|---|---|
| 7,351,304 B2 | 4/2008 | Liang et al. |
| 7,402,219 B2 | 7/2008 | Graf |
| 7,438,846 B2 | 10/2008 | John |
| 7,455,804 B2 | 11/2008 | Patel et al. |
| 7,520,740 B2 | 4/2009 | Wahlstrom et al. |
| 7,550,518 B2 | 6/2009 | Bredt et al. |
| 7,555,726 B2 | 6/2009 | Kurtenbach et al. |
| 7,569,174 B2 | 8/2009 | Ruatta et al. |
| 7,572,403 B2 | 8/2009 | Gu et al. |
| 7,575,682 B2 | 8/2009 | Olsta et al. |
| 7,578,958 B2 | 8/2009 | Patel et al. |
| 7,614,866 B2 | 11/2009 | Sperry et al. |
| 7,614,886 B2 | 11/2009 | Sperry et al. |
| 7,636,610 B2 | 12/2009 | Schillen et al. |
| 7,698,947 B2 | 4/2010 | Sarr |
| 7,706,910 B2 | 4/2010 | Hull et al. |
| 7,742,060 B2 | 6/2010 | Maillot |
| 7,758,799 B2 | 7/2010 | Hull et al. |
| 7,767,132 B2 | 8/2010 | Patel et al. |
| 7,771,183 B2 | 8/2010 | Hull et al. |
| 7,780,429 B2 | 8/2010 | Kikuchi |
| 7,783,371 B2 | 8/2010 | John et al. |
| 7,785,093 B2 | 8/2010 | Holmboe et al. |
| 7,790,093 B2 | 9/2010 | Shkolnik et al. |
| 7,795,349 B2 | 9/2010 | Bredt et al. |
| 7,815,826 B2 | 10/2010 | Serdy et al. |
| 7,845,930 B2 | 12/2010 | Shkolnik et al. |
| 7,867,302 B2 | 1/2011 | Nevoret et al. |
| 7,892,474 B2 | 2/2011 | Shkolnik et al. |
| 7,894,921 B2 | 2/2011 | John et al. |
| 7,931,460 B2 | 4/2011 | Scott et al. |
| 7,962,238 B2 | 6/2011 | Shkolnik et al. |
| 7,964,047 B2 | 6/2011 | Ishida |
| 7,995,073 B1 | 8/2011 | Shemanarev et al. |
| 8,003,040 B2 | 8/2011 | El-Siblani |
| 8,029,642 B2 | 10/2011 | Hagman |
| 8,048,261 B2 | 11/2011 | McCowin |
| 8,070,473 B2 | 12/2011 | Kozlak |
| 8,071,055 B2 | 12/2011 | Newcombe |
| 8,096,262 B2 | 1/2012 | Ederer et al. |
| 8,105,066 B2 | 1/2012 | Sperry et al. |
| 8,110,135 B2 | 2/2012 | El-Siblani |
| 8,126,580 B2 | 2/2012 | El-Siblani et al. |
| 8,157,908 B2 | 4/2012 | Williams |
| 8,185,229 B2 | 5/2012 | Davidson |
| 8,191,500 B2 | 6/2012 | Dohring et al. |
| 8,211,226 B2 | 7/2012 | Bredt et al. |
| 8,232,444 B2 | 7/2012 | Bar Nathan et al. |
| 8,259,103 B2 | 9/2012 | Glueck et al. |
| 8,269,767 B2 | 9/2012 | Glueck et al. |
| 8,282,866 B2 | 10/2012 | Hiraide |
| 8,326,024 B2 | 12/2012 | Shkolnik |
| 8,372,330 B2 | 2/2013 | El-Siblani et al. |
| 8,394,313 B2 | 3/2013 | El-Siblani et al. |
| 8,413,578 B2 | 4/2013 | Doyle |
| 8,424,580 B2 | 4/2013 | Anderson et al. |
| 8,444,903 B2 | 5/2013 | Lyons et al. |
| 8,454,879 B2 | 6/2013 | Kuzusako et al. |
| 8,475,946 B1 | 7/2013 | Dion et al. |
| 8,506,862 B2 | 8/2013 | Giller et al. |
| 8,506,870 B2 | 8/2013 | Hochsmann et al. |
| 8,513,562 B2 | 8/2013 | Bichsel |
| 8,522,159 B2 | 8/2013 | Kurtenbach et al. |
| 8,540,501 B2 | 9/2013 | Yasukochi |
| 8,568,646 B2 | 10/2013 | Wang et al. |
| 8,568,649 B1 | 10/2013 | Balistreri et al. |
| 8,593,083 B2 | 11/2013 | Firhoj et al. |
| 8,616,872 B2 | 12/2013 | Matsui et al. |
| 8,623,264 B2 | 1/2014 | Rohner et al. |
| 8,636,494 B2 | 1/2014 | Gothait et al. |
| 8,636,496 B2 | 1/2014 | Das et al. |
| 8,658,076 B2 | 2/2014 | El-Siblani |
| 8,663,568 B2 | 3/2014 | Bar Nathan et al. |
| 8,666,142 B2 | 3/2014 | Shkolnik et al. |
| 8,703,037 B2 | 4/2014 | Hull et al. |
| 8,715,832 B2 | 5/2014 | Ederer et al. |
| 8,718,522 B2 | 5/2014 | Chillscyzn et al. |
| 8,737,862 B2 | 5/2014 | Manico et al. |
| 8,741,194 B1 | 6/2014 | Ederer et al. |
| 8,741,203 B2 | 6/2014 | Liska et al. |
| 8,744,184 B2 | 6/2014 | Ameline et al. |
| 8,761,918 B2 | 6/2014 | Silverbrook |
| 8,801,418 B2 | 8/2014 | El-Siblani et al. |
| 8,805,064 B2 | 8/2014 | Ameline et al. |
| 8,815,143 B2 | 8/2014 | John et al. |
| 8,844,133 B2 | 9/2014 | Fuller |
| 8,845,316 B2 | 9/2014 | Schillen et al. |
| 8,845,953 B1 | 9/2014 | Balistreri et al. |
| 8,862,260 B2 | 10/2014 | Shkolnik et al. |
| 8,872,024 B2 | 10/2014 | Jamar et al. |
| 8,873,024 B2 | 10/2014 | Jamar et al. |
| 8,876,513 B2 | 11/2014 | Lim et al. |
| 8,877,115 B2 | 11/2014 | Elsey |
| 8,888,480 B2 | 11/2014 | Yoo et al. |
| 8,905,739 B2 | 12/2014 | Vermeer et al. |
| 8,915,728 B2 | 12/2014 | Mironets et al. |
| 8,926,304 B1 | 1/2015 | Chen |
| 8,932,511 B2 | 1/2015 | Napendensky |
| 8,968,625 B2 | 3/2015 | Tan |
| 8,974,717 B2 | 3/2015 | Maguire et al. |
| 8,991,211 B1 | 3/2015 | Arlotti et al. |
| 8,992,816 B2 | 3/2015 | Jonasson et al. |
| 8,998,601 B2 | 4/2015 | Busato |
| 9,011,982 B2 | 4/2015 | Muller et al. |
| 9,031,680 B2 | 5/2015 | Napadensky |
| 9,063,376 B2 | 6/2015 | Mizumura |
| 9,064,922 B2 | 6/2015 | Nakajima et al. |
| 9,067,359 B2 | 6/2015 | Rohner et al. |
| 9,067,360 B2 | 6/2015 | Wehning et al. |
| 9,067,361 B2 | 6/2015 | El-Siblani |
| 9,073,260 B2 | 7/2015 | El-Siblani et al. |
| 9,079,357 B2 | 7/2015 | Ebert et al. |
| 9,101,321 B1 | 8/2015 | Kiesser |
| 9,149,986 B2 | 10/2015 | Huang et al. |
| 9,150,032 B2 | 10/2015 | Roof et al. |
| 9,153,052 B2 | 10/2015 | Ameline et al. |
| 9,159,155 B2 | 10/2015 | Andersen |
| 9,186,847 B2 | 11/2015 | Fruth et al. |
| 9,193,112 B2 | 11/2015 | Ohkusa et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,221,100 B2 | 12/2015 | Schwarze et al. |
| 9,233,504 B2 | 1/2016 | Douglas et al. |
| 9,248,600 B2 | 2/2016 | Goodman et al. |
| 9,259,880 B2 | 2/2016 | Chen |
| 9,308,690 B2 | 4/2016 | Boyer et al. |
| 9,327,385 B2 | 5/2016 | Webb et al. |
| 9,346,217 B2 | 5/2016 | Huang et al. |
| 9,346,218 B2 | 5/2016 | Chen et al. |
| 9,360,757 B2 | 6/2016 | DeSimone et al. |
| 9,364,848 B2 | 6/2016 | Silverbrook |
| 9,403,322 B2 | 8/2016 | Das et al. |
| 9,403,324 B2 | 8/2016 | Ederer et al. |
| 9,415,443 B2 | 8/2016 | Ljungblad et al. |
| 9,415,544 B2 | 8/2016 | Kerekes et al. |
| 9,415,547 B2 | 8/2016 | Chen et al. |
| 9,429,104 B2 | 8/2016 | Fuller |
| 9,434,107 B2 | 9/2016 | Zenere |
| 9,446,557 B2 | 9/2016 | Zenere et al. |
| 9,453,142 B2 | 9/2016 | Rolland et al. |
| 9,456,884 B2 | 10/2016 | Uckelmann et al. |
| 9,457,374 B2 | 10/2016 | Hibbs et al. |
| 9,463,488 B2 | 10/2016 | Ederer et al. |
| 9,469,074 B2 | 10/2016 | Ederer et al. |
| 9,486,944 B2 | 11/2016 | El-Siblani et al. |
| 9,486,964 B2 | 11/2016 | Joyce |
| 9,487,443 B2 | 11/2016 | Watanabe |
| 9,498,920 B2 | 11/2016 | DeSimone et al. |
| 9,498,921 B2 | 11/2016 | Teulet |
| 9,511,546 B2 | 12/2016 | Chen et al. |
| 9,517,591 B2 | 12/2016 | Yoo et al. |
| 9,517,592 B2 | 12/2016 | Yoo et al. |
| 9,527,244 B2 | 12/2016 | El-Siblani |

(56)     References Cited

U.S. PATENT DOCUMENTS

| | | | |
|---|---|---|---|
| 9,527,272 B2 | 12/2016 | Steele |
| 9,529,371 B2 | 12/2016 | Nakamura |
| 9,533,450 B2 | 1/2017 | El-Siblani et al. |
| 9,539,762 B2 | 1/2017 | Durand et al. |
| 9,545,753 B2 | 1/2017 | Costabeber |
| 9,545,784 B2 | 1/2017 | Nakamura |
| 9,550,326 B2 | 1/2017 | Costabeber |
| 9,561,622 B2 | 2/2017 | Das et al. |
| 9,561,623 B2 | 2/2017 | El-Siblani et al. |
| 9,578,695 B2 | 2/2017 | Jerby et al. |
| 9,579,852 B2 | 2/2017 | Okamoto |
| 9,581,530 B2 | 2/2017 | Guthrie et al. |
| 9,592,635 B2 | 3/2017 | Ebert et al. |
| 9,604,411 B2 | 3/2017 | Rogren |
| 9,610,616 B2 | 4/2017 | Chen et al. |
| 9,616,620 B2 | 4/2017 | Hoechsmann et al. |
| 9,632,037 B2 | 4/2017 | Chen et al. |
| 9,632,420 B2 | 4/2017 | Allanic |
| 9,632,983 B2 | 4/2017 | Ueda et al. |
| 9,636,873 B2 | 5/2017 | Joyce |
| 9,649,812 B2 | 5/2017 | Hartmann et al. |
| 9,649,815 B2 | 5/2017 | Atwood et al. |
| 9,656,344 B2 | 5/2017 | Kironn et al. |
| 9,670,371 B2 | 6/2017 | Pervan et al. |
| 9,676,143 B2 | 6/2017 | Kashani-Shirazi |
| 9,676,963 B2 | 6/2017 | Rolland et al. |
| 9,682,166 B2 | 6/2017 | Watanabe |
| 9,682,425 B2 | 6/2017 | Xu et al. |
| 9,688,027 B2 | 6/2017 | Batchelder et al. |
| 9,707,720 B2 | 7/2017 | Chen et al. |
| 9,720,363 B2 | 8/2017 | Chillscyzn et al. |
| 9,738,034 B2 | 8/2017 | Gruber et al. |
| 9,738,564 B2 | 8/2017 | Capobianco et al. |
| 9,751,292 B2 | 9/2017 | Jamar et al. |
| 9,764,513 B2 | 9/2017 | Stampfl et al. |
| 9,764,535 B2 | 9/2017 | Xie et al. |
| 9,821,546 B2 | 11/2017 | Schaafsma et al. |
| 9,862,146 B2 | 1/2018 | Driessen et al. |
| 9,862,150 B2 | 1/2018 | Chen et al. |
| 9,868,255 B2 | 1/2018 | Comb et al. |
| 9,885,987 B2 | 2/2018 | Chillscysn et al. |
| 9,895,843 B2 | 2/2018 | Lobovsky et al. |
| 9,901,983 B2 | 2/2018 | Hovel et al. |
| 9,908,293 B2 | 3/2018 | Yoo et al. |
| 9,919,474 B2 | 3/2018 | Napadensky |
| 9,919,515 B2 | 3/2018 | Daniell et al. |
| 9,950,368 B2 | 4/2018 | Lampenscherf et al. |
| 9,956,727 B2 | 5/2018 | Steele |
| 9,962,767 B2 | 5/2018 | Buller et al. |
| 9,981,411 B2 | 5/2018 | Green et al. |
| 10,000,023 B2 | 6/2018 | El-Siblani et al. |
| 10,011,076 B2 | 7/2018 | El-Siblani et al. |
| 10,061,302 B2 | 8/2018 | Jacobs et al. |
| 10,071,422 B2 | 9/2018 | Buller et al. |
| 10,124,532 B2 | 11/2018 | El-Siblani et al. |
| 10,150,254 B2 | 12/2018 | Bauman et al. |
| 10,155,345 B2 | 12/2018 | Ermoshkin et al. |
| 10,155,882 B2 | 12/2018 | Rolland et al. |
| 10,183,330 B2 | 1/2019 | Buller et al. |
| 10,183,444 B2 | 1/2019 | Campbell |
| 10,240,066 B2 | 3/2019 | Rolland et al. |
| 10,245,784 B2 | 4/2019 | Teken et al. |
| 10,245,822 B2 | 4/2019 | El-Siblani |
| 10,317,882 B2 | 6/2019 | de Pena et al. |
| 10,336,055 B2 | 7/2019 | Das et al. |
| 10,336,057 B2 | 7/2019 | Moore et al. |
| 10,350,823 B2 | 7/2019 | Rolland et al. |
| 10,357,956 B2 | 7/2019 | Usami et al. |
| 10,406,748 B2 | 9/2019 | Honda |
| 10,612,112 B2 | 4/2020 | Yang et al. |
| 10,639,843 B2 | 5/2020 | Yuan et al. |
| 10,682,808 B2 | 6/2020 | Fujita et al. |
| 10,695,988 B2 | 6/2020 | Hanyu et al. |
| 10,717,212 B2 | 7/2020 | Parkinson et al. |
| 10,737,479 B2 | 8/2020 | El-Siblani et al. |
| 10,994,941 B1 | 5/2021 | Dwivedi et al. |
| 11,141,909 B2 | 10/2021 | Kuijpers et al. |
| 11,179,891 B2 | 11/2021 | Dubelman et al. |
| 11,524,457 B2 | 12/2022 | Steege |
| 2002/0164069 A1 | 11/2002 | Nagano et al. |
| 2003/0102682 A1 | 6/2003 | Kurokawa |
| 2003/0180171 A1 | 9/2003 | Artz et al. |
| 2003/0209836 A1 | 11/2003 | Sherwood |
| 2004/0042789 A1 | 3/2004 | Puffer, Jr. et al. |
| 2005/0012239 A1 | 1/2005 | Nakashima |
| 2005/0019016 A1 | 1/2005 | Nakashika et al. |
| 2005/0056677 A1 | 3/2005 | Talken |
| 2006/0230984 A1 | 10/2006 | Bredt et al. |
| 2006/0248062 A1 | 11/2006 | Libes et al. |
| 2007/0063366 A1 | 3/2007 | Cunningham et al. |
| 2007/0116937 A1 | 5/2007 | Lazzerini |
| 2008/0170112 A1 | 7/2008 | Hull et al. |
| 2008/0179787 A1 | 7/2008 | Sperry et al. |
| 2008/0224352 A1 | 9/2008 | Narukawa et al. |
| 2008/0241404 A1 | 10/2008 | Allaman et al. |
| 2009/0133800 A1 | 5/2009 | Morohoshi et al. |
| 2010/0003619 A1 | 1/2010 | Das et al. |
| 2010/0196694 A1 | 8/2010 | Yamazaki et al. |
| 2010/0290016 A1 | 11/2010 | Kaehr et al. |
| 2011/0089610 A1 | 4/2011 | El-Siblani et al. |
| 2011/0101570 A1 | 5/2011 | John et al. |
| 2011/0162989 A1 | 7/2011 | Ducker et al. |
| 2011/0207057 A1 | 8/2011 | Hull et al. |
| 2012/0007287 A1 | 1/2012 | Vermeer et al. |
| 2012/0195994 A1 | 8/2012 | El-Siblani et al. |
| 2012/0292800 A1 | 11/2012 | Higuchi et al. |
| 2012/0313294 A1 | 12/2012 | Vermeer et al. |
| 2013/0008879 A1 | 1/2013 | Bichsel |
| 2013/0052332 A1 | 2/2013 | Roof et al. |
| 2013/0140741 A1 | 6/2013 | El-Siblani et al. |
| 2013/0241113 A1 | 9/2013 | Geers et al. |
| 2014/0099476 A1 | 4/2014 | Subramanian et al. |
| 2014/0103581 A1 | 4/2014 | Das et al. |
| 2014/0191442 A1 | 7/2014 | Elsey |
| 2014/0200865 A1 | 7/2014 | Lehmann et al. |
| 2014/0239554 A1 | 8/2014 | El-Siblani et al. |
| 2014/0246813 A1 | 9/2014 | Bauman et al. |
| 2014/0275317 A1 | 9/2014 | Moussa |
| 2014/0319735 A1 | 10/2014 | El-Siblani et al. |
| 2014/0322374 A1 | 10/2014 | El-Siblani et al. |
| 2014/0332507 A1 | 11/2014 | Fockele |
| 2014/0339741 A1 | 11/2014 | Aghababaie et al. |
| 2014/0348691 A1 | 11/2014 | Ljungblad et al. |
| 2014/0348692 A1 | 11/2014 | Bessac et al. |
| 2015/0004042 A1 | 1/2015 | Nimal |
| 2015/0004046 A1 | 1/2015 | Graham et al. |
| 2015/0056365 A1 | 2/2015 | Miyoshi |
| 2015/0086409 A1 | 3/2015 | Hellestam |
| 2015/0102531 A1 | 4/2015 | El-Siblani et al. |
| 2015/0104563 A1 | 4/2015 | Lowe et al. |
| 2015/0140152 A1 | 5/2015 | Chen |
| 2015/0140155 A1 | 5/2015 | Ohno et al. |
| 2015/0145174 A1 | 5/2015 | Comb |
| 2015/0158111 A1 | 6/2015 | Schwarze et al. |
| 2015/0165695 A1 | 6/2015 | Chen et al. |
| 2015/0210013 A1 | 7/2015 | Teulet |
| 2015/0224710 A1 | 8/2015 | El-Siblani |
| 2015/0231798 A1 | 8/2015 | Goto |
| 2015/0231828 A1 | 8/2015 | El-Siblani et al. |
| 2015/0231831 A1 | 8/2015 | El-Siblani |
| 2015/0246487 A1 | 9/2015 | El-Siblani |
| 2015/0251351 A1 | 9/2015 | Feygin |
| 2015/0266237 A1 | 9/2015 | Comb et al. |
| 2015/0268099 A1 | 9/2015 | Craig et al. |
| 2015/0298396 A1 | 10/2015 | Chen et al. |
| 2015/0301517 A1 | 10/2015 | Chen et al. |
| 2015/0306819 A1 | 10/2015 | Ljungblad |
| 2015/0306825 A1 | 10/2015 | Chen et al. |
| 2015/0321421 A1 | 11/2015 | Ding |
| 2015/0352668 A1 | 12/2015 | Scott et al. |
| 2015/0352791 A1 | 12/2015 | Chen et al. |
| 2015/0355553 A1 | 12/2015 | Allanic |
| 2015/0375452 A1 | 12/2015 | Huang et al. |
| 2016/0016361 A1 | 1/2016 | Lobovsky et al. |

(56) References Cited

U.S. PATENT DOCUMENTS

| | | |
|---|---|---|
| 2016/0031010 A1 | 2/2016 | O'Neill et al. |
| 2016/0046075 A1 | 2/2016 | DeSimone et al. |
| 2016/0046080 A1 | 2/2016 | Thomas et al. |
| 2016/0052205 A1 | 2/2016 | FrantzDale |
| 2016/0059484 A1 | 3/2016 | DeSimone et al. |
| 2016/0059485 A1 | 3/2016 | Ding et al. |
| 2016/0067921 A1 | 3/2016 | Willis et al. |
| 2016/0082662 A1 | 3/2016 | Majer |
| 2016/0082671 A1 | 3/2016 | Joyce |
| 2016/0096332 A1 | 4/2016 | Chen et al. |
| 2016/0107340 A1 | 4/2016 | Joyce |
| 2016/0107383 A1 | 4/2016 | Dikovsky et al. |
| 2016/0107387 A1 | 4/2016 | Ooba et al. |
| 2016/0129631 A1 | 5/2016 | Chen et al. |
| 2016/0137839 A1 | 5/2016 | Rolland et al. |
| 2016/0167160 A1 | 6/2016 | Hellestam |
| 2016/0176114 A1 | 6/2016 | Tsai et al. |
| 2016/0184931 A1 | 6/2016 | Green |
| 2016/0193785 A1 | 7/2016 | Bell et al. |
| 2016/0200052 A1 | 7/2016 | Moore et al. |
| 2016/0214327 A1 | 7/2016 | Ucklemann et al. |
| 2016/0221262 A1 | 8/2016 | Das et al. |
| 2016/0223117 A1 | 8/2016 | Hitzelberger |
| 2016/0243649 A1 | 8/2016 | Zheng et al. |
| 2016/0303798 A1 | 10/2016 | Mironets et al. |
| 2016/0332386 A1 | 11/2016 | Kuijpers |
| 2016/0361871 A1 | 12/2016 | Jeng et al. |
| 2016/0361872 A1 | 12/2016 | El-Siblani |
| 2017/0008234 A1 | 1/2017 | Cullen et al. |
| 2017/0008236 A1 | 1/2017 | Easter et al. |
| 2017/0021562 A1 | 1/2017 | El-Siblani et al. |
| 2017/0028472 A1 | 2/2017 | Shaw et al. |
| 2017/0066185 A1 | 3/2017 | Ermoshkin et al. |
| 2017/0066196 A1 | 3/2017 | Beard et al. |
| 2017/0072635 A1 | 3/2017 | El-Siblani et al. |
| 2017/0080641 A1 | 3/2017 | El-Siblani |
| 2017/0087670 A1 | 3/2017 | Kalentics et al. |
| 2017/0100895 A1 | 4/2017 | Chou et al. |
| 2017/0100897 A1 | 4/2017 | Chou et al. |
| 2017/0100899 A1 | 4/2017 | El-Siblani et al. |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0157841 A1 | 6/2017 | Green |
| 2017/0157862 A1 | 6/2017 | Bauer |
| 2017/0165916 A1 | 6/2017 | El-Siblani |
| 2017/0173865 A1 | 6/2017 | Dikovsky et al. |
| 2017/0182708 A1 | 6/2017 | Lin et al. |
| 2017/0190120 A1 | 7/2017 | Bloome et al. |
| 2017/0276651 A1 | 9/2017 | Hall |
| 2017/0284971 A1 | 10/2017 | Hall |
| 2017/0291804 A1 | 10/2017 | Craft et al. |
| 2017/0297108 A1 | 10/2017 | Gibson et al. |
| 2017/0297109 A1 | 10/2017 | Gibson et al. |
| 2017/0297261 A1 | 10/2017 | Schultheiss et al. |
| 2017/0305136 A1 | 10/2017 | Elsey |
| 2017/0326786 A1 | 11/2017 | Yuan et al. |
| 2017/0326807 A1 | 11/2017 | Greene et al. |
| 2017/0368816 A1 | 12/2017 | Batchelder et al. |
| 2018/0001567 A1 | 1/2018 | Juan et al. |
| 2018/0015672 A1 | 1/2018 | Shusteff et al. |
| 2018/0043619 A1 | 2/2018 | Kim et al. |
| 2018/0056585 A1 | 3/2018 | Du Toit |
| 2018/0056604 A1 | 3/2018 | Sands et al. |
| 2018/0079137 A1 | 3/2018 | Herzog et al. |
| 2018/0085998 A1 | 3/2018 | von Burg |
| 2018/0117790 A1 | 5/2018 | Yun |
| 2018/0134029 A1 | 5/2018 | Myerberg et al. |
| 2018/0162045 A1 | 6/2018 | Guimbretiere |
| 2018/0169969 A1 | 6/2018 | Deleon et al. |
| 2018/0200948 A1 | 7/2018 | Kuijpers et al. |
| 2018/0201021 A1 | 7/2018 | Beaver et al. |
| 2018/0229332 A1 | 8/2018 | Tsai et al. |
| 2018/0229436 A1 | 8/2018 | Gu et al. |
| 2018/0272603 A1 | 9/2018 | MacCormack et al. |
| 2018/0272608 A1 | 9/2018 | Yun |
| 2018/0304369 A1 | 10/2018 | Myerberg et al. |
| 2018/0345600 A1 | 12/2018 | Holford et al. |
| 2018/0370214 A1 | 12/2018 | Comb et al. |
| 2019/0022937 A1 | 1/2019 | Stelter et al. |
| 2019/0039299 A1 | 2/2019 | Busbee et al. |
| 2019/0047211 A1 | 2/2019 | Herring et al. |
| 2019/0061230 A1 | 2/2019 | Ermoshkin et al. |
| 2019/0070777 A1 | 3/2019 | Wu et al. |
| 2019/0112499 A1 | 4/2019 | Rolland et al. |
| 2019/0126533 A1 | 5/2019 | Thompson |
| 2019/0126535 A1 | 5/2019 | Thompson |
| 2019/0126536 A1 | 5/2019 | Thompson |
| 2019/0126548 A1 | 5/2019 | Barnhart et al. |
| 2019/0146344 A1 | 5/2019 | Shimoaoki |
| 2019/0232369 A1 | 8/2019 | Strobner et al. |
| 2019/0232550 A1 | 8/2019 | Mark et al. |
| 2019/0240932 A1 | 8/2019 | Graf |
| 2019/0263054 A1 | 8/2019 | Kotler et al. |
| 2019/0270254 A1 | 9/2019 | Mark et al. |
| 2019/0283316 A1 | 9/2019 | Rolland et al. |
| 2019/0299524 A1 | 10/2019 | Hill et al. |
| 2019/0315064 A1 | 10/2019 | Budge et al. |
| 2019/0344381 A1 | 11/2019 | Pomerantz et al. |
| 2019/0344500 A1 | 11/2019 | Cote |
| 2019/0389137 A1 | 12/2019 | Frohnmaier et al. |
| 2020/0001398 A1 | 1/2020 | Mellor et al. |
| 2020/0039142 A1 | 2/2020 | Childers |
| 2020/0079008 A1 | 3/2020 | Chowdry et al. |
| 2020/0079017 A1 | 3/2020 | MacNeish, III et al. |
| 2020/0101564 A1 | 4/2020 | Shibazaki |
| 2020/0108553 A1 | 4/2020 | Rogren |
| 2020/0164437 A1 | 5/2020 | Goth et al. |
| 2020/0198224 A1 | 6/2020 | Dubelman et al. |
| 2020/0230938 A1 | 7/2020 | Menchik et al. |
| 2020/0238624 A1 | 7/2020 | Dubelman et al. |
| 2020/0247040 A1 | 8/2020 | Green |
| 2020/0262150 A1 | 8/2020 | Dubelman et al. |
| 2020/0290275 A1 | 9/2020 | Dubelman et al. |
| 2020/0290276 A1 | 9/2020 | Kunc et al. |
| 2020/0298485 A1 | 9/2020 | Tsai |
| 2020/0307075 A1 | 10/2020 | Mattes et al. |
| 2020/0307100 A1 | 10/2020 | Sabo |
| 2020/0376775 A1 | 12/2020 | Das et al. |
| 2021/0023776 A1 | 1/2021 | Van Esbroeck et al. |
| 2021/0046695 A1 | 2/2021 | Thompson et al. |
| 2021/0156779 A1 | 5/2021 | Medalsy |
| 2021/0187859 A1 | 6/2021 | Gmeiner et al. |
| 2021/0316367 A1 | 10/2021 | Padilla et al. |
| 2021/0402677 A1 | 12/2021 | Khusnatdinov et al. |
| 2022/0001525 A1 | 1/2022 | Panetta et al. |
| 2022/0040921 A1 | 2/2022 | Dubelman et al. |
| 2022/0088868 A1 | 3/2022 | Duoss et al. |
| 2022/0161488 A1 | 5/2022 | Dubelman et al. |
| 2022/0176626 A1 | 6/2022 | Schmid et al. |
| 2022/0274335 A1 | 9/2022 | Thompson et al. |
| 2022/0339859 A1 | 10/2022 | Steele et al. |
| 2022/0402198 A1 | 12/2022 | Thompson et al. |
| 2022/0402212 A1 | 12/2022 | Dubelman et al. |
| 2022/0410481 A1 | 12/2022 | Muhlenkamp et al. |
| 2022/0410482 A1 | 12/2022 | Dubelman et al. |
| 2022/0410486 A1 | 12/2022 | Liu et al. |
| 2023/0012168 A1 | 1/2023 | Dubelman et al. |

(56)          References Cited

U.S. PATENT DOCUMENTS

| 2023/0050127 | A1 | 2/2023 | Duebelman et al. |
| 2023/0064479 | A1 | 3/2023 | Barnhill et al. |
| 2023/0067394 | A1 | 3/2023 | Barnhill et al. |

FOREIGN PATENT DOCUMENTS

| CN | 105711101 | A | 6/2016 |
| CN | 105773962 | A | 7/2016 |
| CN | 107322930 | A | 11/2017 |
| CN | 208946717 | U | 6/2019 |
| CN | 109968661 | A | 7/2019 |
| CN | 111497231 | A | 8/2020 |
| DE | 102007010624 | A1 | 9/2008 |
| EP | 3053729 | A1 | 8/2016 |
| EP | 3356121 | B1 | 10/2020 |
| JP | H06246839 | A | 9/1994 |
| JP | 2004/257929 | A | 9/2004 |
| JP | 2016196098 | A | 11/2016 |
| KR | 20170108729 | A | 9/2017 |
| KR | 102109664 | B1 | 5/2020 |
| WO | WO9600422 | A1 | 1/1996 |
| WO | WO9806560 | | 2/1998 |
| WO | WO0100390 | A1 | 1/2001 |
| WO | WO2006/077665 | A1 | 7/2006 |
| WO | WO2006/109355 | A1 | 10/2006 |
| WO | WO2017/098968 | A1 | 6/2017 |
| WO | WO2019/159936 | A1 | 8/2019 |

OTHER PUBLICATIONS

Carbon, Carbon SpeedCell: Additive Manufacturing Reinvented, Redwood City California, Mar. 16, 2017, 4 Pages. Retrieved from Webpage: https://www.carbon3d.com/news/carbon-speedcell-additive-manufacturing-reinvented/.

Carbon, The 3D Printer for Products that Outperform, 8 Pages. Retrieved from Webpage: https://www.carbon3d.com.

DDM Systems, Disruptive Technologies for Additive Manufacturing, 2014. Retrieved on Jul. 7, 2020 from Web Link: http://www.ddmsys.com/.

Designing Buildings Wiki, Types of Brick Bonding, 6 Pages. Retrieved Mar. 25, 2021 from Webpage: https://www.designingbuildings.co.uk/wiki/Types_of_brick_bonding.

Doctor Blade with Micrometer Screw Gauge, The Tape Casting Warehouse, Inc., Morrisville PA, 6 Pages. Retrieved Mar. 23, 2021 from Webpage: https://www.drblade.com/.

Envisiontec, Advanced DLP for Superior 3D Printing, Mar. 9, 2017, 8 Pages. https://envisiontec.com/wp-content/uploads/2016/12/Why-EnvisionTEC-DLP-3D-Printing-is-Better-rebranded.pdf.

Feng et al., Exposure Reciprocity Law in Photopolymerization of Multi-Functional Acrylates and Methacrylates, Macromolecular Chemistry and Physics, vol. 208, 2007, pp. 295-306.

Formlabs, An Introduction to Post-Curing SLA 3D Prints, 8 Pages. Retrieved from Webpage: https://formlabs.com/blog/introduction-post-curing-sla-3d-prints.

Formlabs, Form Wash & Form Cure, 8 Pages. Retrieved from Webpage: https://formlabs.com/tools/wash-cure/.

Hafkamp et al., A Feasibility Study on Process Monitoring and Control in Vat Photopolymerization of Ceramics, Mechatronics, vol. 56, The Netherlands, Dec. 2018, pp. 220-241. Retrieved from https://doi.org/10.1016/j.mechatronics.2018.02.006.

Kudo3D, Post-Process Your SLA Prints in 4 Easy Steps, 8 Pages. Retrieved from Webpage: https://www.kudo3d.com/post-process-your-sla-prints-in-4-easy-steps/.

Leap, Low-Frequency Sonic Mixing Technology, Energy Efficiency & Renewable Energy, Energy.Gov, 5 Pages. Retrieved Mar. 17, 2021 from Webpage: https://www.energy.gov/eere/amo/low-frequency-sonic-mixing-technology.

Lee et al., Development of a 3D Printer Using Scanning Projection Stereolithography, Scientific Reports, vol. 5, Article No. 9875, 2015, 5 pages. https://www.nature.com/articles/srep09875#s1.

Lee et al., Large-Area Compatible Laser Sintering Schemes with a Spatially Extended Focused Beam, Journal, Micromachines, vol. 8, No. 153, Seoul University, Seoul Korea, May 11, 2017, 8 Pages. http://dx.doi.org/10.3390/mi8050153.

Limaye, Multi-Objective Process Planning Method for Mask Projection Stereolithography, Dissertation Georgia Institute of Technology, Dec. 2007, 324 Pages.

Lithoz, CeraCleaning Station Ultra Technical Data, 2 Pages.

Matthews et al., Diode-Based Additive Manufacturing of Metals Using an Optically-Addressable Light Valve, Optic Express Research Article, vol. 25, No. 10, Lawrence Livermore National Laboratory, Livermore CA, May 10, 2017.

Micron3D, Cleaning of Printed Models, YouTube, Dec. 5, 2016, 1 Page. Retrieved from Webpage: https://www.youtube.com/watch?v=soAIrSsliBY.

Nussbaum et al., Evaluation of Processing Variables in Large Area Polymer Sintering of Single Layer Components, Solid Freeform Fabrication 2016: Proceedings of the 27th Annual International Solid Freeform Fabrication Symposium—An Additive Manufacturing Conference Reviewed Paper, University of South Florida, Tampa Florida.

Omegasonics, Ultrasonic Cleaning of 3D Printer Parts, YouTube, Feb. 26, 2014, 1 Page. Retrieved from Webpage: https://www.youtube.com/watch?v=Gxj47OS5obk.

Park et al., Development of Multi-Material DLP 3D Printer, Journal of the Korean Society of Manufacturing Technology Engineers, vol. 26, Issue 1, Seoul Korea, Feb. 15, 2017, pp. 100-107. https://doi.org/10.7735/ksmte.2017.26.1.100.

Prodways Tech, Prodways Movinglight Technology Retrieved on Jul. 2, 2020 from Web Link: https://www.prodways.com/en/the-prodways-movinglight-technology/.

RAMCO Equipment Corporation, RAMCO RamTough-Fully Automated Wash/Rinse/Dry System, YouTube, Jul. 9, 2013, 1 Page. Retrieved from Webpage: https://www.youtube.com/watch?v=18S5Oc3FVFU.

Ricoh Imaging Company Ltd., The Advanced Pixel Shift Resolution System II for Super-High-Resolution Images, Pentax K-1 Mark II, Pixel Shift Resolution System, 4 Pages. Retrieved on Mar. 30, 2021 from Webpage: http://www.ricoh-imaging.co.jp/english/products/k-1-2/feature/02.html.

Sonics & Materials, Inc., Ultrasonic Food Cutting Equipment, Sonics & Materials, Inc., Retrieved on Jun. 26, 2020, 4 Pages. https://www.sonics.com/food-cutting.

Stemmer Imaging, Ultra-High Resolution for Industrial Imaging, Germany, 9 Pages. Retrieved on Mar. 30, 2021 from Webpage: https://www.stemmer-imaging.com/en/knowledge-base/pixel-shift-technology/.

Stevenson, Admatec's Ceramic 3D Printers, Ceramic, Metal, Fabbaloo 3D Printing News, Jan. 21, 2019, 8 Pages. Retrieved Nov. 24, 2020 from Weblink: https://www.fabbaloo.com/blog/2019/1/21/admatecs-ceramic-3d-printers.

Techmetals, Electroless Nickel (Tm 117C), Engineered Metal Finishing & Performance Coatings, 1 Page. Retrieved from Webpage: https://techmetals.com/pdfs/TM_117C.pdf https://techmetals.com/tm117c-2/.

Telsonic Ultrasonics, Cutting Awning Fabrics and Sealing the Edge, The Powerhouse of Ultrasonics, 2017, 1 Page. https://www.telsonic.com/fileadmin/applications/AS_206_Cut_Seal_Markisengewebe_EN.pdf.

Telsonic Ultrasonics, Integrated Power Actuator—IPA 3505, Telsonic Ultrasonics, Retrieved Jun. 26, 2020, 2 Pages. https://www.telsonic.com/en/products/integrated-power-actuator-ipa-3505/.

Tok et al., Tape Casting of High Dielectric Ceramic Substrates for Microelectronics Packaging, Journal of Materials Engineering and Performance, vol. 8, 1999, pp. 469-472. (Abstract Only) https://link.springer.com/article/10.1361/105994999770346783.

Wikipedia, Pixel Shifting, 2 Pages. Retrieved Mar. 30, 2021 from Webpage: https://en.wikipedia.org/wiki/Pixel_shifting.

Wikipedia, Standing Wave, 11 Pages. Retrieved Mar. 17, 2021 from Webpage: https://en.wikipedia.org/wiki/Standing_wave.

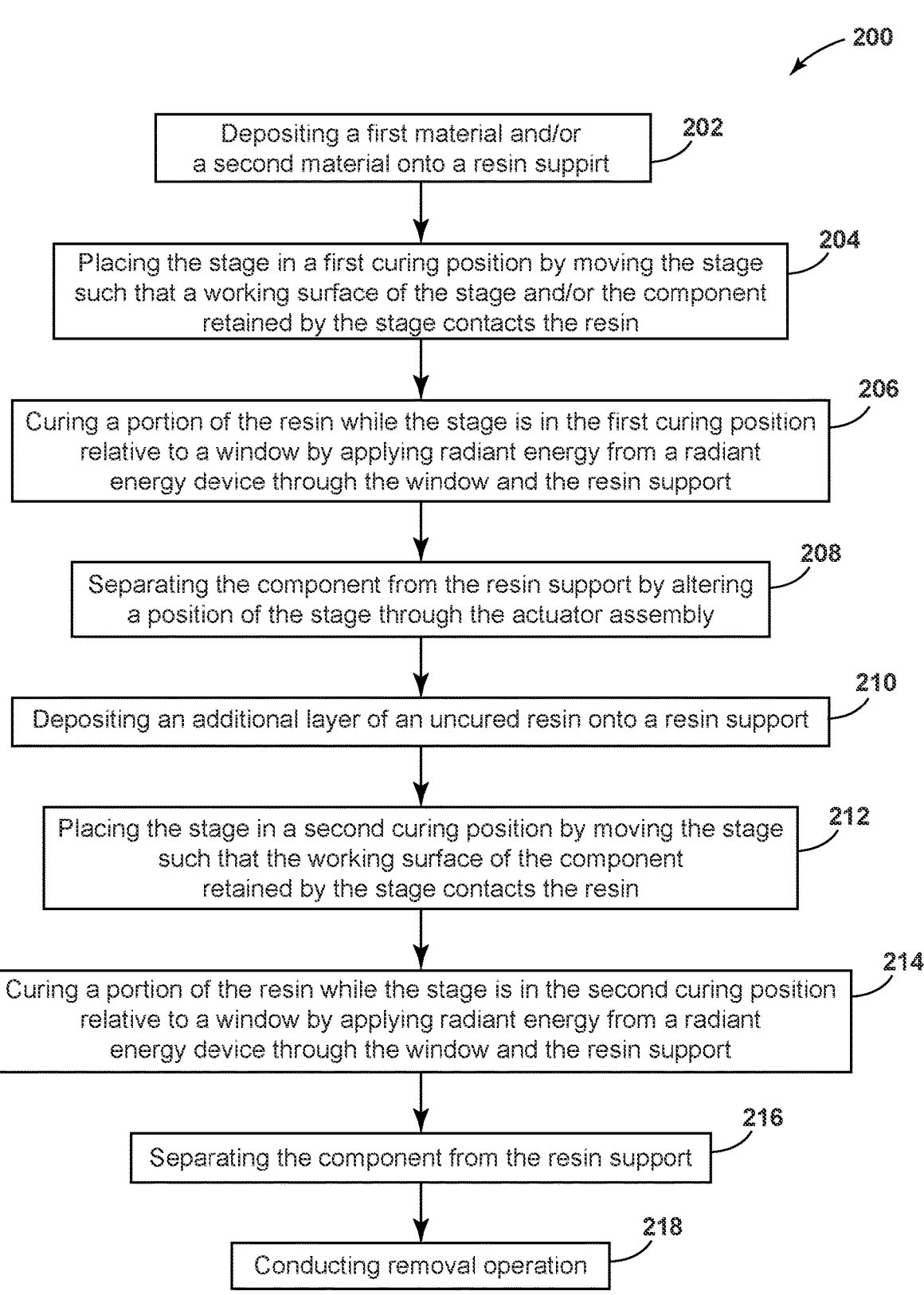

200

Depositing a first material and/or
a second material onto a resin suppirt ⟍ 202

Placing the stage in a first curing position by moving the stage
such that a working surface of the stage and/or the component
retained by the stage contacts the resin ⟍ 204

Curing a portion of the resin while the stage is in the first curing position
relative to a window by applying radiant energy from a radiant
energy device through the window and the resin support ⟍ 206

Separating the component from the resin support by altering
a position of the stage through the actuator assembly ⟍ 208

Depositing an additional layer of an uncured resin onto a resin support ⟍ 210

Placing the stage in a second curing position by moving the stage
such that the working surface of the component
retained by the stage contacts the resin ⟍ 212

Curing a portion of the resin while the stage is in the second curing position
relative to a window by applying radiant energy from a radiant
energy device through the window and the resin support ⟍ 214

Separating the component from the resin support ⟍ 216

Conducting removal operation ⟍ 218

502
Depositing a layer of an uncured second resin onto a second resin support

504
Moving the stage from previous curing position

506
Placing the stage in a removal position

508
At least partially curing a portion of the second resin

510
Separating the stage and/or the component from the resin support

SYSTEMS AND METHODS FOR ADDITIVE MANUFACTURING

CROSS-REFERENCE TO RELATED APPLICATION

This application claims priority to U.S. Provisional Application No. 63/393,023, entitled "SYSTEMS AND METHODS FOR ADDITIVE MANUFACTURING," filed on Jul. 28, 2022. The entire contents of the above-referenced application is hereby incorporated by reference in its entirety for all purposes.

FIELD

The present subject matter relates generally to an additive manufacturing apparatus.

BACKGROUND

Additive manufacturing is a process in which material is built up layer-by-layer to form a component. Stereolithography (SLA) is a type of additive manufacturing process, which employs a tank of radiant-energy curable photopolymer "resin" and a curing energy source such as a laser. Similarly, Digital Light Processing (DLP) three-dimensional (3D) printing employs a two-dimensional image projector to build components one layer at a time. For each layer, the energy source draws or flashes a radiation image of the cross section of the component onto the surface of the resin. Exposure to the radiation cures and solidifies the pattern in the resin and joins it to a previously cured layer.

In some instances, additive manufacturing may be accomplished through a "tape casting" process. In this process, a resin is deposited onto a flexible radiotransparent resin support, such as a tape or foil, that is fed out from a supply reel to a build zone. Radiant energy is produced from a radiant energy device and directed through a window to cure the resin to a component that is supported by a stage in the build zone. Once the curing of the first layer is complete, the stage and the resin support are separated from one another. The resin support is then advanced and fresh resin is provided to the build zone. In turn, the first layer of the cured resin is placed onto the fresh resin and cured through the energy device to form an additional layer of the component. Subsequent layers are added to each previous layer until the component is completed. However, in some instances, it may be beneficial to remove residual resin from the component prior to forming an additional layer of the component.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

FIG. 3 is a method of operating the additive manufacturing apparatus in accordance with various aspects of the present disclosure;

Figure 1A:
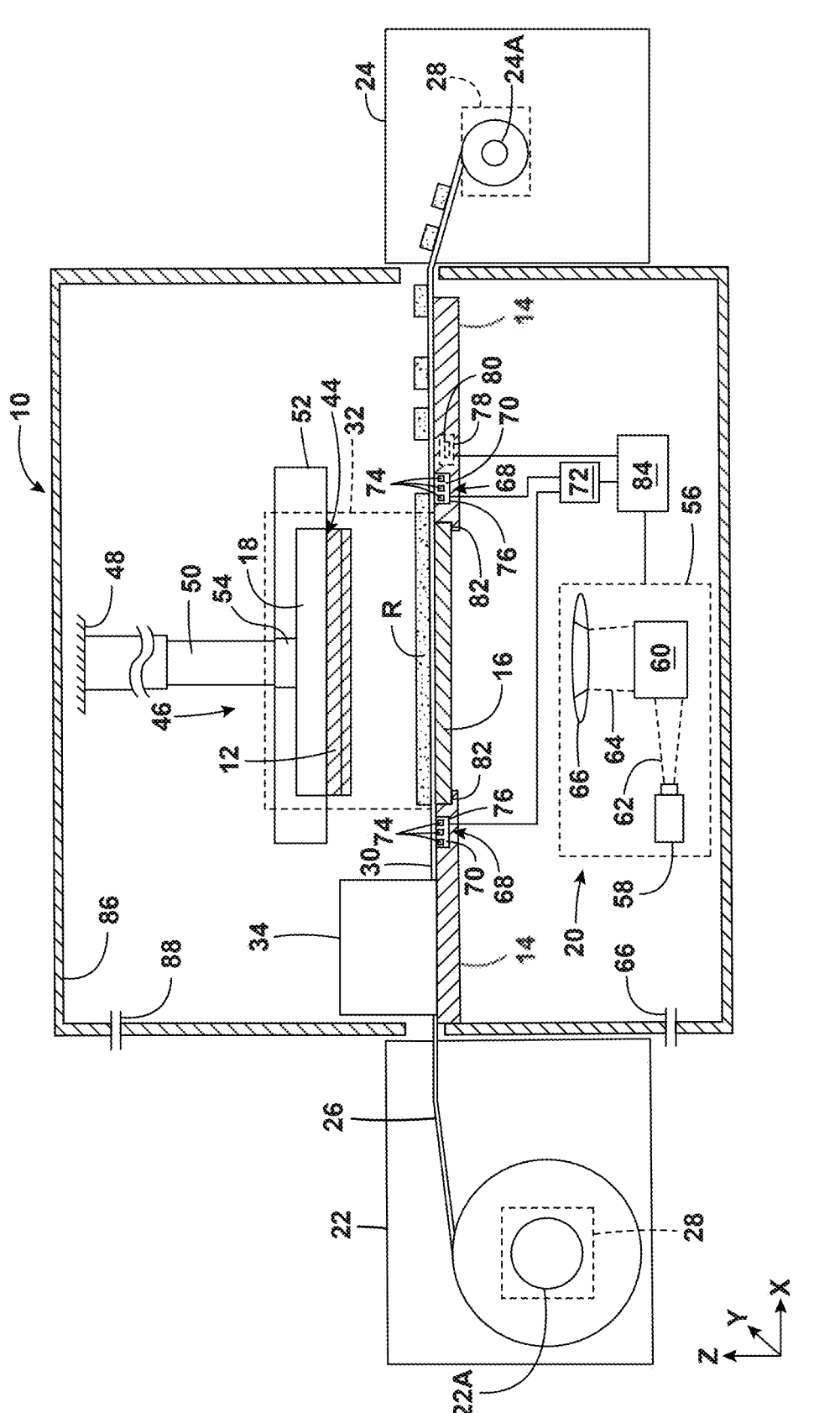
FIG. 1A is a schematic side view of an additive manufacturing apparatus in accordance with various aspects of the present disclosure.

Repeat use of reference characters in the present specification and drawings is intended to represent the same or analogous features or elements of the present disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings Like or similar designations in the drawings and description have been used to refer to like or similar parts of the disclosure.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a resin support movement along the manufacturing apparatus. For example, "upstream" refers to the direction from which the resin support moves, and "downstream" refers to the direction to which the resin support moves. The term "selectively" refers to a component's ability to operate in various states (e.g., an ON state and an OFF state) based on manual and/or automatic control of the component.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to an additive manufacturing apparatus that implements various manufacturing processes such that successive layers of material(s) are provided on each other to "build-up," layer-by-layer, a three-dimensional component. The successive layers generally cure together to form a monolithic component which may have a variety of integral sub-components. Although additive manufacturing technology is described herein as enabling the fabrication of complex objects by building objects point-by-point, layer-by-layer, variations of the described additive manufacturing apparatus and technology are possible and within the scope of the present subject matter.

The additive manufacturing apparatus can include a support plate, a window supported by the support plate, and a stage moveable relative to the window. The additive manufacturing apparatus can further include a first resin and a second resin that are each deposited as layers having a desired thickness onto a resin support (such as a foil, tape, vat, plate, etc.) that is fed out from a supply reel or a pair of supply reels in an X-axis direction. In various instances, the first resin may be laterally offset from the second resin in a Y-axis direction.

A stage lowers onto the resin such that a working surface defined by one of a surface of the stage or a surface of the work in process component is positioned such that the working surface either is just touching the resin or compressing it between the resin support and the stage and defining a layer thickness. Radiant energy is used to cure the resin through the resin support while the stage is in one or more curing positions. Once the curing of the first layer is complete, the stage is retracted, taking the cured material with the stage.

In some instances, residual resin remains on the component once the stage is retracted. The residual resin may be any resin that was inadvertently coupled with the component and not intended to be used to form a portion of the layer of the component. As such, the additive manufacturing apparatus can perform one or more removal operations to separate at least a portion of the residual resin from the component. In various examples, the removal operation is performed in a removal position. The removal position may be offset from the curing position such that the removal position is at least partially outside of a build zone of the apparatus.

Once the removal operation is completed, the component may have less residual resin thereon such that subsequent cleaning processes may not be needed. In some instances, the subsequent cleaning processes may use solutions that weaken or otherwise alter the structure of the component.

Figure 1B:
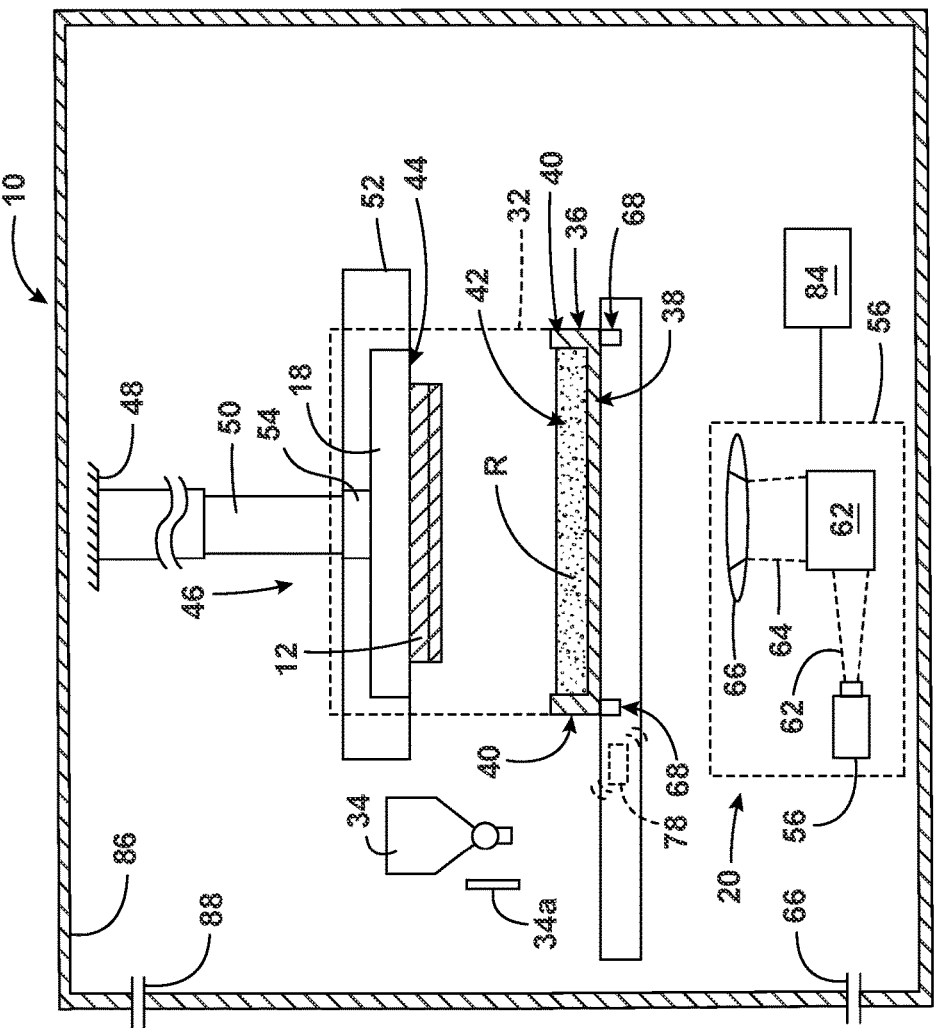
FIG. 1B is a schematic side view of an additive manufacturing apparatus in accordance with various aspects of the present disclosure.

Referring to the drawings wherein identical reference numerals denote the similar elements throughout the various views, FIGS. 1A and 1B schematically illustrate an example of one type of suitable apparatus 10 for forming a component 12 created through one or more layers of at least one cured resin R. The apparatus 10 can include one or more of a support plate 14, a window 16, a stage 18 that is movable relative to the window 16, and a radiant energy device 20, which, in combination, may be used to form any number (e.g., one or more) of additively manufactured components 12.

In the illustrated example of FIG. 1A, the apparatus 10 includes a feed module 22, which may include a first roller 22A, and a take-up module 24, which may include a second roller 24A, that are spaced-apart with a resin support 26 extending therebetween. A portion of the resin support 26 can be supported from underneath by the support plate 14. Suitable mechanical supports (frames, brackets, etc.) and/or alignment devices may be provided for the rollers 22A, 24A and the support plate 14. The first roller 22A and/or the second roller 24A can be configured to control the speed and direction of the resin support 26 such that the desired tension and speed is maintained in the resin support 26 through a drive system 28. By way of example and not limitation, the drive system 28 can be configured as individual motors associated with the first roller 22A and/or the second roller 24A. Moreover, various components, such as motors, actuators, feedback sensors, and/or controls can be provided for driving the rollers 22A, 24A in such a manner to maintain the resin support 26 tensioned between the aligned rollers 22A, 24A and to wind the resin support 26 from the first roller 22A to the second roller 24A.

In various embodiments, the window 16 is transparent and can be operably supported by the support plate 14. Further, the window 16 and the support plate 14 can be integrally formed such that one or more windows 16 are integrated within the support plate 14. Likewise, the resin support 26 is also transparent or includes portions that are transparent. As used herein, the terms "transparent" and "radiotransparent" refer to a material that allows at least a portion of radiant energy of a selected wavelength to pass through. For example, the radiant energy that passes through the window 16 and the resin support 26 can be in the ultraviolet spectrum, the infrared spectrum, the visible spectrum, or any other practicable radiant energy. Non-limiting examples of transparent materials include polymers, glass, and crystalline minerals, such as sapphire or quartz.

The resin support 26 extends between the feed module 22 and the take-up module 24 and defines a "build surface" 30, which is shown as being planar, but could alternatively be arcuate (depending on the shape of the support plate 14). In some instances, the build surface 30 may be defined by the resin support 26 and be positioned to face the stage 18 with the window 16 on an opposing side of the resin support 26 from the stage 18. For purposes of convenient description, the build surface 30 may be considered to be oriented parallel to an X-Y plane of the apparatus and a direction perpendicular to the X-Y plane is denoted as a Z-axis direction (X, Y, and Z being three mutually perpendicular directions). As used herein, the X-axis refers to the machine direction along the length of the resin support 26. As used herein, the Y-axis refers to the transverse direction across the width of the resin support 26 and generally perpendicular to the machine direction. As used herein, the Z-axis refers to the stage direction that can be defined as the direction of movement of the stage 18 towards/away from the window 16.

The build surface 30 may be configured to be "non-stick," that is, resistant to adhesion of a cured resin R. The non-stick properties may be embodied by a combination of variables such as the chemistry of the resin support 26, its surface finish, and/or applied coatings. For instance, a permanent or semi-permanent non-stick coating may be applied. One non-limiting example of a suitable coating is polytetrafluoroethylene ("PTFE"). In some examples, all or a portion of the build surface 30 may incorporate a controlled roughness or surface texture (e.g. protrusions, dimples, grooves, ridges, etc.) with nonstick properties. Additionally or alternatively, the resin support 26 may be made in whole or in part from an oxygen-permeable material.

For reference purposes, an area or volume immediately surrounding the location of the resin support 26 and the window 16 or transparent portion defined by the support plate 14 may be defined as a "build zone," labeled 32.

In some instances, a material depositor 34 may be positioned along the resin support 26. The material depositor 34 may be any device or combination of devices that is operable to apply a layer of resin R on the resin support 26. The material depositor 34 may optionally include a device or combination of devices to define a height of the resin R on the resin support 26 and/or to level the resin R on the resin support 26. Nonlimiting examples of suitable material deposition devices include chutes, rollers, hoppers, pumps, spray nozzles, spray bars, or printheads (e.g. inkjets). In some examples, a doctor blade may be used to control the thickness of resin R applied to the resin support 26 as the resin support 26 passes the material depositor 34.

In the illustrated example of FIG. 1B, the resin support 26 may be in the form of a vat 36 that is configured to isolate debris that could contaminate the build from usable resin R. The vat 36 may include a floor 38 and a perimeter wall 40. The perimeter wall 40 extends from the floor 38. Inner surfaces of the floor 38 and the perimeter wall 40 define a receptacle 42 for receiving the resin R.

A drive system 28 (FIG. 1A) may be provided for moving the vat 36 relative to the stage 18 parallel to the X-direction between a build zone 32 and a position at least partially external to the build zone 32. However, it will be appreciated that, in other embodiments, the resin support 26 may be stationary without departing from the scope of the present disclosure.

In some instances, the resin support 26 may be positioned to accept a resin R from a material depositor 34 is operable to introduce a layer of resin R into the resin support 26. The material depositor 34 may optionally include a device or combination of devices to define a height in the resin and/or to level the resin R. Nonlimiting examples of suitable material deposition devices include chutes, hoppers, pumps, spray nozzles, spray bars, or printheads (e.g. inkjets).

Referring back to FIGS. 1A and 1B, the resin R includes any radiant-energy curable material, which is capable of adhering or binding together the filler (if used) in the cured state. As used herein, the term "radiant-energy curable" refers to any material which solidifies or partially solidifies in response to the application of radiant energy of a particular frequency and energy level. For example, the resin R may include a photopolymer resin containing photo-initiator compounds functioning to trigger a polymerization reaction, causing the resin R to change from a liquid (or powdered) state to a solid state. Alternatively, the resin R may include a material that contains a solvent that may be evaporated out by the application of radiant energy. The uncured resin R may be provided in solid (e.g. granular) or liquid form, including a paste or slurry.

Furthermore, the resin R can have a relatively high viscosity resin that will not "slump" or run off during the build process. The composition of the resin R may be selected as desired to suit a particular application. Mixtures of different compositions may be used. The resin R may be selected to have the ability to out-gas or burn off during further processing, such as a sintering process.

Additionally or alternatively, the resin R may be selected to be a viscosity reducible composition. These compositions reduce in viscosity when a shear stress is applied or when they are heated. For example, the resin R may be selected to be shear-thinning such that the resin R exhibits reduced viscosity as an amount of stress applied to the resin R increases. Additionally or alternatively, the resin R may be selected to reduce in the viscosity as the resin R is heated.

The resin R may incorporate a filler. The filler may be pre-mixed with resin R, then loaded into the material depositor 34. Alternatively, the filler may be mixed with the resin R on the apparatus 10. The filler includes particles, which are conventionally defined as "a very small bit of matter." The filler may include any material that is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used. In some examples, the filler composition may be selected for its electrical or electromagnetic properties, e.g. it may specifically be an electrical insulator, a dielectric material, an electrical conductor, and/or magnetic.

The filler may be "fusible," meaning it is capable of consolidation into a mass upon application of sufficient energy. For example, fusibility is a characteristic of many available powders including but not limited to polymeric, ceramic, glass, and metallic. The proportion of filler to resin R may be selected to suit a particular application. Generally, any amount of filler may be used so long as the combined material is capable of flowing and being leveled, and there is sufficient resin R to hold together the particles of the filler in the cured state.

The stage 18 is a structure defining a planar surface 44, which is capable of being oriented parallel to the build surface 30 or the X-Y plane. Various devices may be provided for moving the stage 18 relative to the window 16. For example, as illustrated in FIGS. 1A and 1B, the movement may be provided through an actuator assembly 46 that may be coupled with a static support 48. In some embodiments, the actuator assembly 46 may include a first actuator 50 between the stage 18 and the static support 48 that allows for movement of the stage 18 in a first, vertical direction (e.g., along the Z-axis direction). The actuator assembly 46 may additionally or alternatively include a second actuator 52 between the stage 18 and the first actuator and/or the static support 48 that allows for movement in the X-axis direction and/or the Y-axis direction. The actuator assembly 46 may additionally or alternatively include a third actuator 54 between the stage 18 and the second actuator 52 and/or the stage 18 that allows for movement in the X-axis direction and/or the Y-axis direction. The actuator assembly 46 may include any device practicable of moving the stage 18 in any direction, such as ballscrew electric actuators, linear electric actuators, pneumatic cylinders, hydraulic cylinders, delta drives, belt systems, or any other practicable device. It will be appreciated that, in other examples, the resin support may additionally or alternatively move in the Y-axis direction (or any other direction).

The radiant energy device 20 may be configured as any device or combination of devices operable to generate and project radiant energy at the resin R in a suitable pattern and with a suitable energy level and other operating characteristics to cure the resin R during the build process. For example, as shown in FIGS. 1A and 1B, the radiant energy device 20 may include a projector 56, which may generally refer to any device operable to generate a radiant energy predetermined patterned image of suitable energy level and other operating characteristics to cure the resin R. As used herein, the term "patterned image" refers to a projection of radiant energy comprising an array of one or more individual pixels. Non-limiting examples of patterned image devices include a DLP projector or another digital micromirror device, a two-dimensional array of LEDs, a two-dimensional array of lasers, and/or optically addressed light valves. In the illustrated example, the projector 56 includes a radiant energy source 58 such as a UV lamp, an image forming apparatus 60 operable to receive a source beam 62 from the radiant energy source 58 and generate a patterned image 64 to be projected onto the surface of the resin R, and optionally focusing optics 66, such as one or more lenses.

The image forming apparatus 60 may include one or more mirrors, prisms, and/or lenses and is provided with suitable actuators, and arranged so that the source beam 62 from the radiant energy source 58 can be transformed into a pixelated image 64 in an X-Y plane coincident with the surface of the resin R. In the illustrated example, the image forming apparatus 60 may be a digital micro-mirror device.

The projector 56 may incorporate additional components, such as actuators, mirrors, etc. configured to selectively move the image forming apparatus 60 or other part of the projector 56 with the effect of rastering or shifting the location of the patterned image 64 on the build surface 30. Stated another way, the patterned image 64 may be moved away from a nominal or starting location.

In addition to other types of radiant energy devices 20, the radiant energy device 20 may include a "scanned beam apparatus" used herein to refer generally to any device operable to generate a radiant energy beam of suitable energy level and other operating characteristics to cure the resin R and to scan the beam over the surface of the resin R in a desired pattern. For example, the scanned beam apparatus can include a radiant energy source 58 and a beam steering apparatus. The radiant energy source 58 may include any device operable to generate a beam of suitable power and other operating characteristics to cure the resin R. Non-limiting examples of suitable radiant energy sources 58 include lasers or electron beam guns.

In some instances, the apparatus 10 may include a material retention assembly 68 that may be configured to retain the resin support 26 in a predefined position along the support plate 14. In some instances, the material retention assembly 68 can include one or more pneumatic actuation zones 70 with each pneumatic actuation zone 70 configured to selectively interact with the resin support 26 by producing a force on a surface of the resin support 26 opposite the resin R.

The one or more pneumatic actuation zones 70 may apply a negative pressure on a first surface of the resin support 26 that is opposite to the resin R, or a second side of the resin support 26, to produce a suction or vacuum on the resin support 26. The negative pressure may retain the resin support 26 in a desired position along the support plate 14. The one or more pneumatic actuation zones 70 may also apply a positive pressure on the first surface of the resin support 26 that is opposite to the resin R, or a second side of the resin support 26, to produce a pushing force on the resin support 26. The positive pressure may release the resin support 26 from a component of the apparatus 10, such as the window 16, the material retention assembly 68, etc. As used herein, a "negative" pressure is any pressure that is less than an ambient pressure proximate to one or more pneumatic actuation zones 70 such that fluid may be drawn into the one or more pneumatic actuation zones 70. Conversely, a "positive" pressure is any pressure that is greater than an ambient pressure proximate to one or more pneumatic actuation zones 70 such that fluid may be exhausted from the one or more pneumatic actuation zones 70. Further, a "neutral" pressure is any pressure that is generally equal to an ambient pressure proximate to one or more pneumatic actuation zones 70.

In some examples, the pneumatic actuation zones 70 may be fluidly coupled with a pneumatic assembly 72 through various hoses and one or more ports. The pneumatic assembly 72 may include any device capable of providing a vacuum/suction and/or pushing a fluid, such as air or a process gas (e.g., nitrogen or argon), through the one or more pneumatic actuation zones 70. For instance, the pneumatic assembly 72 may include a pressurized fluid source that includes a compressor and/or a blower. The pneumatic assembly 72 may additionally or alternatively include any assembly capable of altering a pressure, such as a venturi vacuum pump. In some embodiments, one or more valves and/or switches may be coupled with the pneumatic assembly 72 and the one or more pneumatic actuation zones 70. The one or more valves and/or switches are configured to regulate a pressure to each of the one or more pneumatic actuation zones 70.

In some embodiments, the pneumatic actuation zone 70 includes one or more apertures 74 of any size and shape for interacting with the resin support 26. For instance, the apertures 74 may be any number and combination of holes, slits, or other geometric shapes defined by any component of the additive manufacturing apparatus such as a portion of the support plate 14. Additionally, or alternatively, the apertures 74 may be defined by a portion of the support plate 14 being formed from a porous material, or through any other assembly in which a fluid may be moved from a first side of the support plate 14 to a second side of the support plate 14 to interact with the resin support 26.

In some examples, the pneumatic actuation zone 70 may be defined by a plenum 76. The plenum 76 may be of any size and may be similar or varied from the shape of any remaining plenum 76. In some instances, a gasket may be positioned about a rim of the plenum 76. Additionally or alternatively, the material retention assembly 68 may include one or more clamps that compressively maintain the resin support 26 along the support plate 14.

With further reference to FIGS. 1A and 1B, a viscosity modification assembly 78 may be integrated within the support plate 14 and/or otherwise operably coupled with the resin support 26. The viscosity modification assembly 78 may be configured to apply a shearing stress to the resin R to alter (e.g., reduce) a viscosity of the resin R. Additionally or alternatively, the viscosity modification assembly 78 may be configured to heat the resin R to alter the viscosity of the resin R. It will be appreciated that in embodiments that heat the resin R to alter the viscosity of the resin R, the heat provided may be within a predefined range that is sufficient to alter the viscosity of the resin R without causing any cross-linking in the polymer.

In some embodiments, the viscosity modification assembly 78 may be configured to mechanically vibrate a portion of the support plate 14 to create a shearing stress on the resin R. For example, the viscosity modification assembly 78 may include a movement device 80 (e.g., a transducer) that is operably coupled with the support plate 14. The movement device 80 may be configured to vibrate at least a portion of the support plate 14 or any other module of the apparatus 10 that is then transferred to the resin R. Additionally and/or alternatively, the movement device 80 may be configured to convert electrical energy to ultrasonic mechanical pressure waves that are transferred to the resin R. For instance, the movement device 80 may be in the form of an ultrasonic vibrating device, such as one utilizing a piezoelectric transducer. In other embodiments, the viscosity modification assembly 78, in addition to or in lieu of the transducer, may include, alone or in conjunction with one or the other, a fluid, an acoustic, a motor (e.g., offset cam), a reciprocating piston, or any other movement device 80.

The movement device 80 may be operably coupled with the computing system 84. The computing system 84 may include a signal generator that supplies an electric impulse to the movement device 80, the voltage of which can be varied at different frequencies and with different waveshapes. The signal may, for example, be a pure sinusoidal wave or may be modulated with one or more other frequencies. Alternatively, the signal may be a stepped or spiked pulse. In some embodiments, the signal generator transmits a signal of between 20-80 kHz. For example, the signal is at about 60 kHz. The signal generator may, for example, transmit a constant amplitude signal at a constant frequency, or alternate one or both of these parameters. A power level can be selected as a percentage of maximum power.

In other embodiments, the viscosity modification assembly 78 may be configured to create a shearing stress on the resin R through other configurations without departing from the scope of the present disclosure. For example, the viscosity modification assembly 78 may be configured as a probe that may be adjacent and in physical contact with the resin support 26 and/or any other module that may relay the shearing stress to the resin R on the resin support 26. Additionally or alternatively, the viscosity modification assembly 78 may be configured as an ultrasonic or vibration plate that may be operably coupled with the resin support 26 and/or any other module of the apparatus 10 that may provide the shearing stress to the resin R on the resin support 26.

With further reference to FIGS. 1A and 1B, in various embodiments, a gasket 82 may be positioned between the window 16 and the support plate 14 to isolate movement of each of the window 16 and the support plate 14 from one another. By isolating movement of the window 16 from the support plate 14, degradation issues of the apparatus 10 caused through the operation of viscosity modification assembly 78 may be mitigated. In various examples, the gasket 82 may be formed from a motion attenuating material, such as any of a wide variety of resilient elastomers including, but not limited to, materials containing natural rubber and silicone.

As provided herein, in some instances, the viscosity modification assembly 78 may additionally or alternatively be capable of producing heat to alter the viscosity of the resin R. For example, fast heating processes, such as dielectric or microwave heating, can be used to avoid exposing the resin R to a long heating cycle before the temperature of use is reached.

The computing system 84 in FIGS. 1A and 1B is a generalized representation of the hardware and software that may be implemented to control the operation of the apparatus 10, including some or all of the stage 18, the drive system 28, the radiant energy device 20, the actuator assembly 46, the material retention assembly 68, the viscosity modification assembly 78, a movement device 80, actuators, and the various parts of the apparatus 10 described herein. The computing system 84 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, and for feedback control. Numerous aspects of the apparatus 10 may be subject to closed-loop control.

Optionally, the components of the apparatus 10 may be surrounded by a housing 86, which may be used to provide a shielding or inert gas (e.g., a "process gas") atmosphere using gas ports 88. Optionally, the pressure within the housing 86 could be maintained at a desired level greater than or less than atmospheric. Optionally, the housing 86 could be temperature and/or humidity controlled. Optionally, ventilation of the housing 86 could be controlled based on factors such as a time interval, temperature, humidity, and/or chemical species concentration. In some embodiments, the housing 86 can be maintained at a pressure that is different than an atmospheric pressure.

Figure 2:
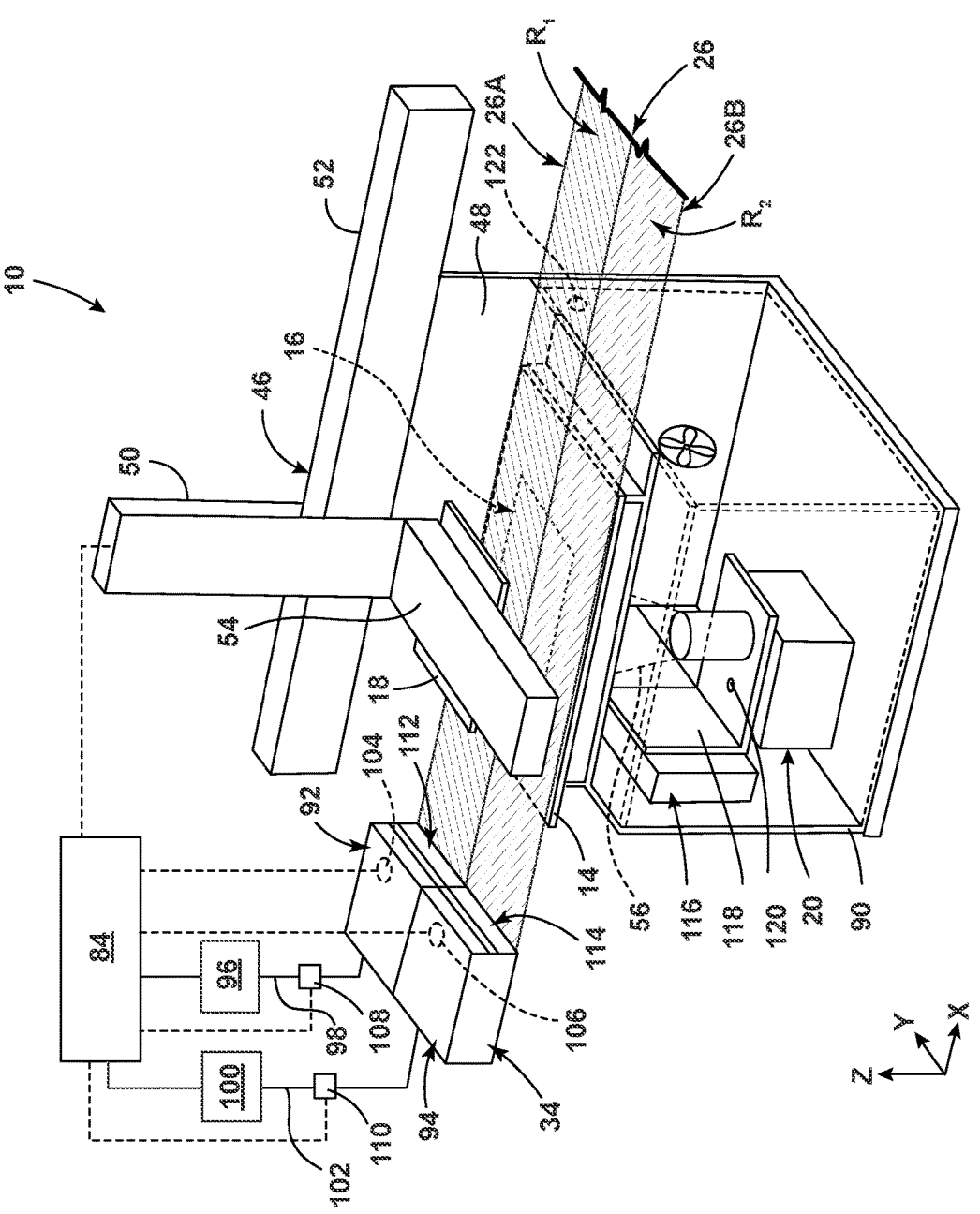
FIG. 2 is a front perspective view of the additive manufacturing apparatus in accordance with various aspects of the present disclosure.

Referring to FIG. 2, a perspective view of the additive manufacturing apparatus 10 including an actuator assembly 46 in accordance with exemplary embodiments of the present disclosure is illustrated. The exemplary apparatus 10 may include a base structure 90 and a static support 48 extending from the base structure 90. In the illustrated embodiment, the actuator assembly 46 is operably coupled with the static support 48 and is configured to change a position of the stage 18. However, it will be appreciated that the actuator assembly 46 may be operably coupled with any other component without departing from the scope of the present disclosure.

As illustrated, the actuator assembly 46 includes the first actuator 50 operably coupled with the static support 48. A second actuator 52 may be operably coupled with and moveable along the first actuator 50. Additionally, a third actuator 54 may be operably coupled with and moveable with the second actuator 52. The stage 18 may be operably coupled with and moveable along the third actuator 54. In various embodiments, when the stage 18 is moved along the X-axis direction through the use of the first actuator 50, the second actuator 52, the third actuator 54, and the stage 18 can move along the first actuator 50. When the stage 18 is moved in the Z-axis direction through the use of the second actuator 52, the third actuator 54, and the stage 18 move along the second actuator 52. When the stage 18 is moved in the Y-axis direction, the stage 18 moves along the third actuator 54. While the first actuator 50 is illustrated moving in the X-direction, the second actuator 52 is illustrated moving in the Z-axis direction, and the third actuator 54 is illustrated moving in the Y-direction in FIG. 2, it will be appreciated that each actuator may be coupled to and moveable with any other actuator and/or the stage 18 without departing from the scope of the present disclosure. It will be appreciated that the terms "first actuator," "second actuator," and "third actuator" are used herein for clarity purposes. It will be understood that the additive manufacturing apparatus 10 may include any one or more of the actuators without departing from the scope of the present disclosure.

With further reference to FIG. 2, the resin support 26 may be configured to retain first and second materials thereon. For example, the first material may be a first resin $R_1$ that may be used to build one or more layers of the component 12. The second material may be a second resin $R_2$, a cleaning material, and/or any other material that may be used to remove residual resin 124 (FIG. 11) from the component 12. As illustrated, the first material may be positioned adjacent to a second material in the Y-axis direction. As such, in some instances, the first resin $R_1$ may be positioned over a first segment of the window 16 as the resin support 26 is moved across the window 16. Likewise, the second resin $R_2$ may be positioned over a second segment of the window 16 that is offset from the first segment as the resin support 26 is moved across the window 16.

In various embodiments, such as the ones illustrated in FIG. 2, the resin support 26 may include a first portion 26A that is configured to support the first resin $R_1$ thereon and a second portion 26B that is configured to support the second resin $R_2$ thereon. Each of the first portion 26A of the resin support 26 and the second portion 26B of the resin support 26 may be operably coupled with the feed module 22 (FIG. 1A) and the take-up module 24 (FIG. 1A). In some instances, each of the first portion 26A of the resin support 26 and the second portion 26B of the resin support 26 may be operably coupled with a common first roller 22A within the feed module 22 and/or a common second roller 24A within the take-up module 24. In such instances, a translational movement length of the first portion 26A of the resin support 26 may be generally equal to a translational length of the second portion 26B of the resin support 26. However, it will be appreciated that the first portion 26A of the resin support 26 may be operably coupled with a different roller within the feed module 22 and the take-up module 24 from the second portion 26B of the resin support 26 such that each first portion 26A of the resin support 26 may be translated in the X-direction independently of one another.

With further reference to FIG. 2, the material depositor 34 may include a first reservoir 92 configured to retain the first resin $R_1$ and a second reservoir 94 configured to retain the second resin $R_2$. In some examples, the material depositor 34 can further include a first vessel 96 fluidly coupled with the first reservoir 92. A first conduit 98 extends from the first vessel 96 to direct the first resin $R_1$ from the first vessel 96 to the first reservoir 92. Likewise, the material depositor 34 can also include a second vessel 100 fluidly coupled with the second reservoir 94, A second conduit 102 extends from the second vessel 100 to direct the second resin $R_2$ from the second vessel 100 to the second reservoir 94.

In various embodiments, the material depositor 34 can further include a first volume sensor 104 and/or a second volume sensor 106. The first volume sensor 104 can be configured to provide signals to the computing system 84 related to a volume of the first resin $R_1$ within the first reservoir 92. The computing system 84 is configured to receive the monitoring signals and process such signals using predetermined algorithms to generate control signals for controlling a first regulator 108, which may allow or restrict flow of the first resin $R_1$ from the first vessel 96 to the first reservoir 92. Likewise, the second volume sensor 106 can be configured to provide signals to the computing system 84 related to a volume of the second resin $R_2$ within the second reservoir 94, The computing system 84 is configured to receive the monitoring signals and process such signals using predetermined algorithms to generate control signals for controlling a second regulator 110, which may allow or restrict flow of the second resin $R_2$ from the second vessel 100 to the first reservoir 92. In this manner, closed-loop control of the volume of the first resin $R_1$ and the volume of the second resin $R_2$ can be achieved. The first volume sensor 104 and the second volume sensor 106 may each be embodied as one or more imaging sensors or any other vision-based device. The first volume sensor 104 and the second volume sensor 106 may additionally and/or alternatively be configured as any other practicable proximity sensor, such as, but not limited to, an ultrasonic sensor, a radar sensor, a LIDAR sensor, or the like.

With further reference to FIG. 2, a first thickness assembly 112 can be used to control the thickness of the resin R applied to the resin support 26 as the first resin $R_1$ is deposited on the resin support 26. A second thickness assembly 114 can be used to control the thickness of the second resin $R_2$ applied to the resin support 26 as the second resin $R_2$ is deposited on the resin support 26. In the illustrated embodiment, the thickness of the first resin $R_1$ may be defined through the usage of a doctor blade and the thickness of the second resin $R_2$ may be defined through the usage of a doctor blade. In various embodiments, other material depositing apparatuses can be used separately or in combination with the first and second doctor blades, such as but not limited to, gravure rolls, metering rolls, weir-based cascades, direct die casting, and a combination thereof.

In some embodiments, a common thickness assembly may additionally or alternatively be used with the first thickness assembly 112 and the second thickness assembly 114. For instance, a common material depositing apparatus can be used for each of the first resin $R_1$ and the second resin $R_2$. In some instances, the first thickness assembly 112 may further define the thickness of the first resin $R_1$ and the second thickness assembly 114 may further define the thickness of the second resin $R_2$.

Still referring to FIG. 2, a radiant energy device 20 may be positioned within the base structure 90. As an option, the radiant energy device 20 may be coupled with an image movement device 116 through a bracket 118. The movement device 80 may include actuators, minors, etc. that are configured to selectively move the radiant energy device 20, or another part of the radiant energy device 20, with the effect of rastering or shifting the location of a patterned image 64 relative to the window 16. Stated another way, the patterned image 64 may be moved away from a nominal or starting location. This permits a single radiant energy device 20 to cover a larger build area, for example. This type of image projection may be referred to herein as a "tiled image".

Additionally or alternatively, the apparatus 10 may include a plurality of radiant energy devices 20 that are operably coupled with the build zone 32. Each of the plurality of radiant energy devices 20 may or may not be configured to translate below the window 16 and/or the support plate 14. Moreover, each of the plurality of radiant energy devices 20 may generate an image 64 that at least partially overlaps with an image 64 of an additional radiant energy device to form a stitched image on the resin R. In various embodiments, the images 64 from each of the plurality of radiant energy devices 20 may have some degree of overlap where that overlap is a single pixel, less than one pixel (for example, half a pixel), or more than one pixel. Further, in some embodiments, optics 66 may be optically coupled with the one or more radiant energy devices 20. In such instances, at least one of the one or more radiant energy devices 20 and/or the optics 66 may translate along the Y-axis and/or otherwise move through the movement device 80 to produce patterned images 64 on various portions of the resin support 26.

Further, in some embodiments, the apparatus 10 may include one or more sensors 120 that are configured to detect information related to a position of the stage 18, the resin support 26, and/or the radiant energy device 20. For example, the one or more sensors 120 may verify the position of the stage 18 and/or the resin support 26 each time the stage 18 and/or the resin support 26 are moved by the actuator assembly 46. Likewise, the one or more sensors 120 may verify the location of the radiant energy device 20 each time the radiant energy device 20 is moved by the movement device 80. In various embodiments, the one or more sensors 120 may be any combination of devices that is configured to provide information indicative of a position of the stage 18 and/or the resin support 26 or a location of the radiant energy device 20. For example, the one or more sensors 120 may include a gyroscope, an accelerometer, a proximity sensor, an image sensor, and/or any other practicable sensor.

In operation, the radiant energy device 20 and/or the movement assembly may produce heat. Accordingly, one or more vents and/or fans 122 may be positioned within the base structure 90 to remove heat from the base structure 90. The one or more fans 122 may be configured as any fluid movement device 80 that is capable of drawing the heated air from the base structure 90 to an area proximate to the base structure 90.

Referring now to FIG. 3, a method 200 for operating an additive manufacturing apparatus 10 is provided in accordance with various aspects of the present disclosure. The various steps of method 200 are schematically illustrated in FIGS. 4-11. The method 200 can be used to operate the additive manufacturing apparatus 10 or any other suitable additive manufacturing apparatus. It should be appreciated that the example method 200 is discussed herein only to describe example aspects of the present subject matter and is not intended to be limiting. Any of the steps within FIG. 3 may be omitted without departing from the scope of the present disclosure.

In the schematic drawings of FIGS. 4-11, the resin support 26 may include a first portion 26A that is configured to support the first material (e.g., the first resin $R_1$) thereon and a second portion 26B that is configured to support the second material (which may or may not be a second resin $R_2$) thereon.

Figures 4, 5:
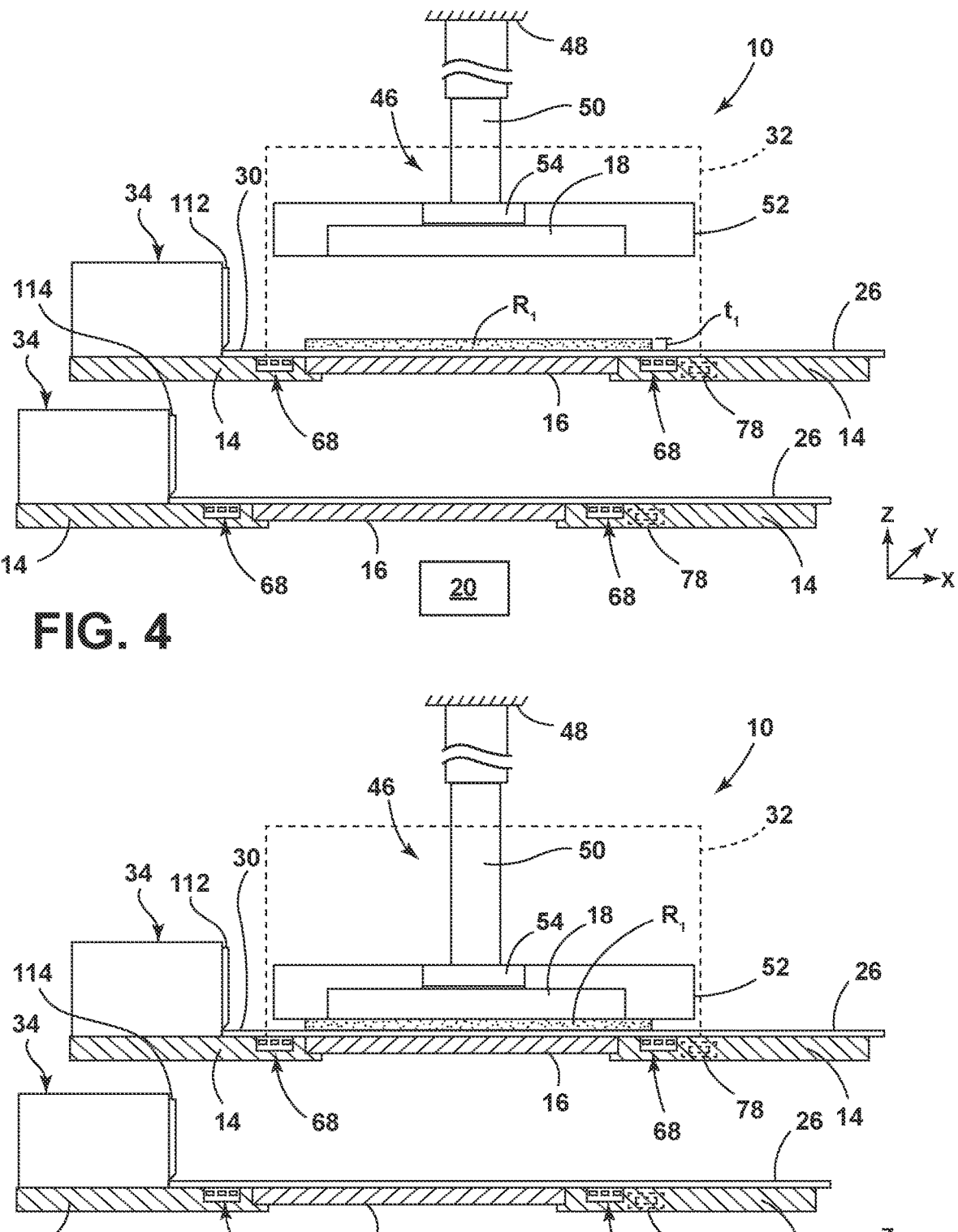
FIGS. 4-11 illustrate schematic views of the additive manufacturing apparatus during the method of operating the additive manufacturing apparatus described in FIG. 3 in accordance with various aspects of the present disclosure.

Referring now to FIGS. 3 and 4, the method 200 can include, at step 202, depositing a first material and/or a second material onto a resin support 26. As provided herein, the first material may be a first resin $R_1$ and the second material may be a second resin $R_2$, a cleaning material, and/or any other structure. As illustrated, the first resin $R_1$ may be positioned adjacent to a second resin $R_2$ in the Y-axis direction. As such, in some instances, the first resin $R_1$ may be positioned over a first segment of the window 16 as the resin support 26 is translated across the window 16. Likewise, the second resin $R_2$ may be positioned over a second segment of the window 16 that is offset from the first segment as the resin support 26 is translated across the window 16.

A first thickness $t_1$ of the layer of the uncured first resin $R_1$ may be defined by the first thickness assembly 112. While the first resin $R_1$ is deposited onto the first portion 26A of the resin support 26 and/or after the deposition of the first resin $R_1$ onto the first portion 26A of the resin support 26, the first portion 26A of the resin support 26 may be translated in an X-axis direction into a build zone 32.

As shown in FIGS. 3 and 5, at step 204, the method 200 can include placing the stage 18 in a first curing position by moving the stage 18 such that a working surface of the stage 18 and/or the component 12 retained by the stage 18 contacts the first resin $R_1$. As the stage 18 is moved to the first curing position, a working surface of the stage 18 and/or the component 12 retained by the stage 18 contacts the first resin $R_1$.

Figure 6:
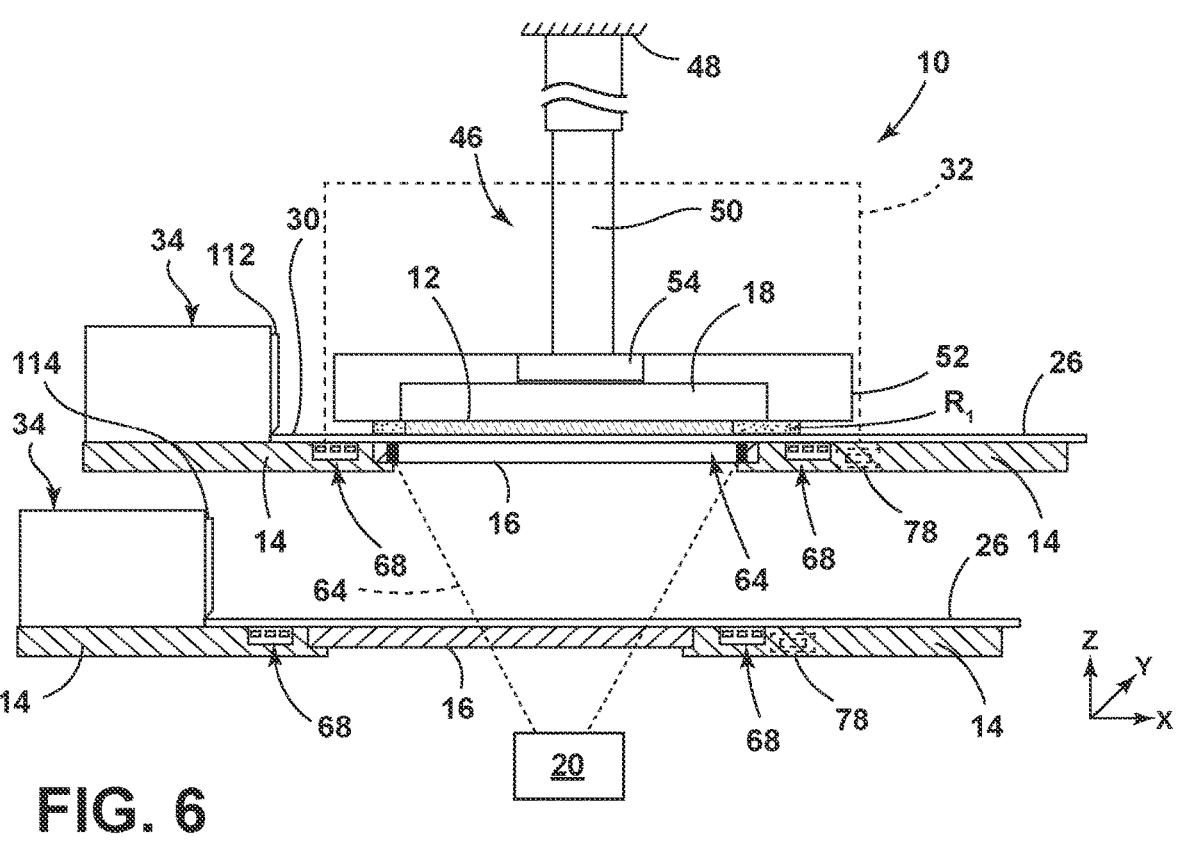

As shown in FIGS. 3 and 6, at step 206, the method 200 can include curing a portion of the first resin $R_1$ while the stage 18 is in the first curing position relative to a window 16 by applying radiant energy from a radiant energy device 20 through the window 16 and the resin support 26. As provided herein, the radiant energy may be in the form of a first patterned image 64 that is transmitted through at least a portion of the window 16. The portion of the first resin $R_1$ that is cured forms a layer of the component 12 that is retained by the stage 18. In the illustrated examples, the image 64 is shown having white portions and dark portions. The white portions may represent an area in which radiant energy is projected to form the image 64 while the darkened portions may represent an area in which radiant energy is not projected. It will be appreciated that the projected radiant energy may be of a common intensity and/or varied for a first portion of the image 64 relative to a second portion of the image 64.

Figure 7:
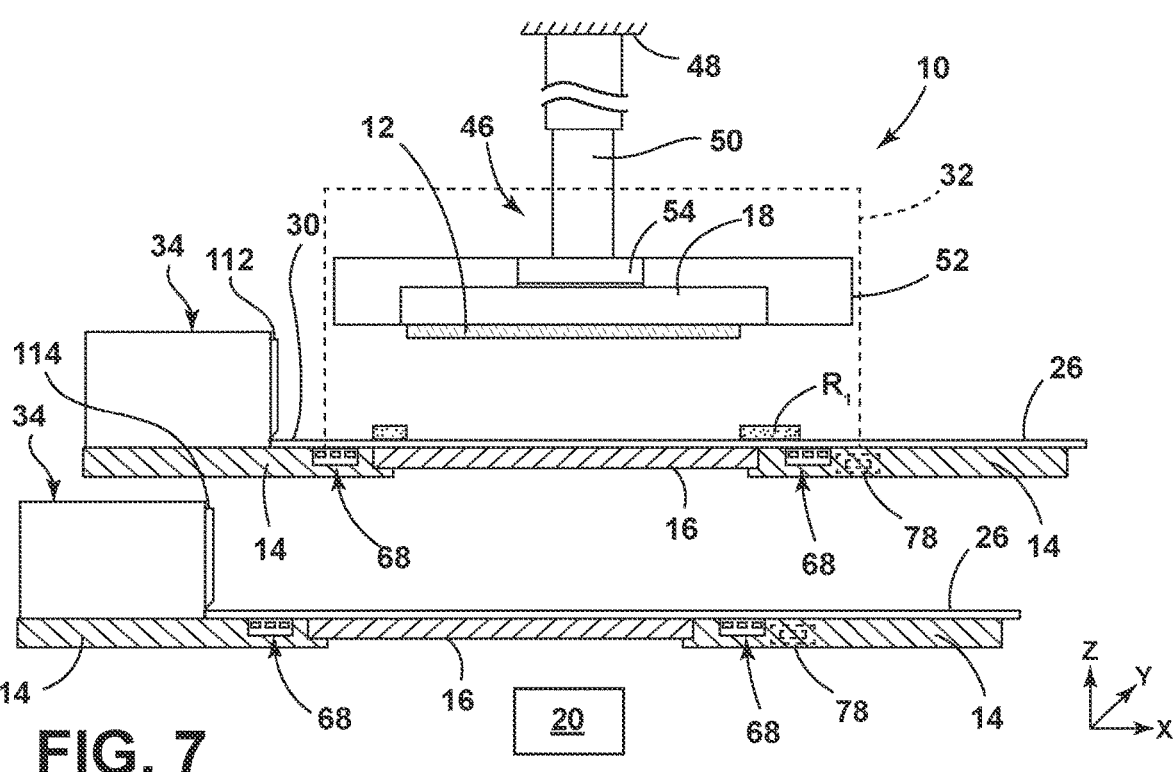

As shown in FIGS. 3 and 7, at step 208, the method 200 can include separating the component 12 from the resin support 26 by altering a position of the stage 18 through the actuator assembly 46.

Figure 8:
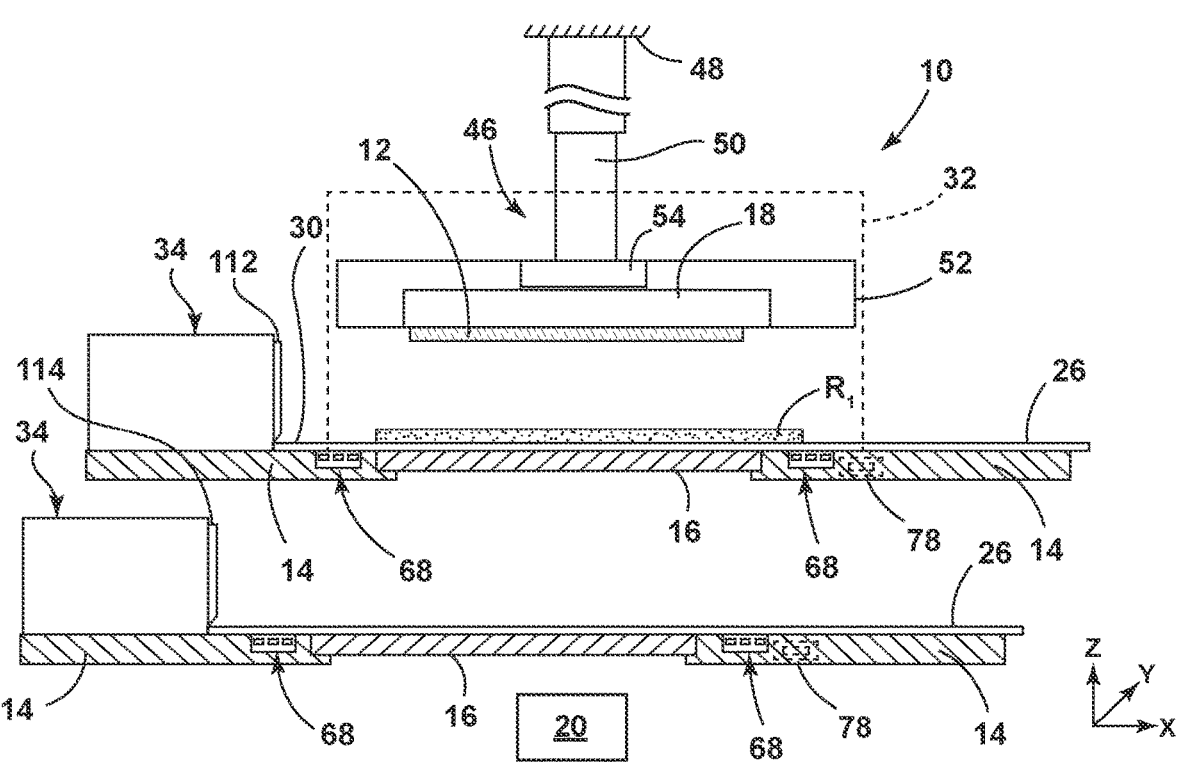

As shown in FIGS. 3 and 8, the method 200 can include, at step 210, depositing an additional layer of an uncured first resin $R_1$ onto the resin support 26. The additional layer of the uncured first resin $R_1$ may be defined by the first thickness assembly 112, which may be generally equal to the first thickness $t_1$ and/or varied from the first thickness $t_1$. While the first resin $R_1$ is deposited onto the resin support 26 and/or after the deposition of the first resin $R_1$ onto the resin support 26, the resin support 26 may be translated in an X-axis direction into a build zone 32.

Figure 9:
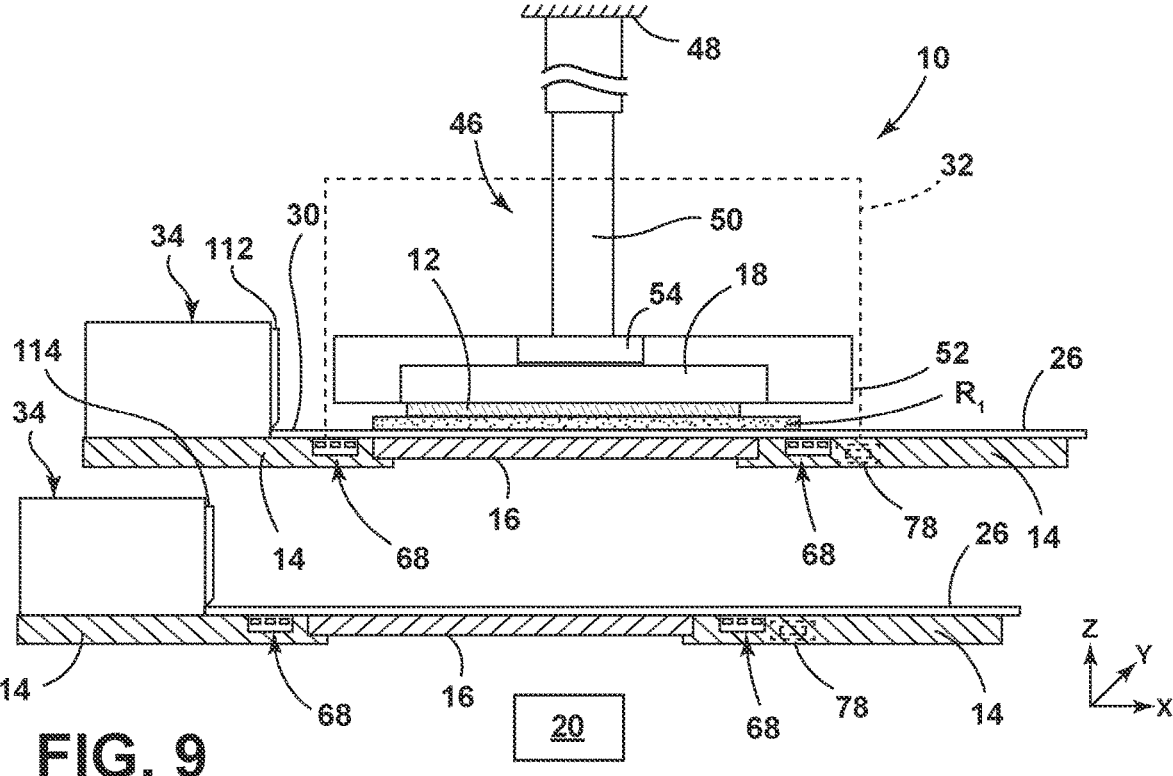

As shown in FIGS. 3 and 9, at step 212, the method 200 can include placing the stage 18 in a second curing position by moving the stage 18 such that the working surface of the component 12 retained by the stage 18 contacts the first resin $R_1$.

Figures 10, 11:
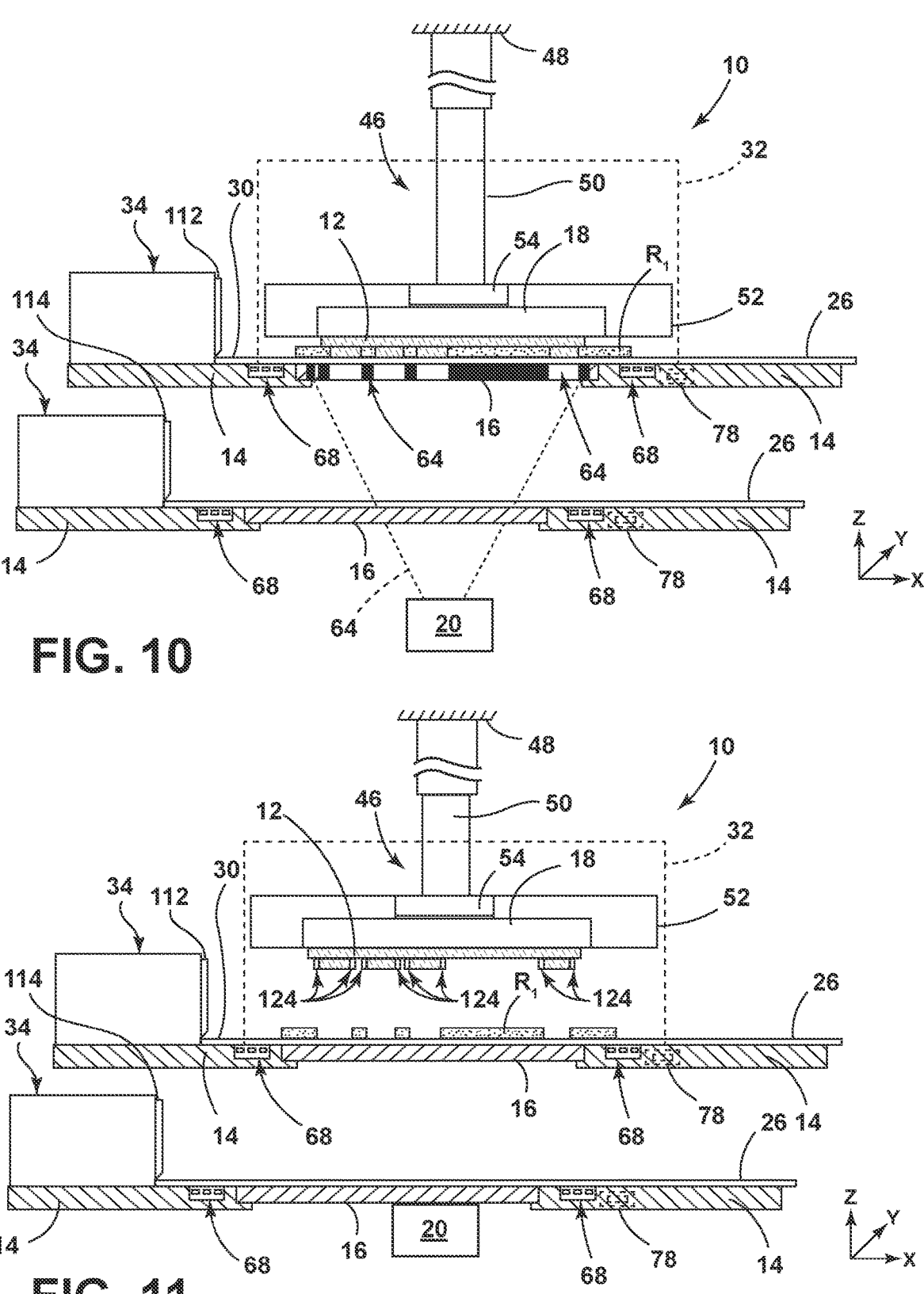

As shown in FIGS. 3 and 10, at step 214, the method 200 can include curing a portion of the first resin $R_1$ while the stage 18 is in the second curing position relative to the window 16 by applying radiant energy from a radiant energy device 20 through the window 16 and the resin support 26. As provided herein, the radiant energy may be in the form of a patterned image 64 that is transmitted through at least a portion of the window 16. The portion of the first resin $R_1$ that is cured forms a layer of the component 12 that is retained by the stage 18.

As shown in FIGS. 3 and 11, at step 216, the method 200 can include separating the component 12 from the resin support 26 by altering a position of the stage 18 through the actuator assembly 46. However, as shown in FIG. 11, in some instances, residual resin 124 may be attached to the component 12 once the component 12 is separated from the layer of uncured resin R. As provided herein, the residual resin 124 may be inadvertently coupled with the component 12. The residual resin 124 may be in the form of uncured resin and/or partially cured resin that is to be removed from the component 12.

While the illustrated example provides a method in which the first and second layers of the component 12 are both formed from the first resin $R_1$, any layer (or portion of the cured layer) of the component 12 may additionally or alternatively be formed from a second resin $R_2$ provided on the second portion 26B of the resin support 26. In examples in which the component 12 is formed from the first resin $R_1$ and the second resin $R_2$, the actuator assembly 46 may move the stage 18 to a curing position over the defined resin $R_1$, $R_2$.

As shown in FIG. 3 and referring generally to step 218, the method 200 can include conducting a removal operation 300, 400, 500, 600, and/or 700. Prior to and/or after a layer of the component 12 is formed, such as that generally described in step 204 and/or step 208, the residual resin 124 may be removed from the stage 18 and/or the component 12 prior to the formation of an additional layer of the component 12 and/or after a final layer of the component 12 is formed through a removal operation. The residual resin 124 may be removed through any one or more of the removal operations provided herein. In addition, it will be appreciated that the residual resin 124 may be removed through any other removal operation without departing from the scope of the present disclosure.

Referring now to FIGS. 12-32, one or more removal operations 300, 400, 500, 600, 700 may be performed to remove at least a portion of the residual resin 124 that remains on the component 12 and/or the stage 18. The removal operations 300, 400, 500, 600, 700 may be combined with any other removal operation 300, 400, 500, 600, 700. In such instances, the steps of the combined removal operations 300, 400, 500, 600, 700 may be performed in any order or combination without departing from the teachings provided herein.

As will be described in greater detail below, various removal operations 300, 400, 500, 600, 700 may move the stage 18 and/or the component 12 from a curing position, such as in a Y-axis direction or any other direction that is non-parallel to the direction of the movement of the first portion 26A of the resin support 26. Once moved, the stage 18 and/or the component 12 may have at least a portion of the residual resin 124 removed from the stage 18 and/or the component 12.

In some instances, the removal assembly may utilize a resin (e.g., the second resin $R_2$), which may be generally similar or different from one or more resins (e.g., the first resin $R_1$) used to form one or more layers of the component 12. Additionally, the resin (e.g., the second resin $R_2$) utilized during the removal operations 400, 500, 600, 700 described herein may be uncured, partially cured (e.g., below gel), cured to gel, and/or cured to beyond gel. Moreover, in some instances, the resin (e.g., the second resin $R_2$) may be a loaded resin and/or an unloaded resin that is supported by the resin support 26. In some examples, the resin (e.g., the second resin $R_2$) can be viscous and/or tacky. Therefore, the residual resin 124 may preferentially stick to the resin (e.g., the second resin $R_2$) rather than to the component 12. In various examples, a light penetration into a loaded resin can be less than in an unloaded resin. Thus, for a thicker cross section, the component 12 may be built in thin layers but could be cleaned through one or more removal operations 400, 500, 600, 700 in thicker layers. Or, the thickness of the resin (e.g., the second resin $R_2$) utilized during the removal operations 400, 500, 600, 700 can be thinner so there is less chance that the cleaning resin (e.g., the second resin $R_2$) will cure on to the component 12.

In several examples, the various components of the additive manufacturing apparatus 10 may be activated during the removal operation 300, 400, 500, 600, 700 to further assist in removing the residual resin 124 from the component 12. For instance, the one or more pneumatic actuation zones 70 of the material retention assembly 68 may apply a negative pressure on the first surface of the resin support 26 that is opposite to the component 12, or a second side of the resin support 26, to produce a suction or vacuum on the resin support 26. The negative pressure may retain the resin support 26 in a desired position along the support plate 14 during the removal operations 300, 400, 500, 600, 700. The one or more pneumatic actuation zones 70 may also apply a positive pressure on the first surface of the resin support 26 that is opposite to the component 12, or a second side of the resin support 26, to produce a pushing force on the resin support 26. The positive pressure may release the resin support 26 from a component 12 of the apparatus 10, such as the window 16, the material retention assembly 68, etc. In addition, the positive pressure may press the resin support 26 into one or more features of the component 12 thereby contacting the residual resin 124 and possibly removing the residual resin 124 from the component 12.

Further, in some examples, the viscosity modification assembly 78 may additionally or alternatively be activated during the removal operation 300, 400, 500, 600, 700. The movement device 80 may be configured to vibrate at least a portion of the support plate 14 or any other module of the apparatus 10 that is then transferred to the component 12 to separate the residual resin 124 from the component 12.

Figure 12:
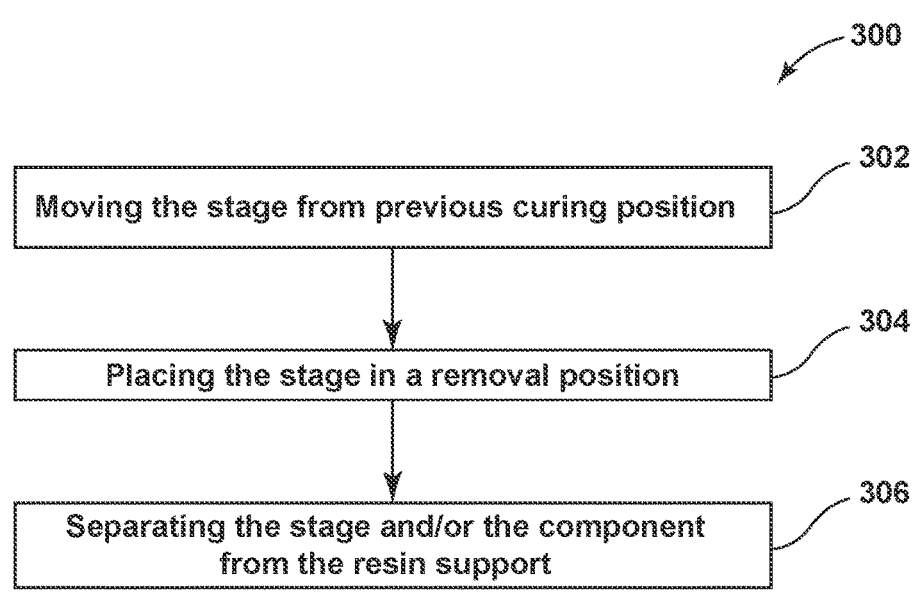
FIG. 12 is a method of operating the additive manufacturing apparatus in accordance with various aspects of the present disclosure.

With further reference to FIGS. 12-15, in some instances, the removal operation may include contacting the component 12 with a second portion 26B of the resin support 26, or other surface, that is laterally offset from the position of the first resin $R_1$ in the Y-axis direction (and/or in any other direction). In some instances, the second portion 26B of the resin support 26 can be generally free of resin (e.g., the first resin $R_1$ and/or the second resin $R_2$). One such operation is shown in FIG. 12 and schematically illustrated in FIGS. 13-15. The removal operation 300 can be used to operate the additive manufacturing apparatus 10 or any other suitable additive manufacturing apparatus. It should be appreciated that the example operation 300 is discussed herein only to describe example aspects of the present subject matter and is not intended to be limiting. Any of the steps within FIG. 12 may be omitted without departing from the scope of the present disclosure. In addition, the removal operation 300 described in FIG. 12 may be combined with any other removal operation 400, 500, 600, 700 described herein. In such instances, the steps of the combined removal operations may be performed in any order or combination without departing from the teachings provided herein.

Figure 13:
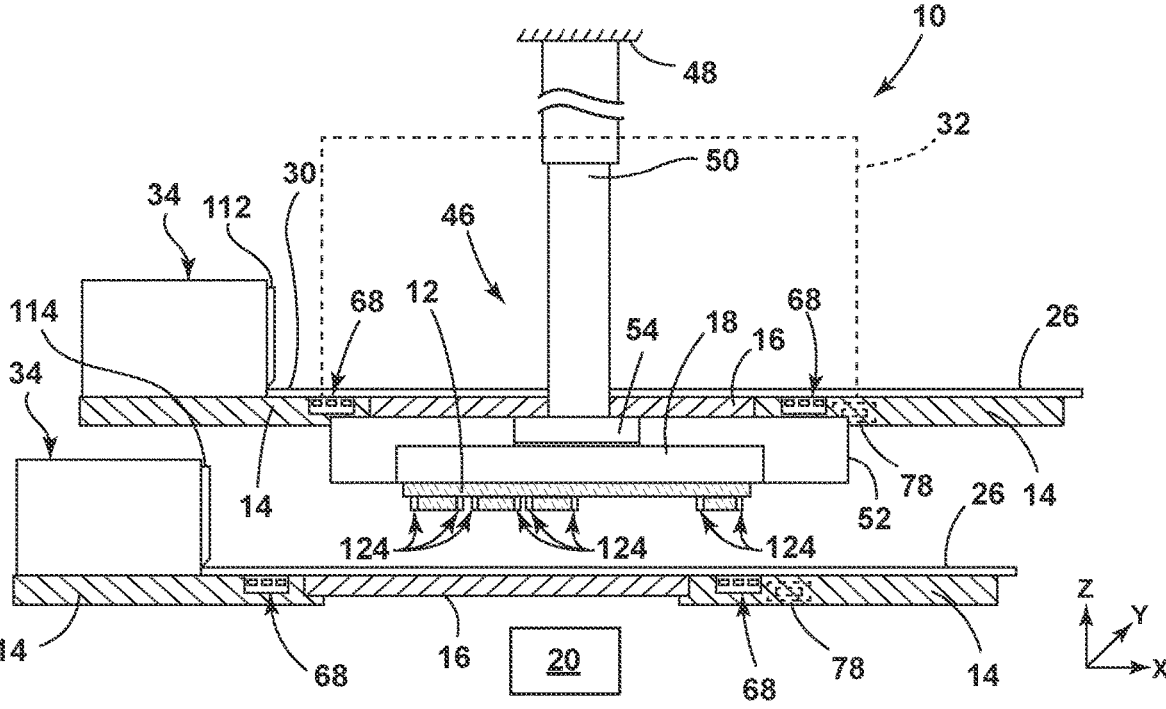
FIGS. 13-15 illustrate schematic views of the additive manufacturing apparatus during the method of operating the additive manufacturing apparatus described in FIG. 12 in accordance with various aspects of the present disclosure.

As shown in FIGS. 12 and 13, at step 302, the removal operation 300 can include moving the stage 18 from the previous curing position through activation of the actuator assembly 46.

Figure 14:
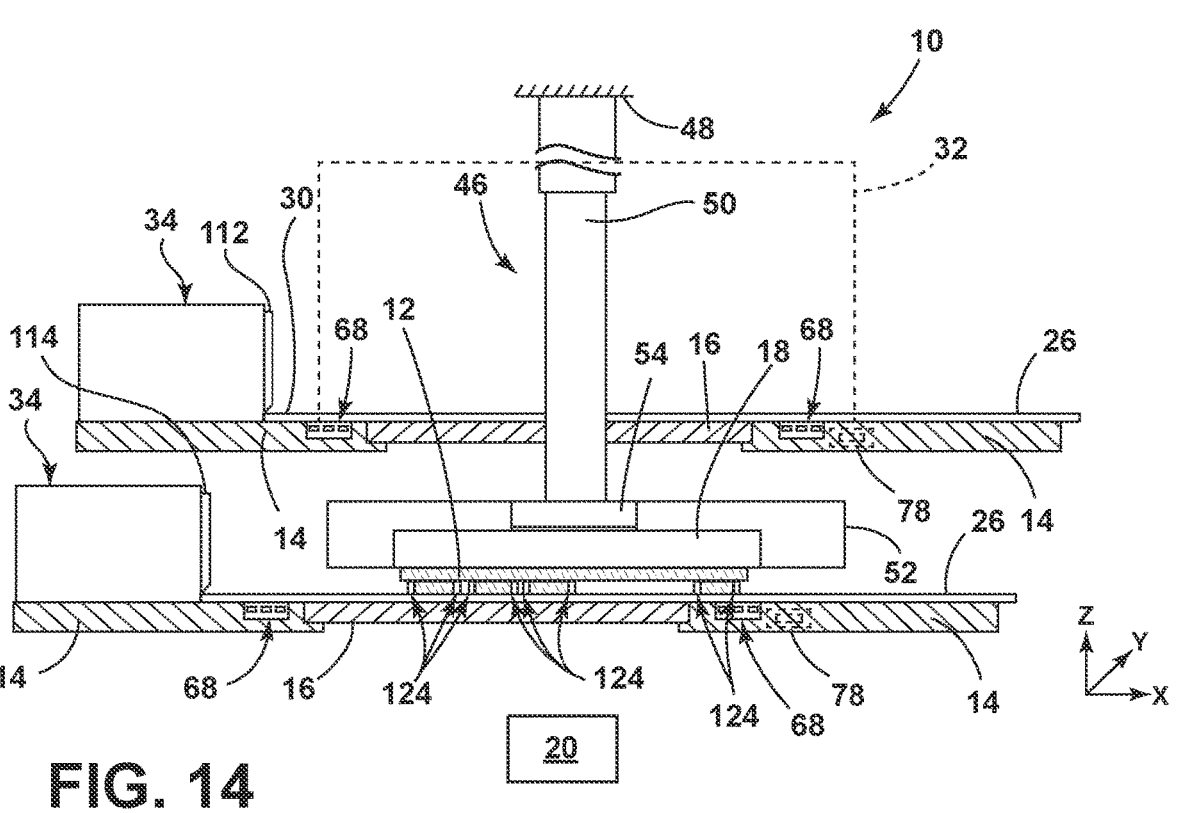

As shown in FIGS. 12 and 14, at step 304, the removal operation 300 can include placing the stage 18 in a removal position by moving the stage 18 such that a working surface of the stage 18 and/or the component 12 retained by the stage 18 contacts the second portion 26B of the resin support 26. As such, the stage 18 may be a first distance from the resin support 26 when positioned in the curing position and a second distance from the resin support 26 when positioned in the removal position. The first distance can be larger than, equal to, or less than the second distance. In some instances, the viscosity modification assembly 78 may be activated while the working surface is in contact with the resin support 26.

Figure 15:
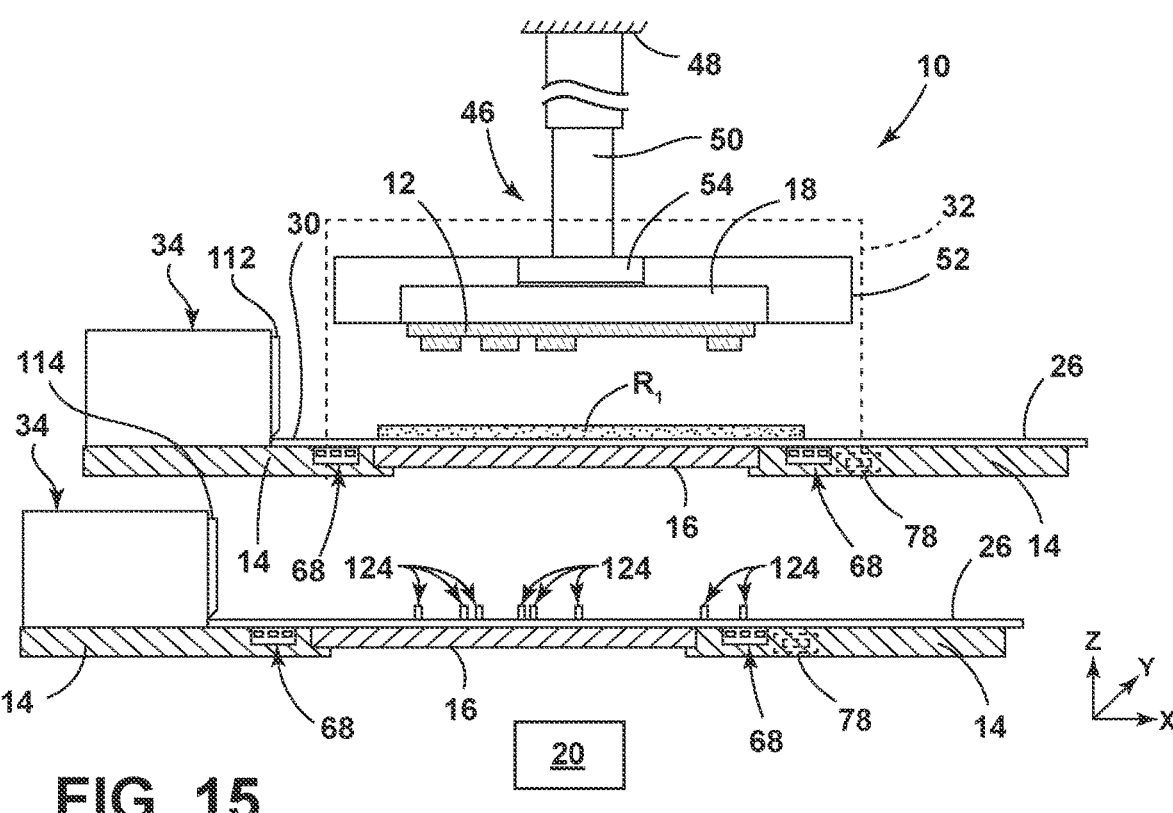

As shown in FIGS. 12 and 15, at step 306, the removal operation can include separating the stage 18 and/or the component 12 from the resin support 26 by altering a position of the stage 18 through the actuator assembly 46. As the stage 18 and/or the component 12 are separated from the resin support 26, at least a portion of the residual resin 124 may be retained on the resin support 26.

With at least a portion of the residual resin 124 separated from the component 12, an additional layer of the first resin $R_1$ may be positioned on the first portion 26A of the resin support 26 and an additional layer of the component 12 may be formed. Alternatively, with at least a portion of the residual resin 124 removed, the component 12 may be removed from the stage 18. Alternatively still, the removal operation 300 may be performed a second time to further remove any residual resin 124 remaining on the component 12. Alternatively still, additional removal operations 400, 500, 600, 700 may be performed to further remove any residual resin 124 remaining on the component 12.

Figure 16:
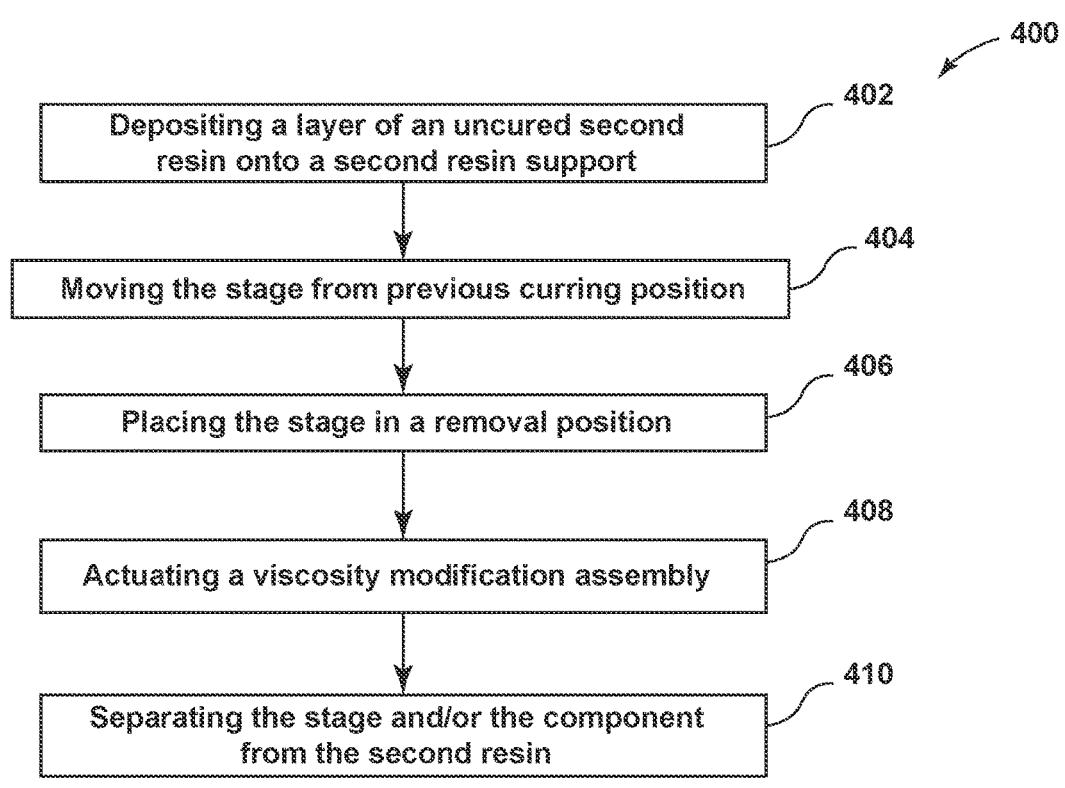
FIG. 16 is a method of operating the additive manufacturing apparatus in accordance with various aspects of the present disclosure.

With further reference to FIGS. 16-19, in some instances, the removal operation may include contacting the component 12 with a layer of uncured resin R on the first portion 26A of the resin support 26 and/or the second portion 26B of the resin support 26. One such operation is shown in FIG. 16 and schematically illustrated in FIGS. 17-19. The removal operation 400 can be used to operate the additive manufacturing apparatus 10 or any other suitable additive manufacturing apparatus. It should be appreciated that the example operation 400 is discussed herein only to describe example aspects of the present subject matter and is not intended to be limiting. Any of the steps within FIG. 16 may be omitted without departing from the scope of the present disclosure. In addition, the removal operation 400 described in FIG. 16 may be combined with any other removal operation 300, 500, 600, 700 described herein. In such instances, the steps of the combined removal operations may be performed in any order or combination without departing from the teachings provided herein.

Figure 17:
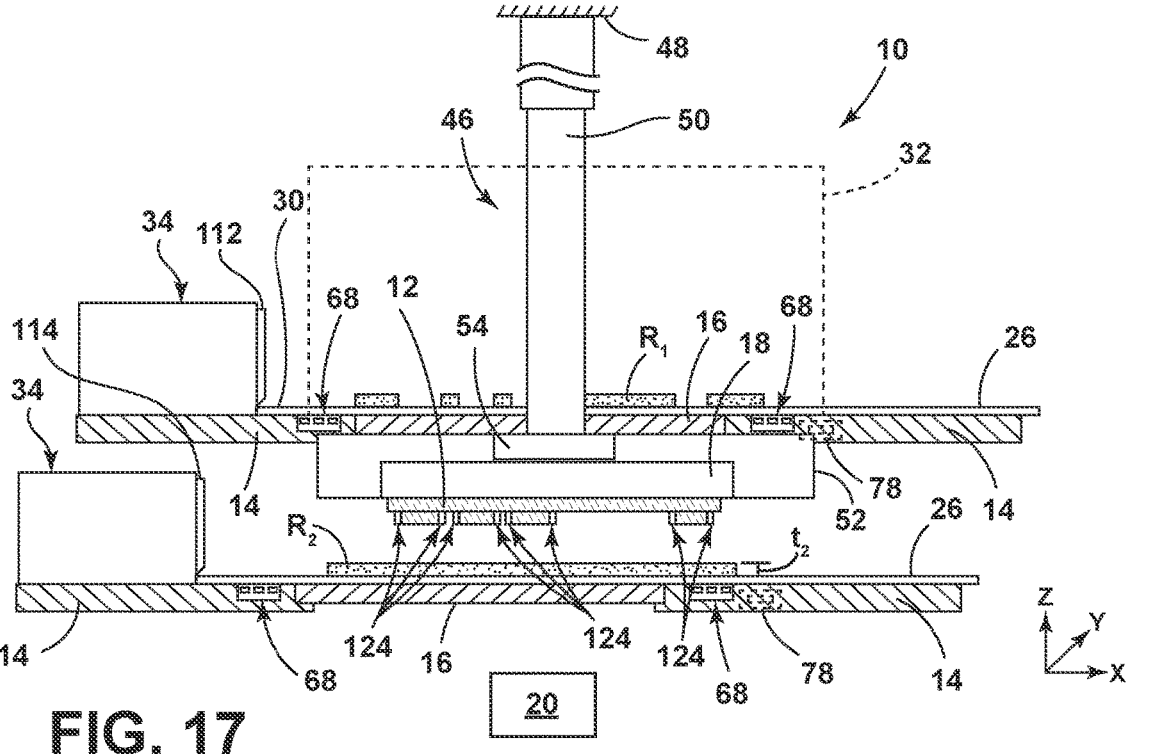
FIGS. 17-19 illustrate schematic views of the additive manufacturing apparatus during the method of operating the additive manufacturing apparatus described in FIG. 16 in accordance with various aspects of the present disclosure.

As shown in FIGS. 16 and 17, at step 402, the removal operation 400 can include depositing a layer of an uncured second resin $R_2$ onto the second portion 26B of the resin support 26. A second thickness $t_2$ of the layer of the uncured second resin $R_2$ may be defined by the second thickness assembly 112. The second thickness $t_2$ may be generally equal to the first thickness $t_1$ or different from the first thickness $t_1$. Prior to the second resin $R_2$ being deposited onto the second portion 26B of the resin support 26, while the second resin $R_2$ is deposited onto the second portion 26B of the resin support 26, and/or after the deposition of the second resin $R_2$ onto the second portion 26B of the resin support 26, the resin support 26 may be moved in an X-axis direction.

In addition, as shown in FIGS. 16 and 17, at step 404, the removal operation 400 can include moving the stage 18 from the previous curing position through activation of the actuator assembly 46.

Figure 18:
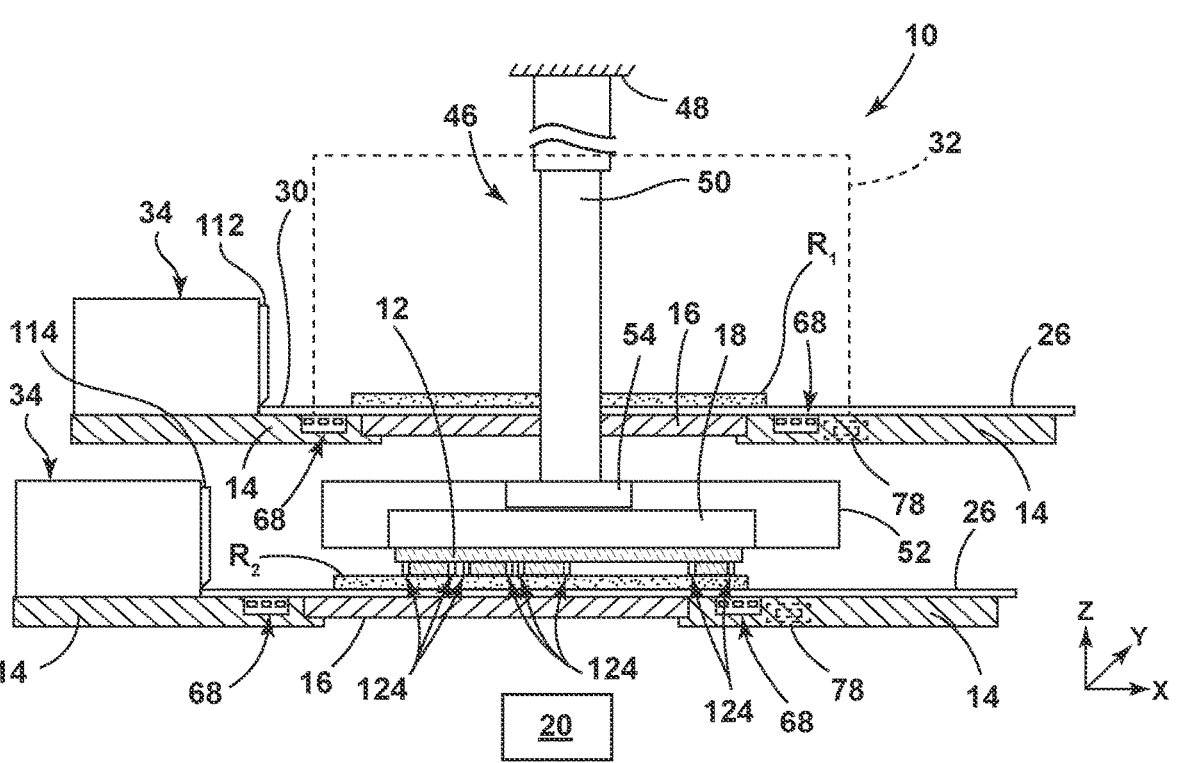

As shown in FIGS. 16 and 18, at step 406, the removal operation 400 can include placing the stage 18 in a removal position by moving the stage 18 such that a working surface of the stage 18 and/or the component 12 retained by the stage 18 contacts the second resin $R_2$. In some instances, the stage 18 may be a first distance from the resin support 26 when positioned in the curing position and a second distance from the resin support 26 when positioned in the removal position. The first distance can be larger than, equal to, or less than the second distance.

In some instances, with the stage 18 in the removal position, at step 408, the removal operation 400 can include actuating a viscosity modification assembly 78. As provided herein, the viscosity modification assembly 78 may be configured to mechanically vibrate a portion of the support plate 14. The vibration may be transferred to the component 12 thereby encouraging the residual resin 124 to separate from the component 12.

Figure 19:
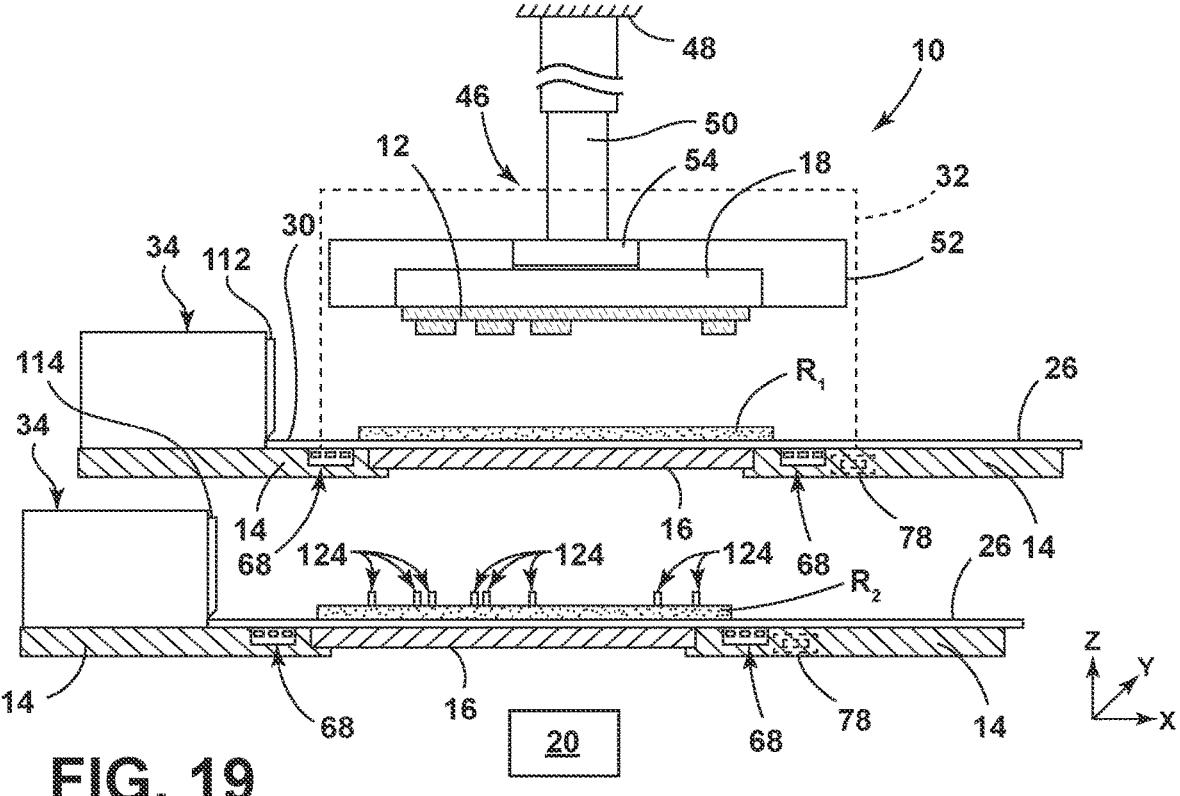

As shown in FIGS. 16 and 19, at step 410, the removal operation 400 can include separating the stage 18 and/or the component 12 from the second resin $R_2$ by altering a position of the stage 18 through the actuator assembly 46. As the stage 18 and/or the component 12 are separated from the second portion 26B of the resin support 26, at least a portion of the residual resin 124 may be retained on the resin support 26.

With at least a portion of the residual resin 124 separated from the component 12, an additional layer of the uncured first resin $R_1$ may be positioned on the first portion 26A of the resin support 26 and an additional layer of the component 12 may be formed. Alternatively, with at least a portion of the residual resin 124 removed, the component 12 may be removed from the stage 18. Alternatively still, the removal operation 400 may be performed a second time to further remove any residual resin 124 remaining on the component 12. Alternatively still, additional removal operations 300, 500, 600, 700 may be performed to further remove any residual resin 124 remaining on the component 12.

Figure 20:
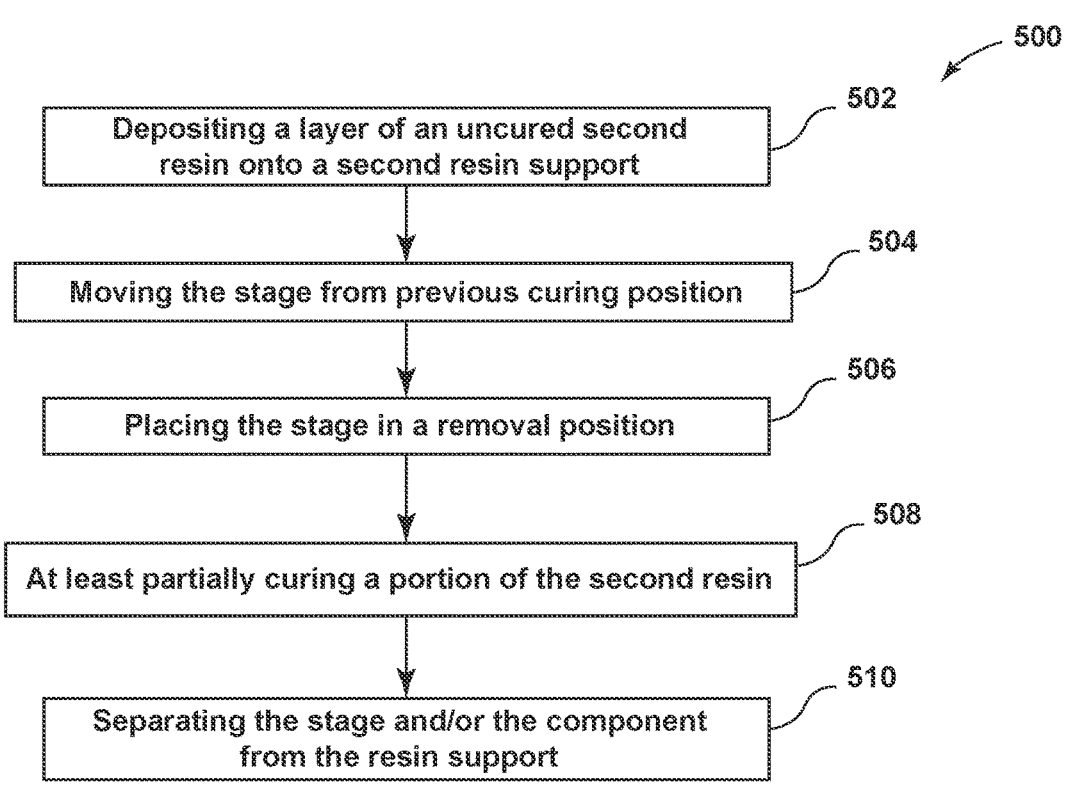
FIG. 20 is a method of operating the additive manufacturing apparatus in accordance with various aspects of the present disclosure.

With further reference to FIGS. 20-24, in some instances, the removal operation may include contacting the component 12 with a layer of a second resin $R_2$ and at least partially curing the second resin $R_2$ on the resin support 26. One such operation is shown in FIG. 20 and schematically illustrated in FIGS. 21-24. The removal operation 500 can be used to operate the additive manufacturing apparatus 10 or any other suitable additive manufacturing apparatus. It should be appreciated that the example operation 500 is discussed herein only to describe example aspects of the present subject matter and is not intended to be limiting. Any of the steps within FIG. 20 may be omitted without departing from the scope of the present disclosure. In addition, the removal operation 500 described in FIG. 20 may be combined with any other removal operation 300, 400, 600, 700 described herein. In such instances, the steps of the combined removal operations may be performed in any order or combination without departing from the teachings provided herein.

Figure 21:
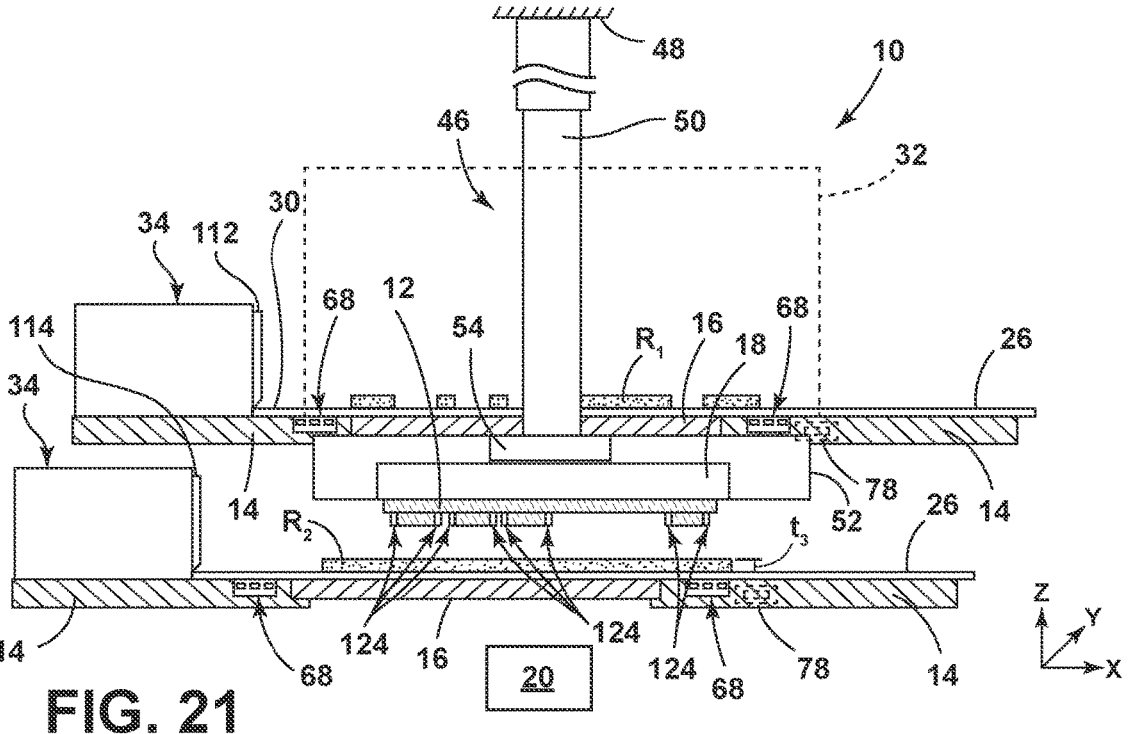
FIGS. 21-24 illustrate schematic views of the additive manufacturing apparatus during the method of operating the additive manufacturing apparatus described in FIG. 20 in accordance with various aspects of the present disclosure.

As shown in FIGS. 20 and 21, at step 502, the removal operation 500 can include depositing a layer of an uncured second resin $R_2$ onto the second portion 26B of the resin support 26. The second resin $R_2$ has a third thickness $t_3$ that may be defined by the thickness assembly 112. The third thickness $t_3$ may be generally equal to the first thickness $t_1$ and/or the second thickness $t_2$ or different than each of the first thickness $t_1$ and/or the second thickness $t_2$. While the second resin $R_2$ is deposited onto the resin support 26 and/or after the deposition of the second resin $R_2$ onto the resin support 26, the resin support 26 may be moved in an X-axis direction into a build zone 32.

In addition, as shown in FIGS. 20 and 21, at step 504, the removal operation 400 can include moving the stage 18 from the previous curing position through activation of the actuator assembly 46.

Figures 22, 23:
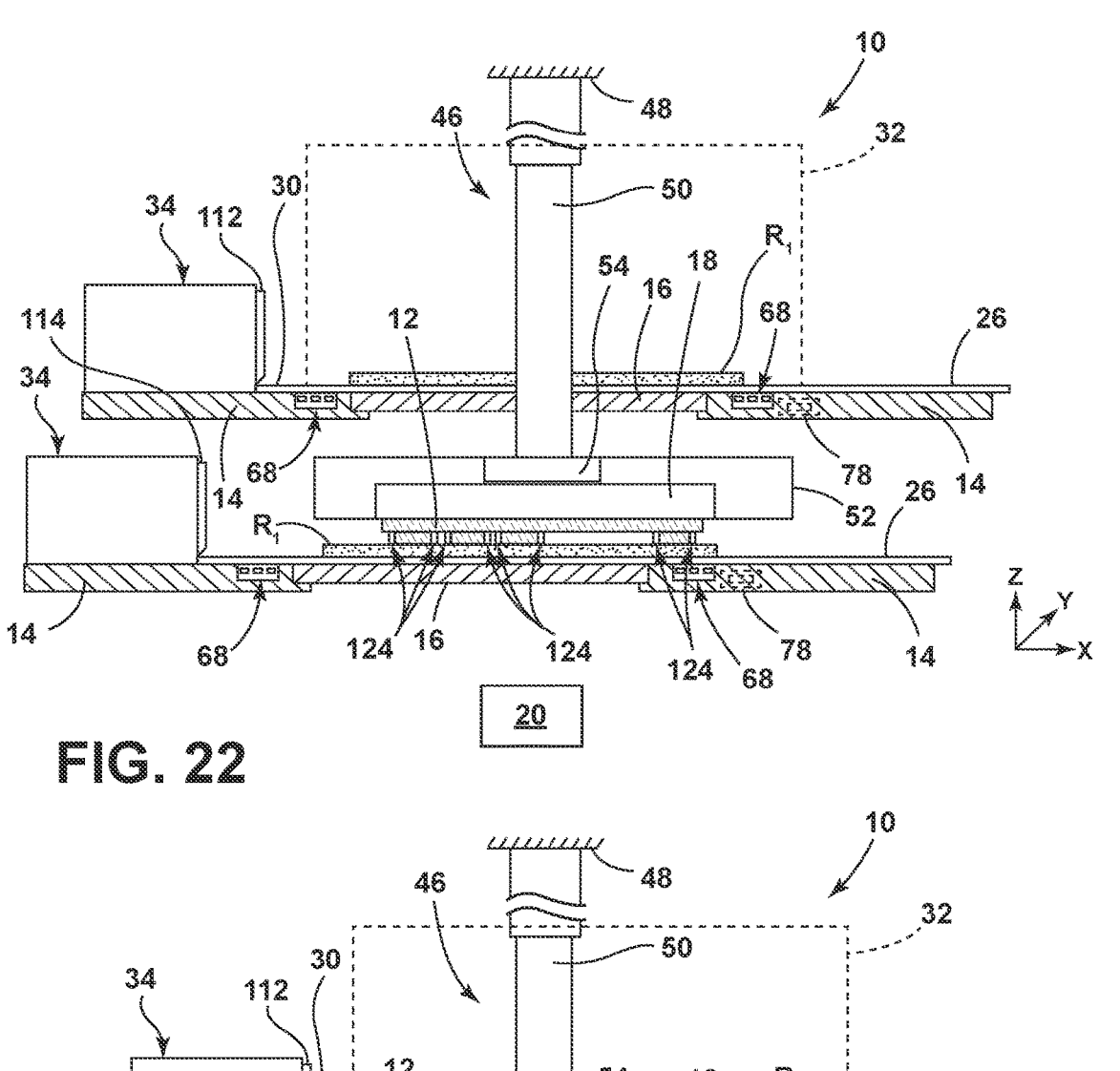

As shown in FIGS. 20 and 22, at step 506, the removal operation 500 can include placing the stage 18 in a removal position by moving the stage 18 such that a working surface of the stage 18 and/or the component 12 retained by the stage 18 contacts the second resin $R_2$ on the second portion 26B of the resin support 26.

As shown in FIGS. 20 and 23, at step 508, the removal operation can include at least partially curing a portion of the second resin $R_2$ supported on the second portion 26B of the resin support 26. In a partially cured state, the second resin $R_2$ may be maintained in a gel-like state to further enhance the tackiness of the second resin $R_2$ on the second portion 26B of the resin support 26.

In some instances, the at least partially cured portion may generally correspond to a negative image 64 or inverse of a geometry of the last formed layer (e.g., the layer formed in step 214 in FIG. 3) of the component 12. In some instances, the at least partially cured portions of the second resin $R_2$ may be generally similar to the geometry of the last formed layer of the component 12 and may be offset in the X-axis direction and/or the Y-axis direction relative to the component 12. In various embodiments, the at least partially cured portion of the second resin $R_2$ may additionally or alternatively be any other design in which at least a portion of the second resin $R_2$ is at least partially cured.

Figure 24:
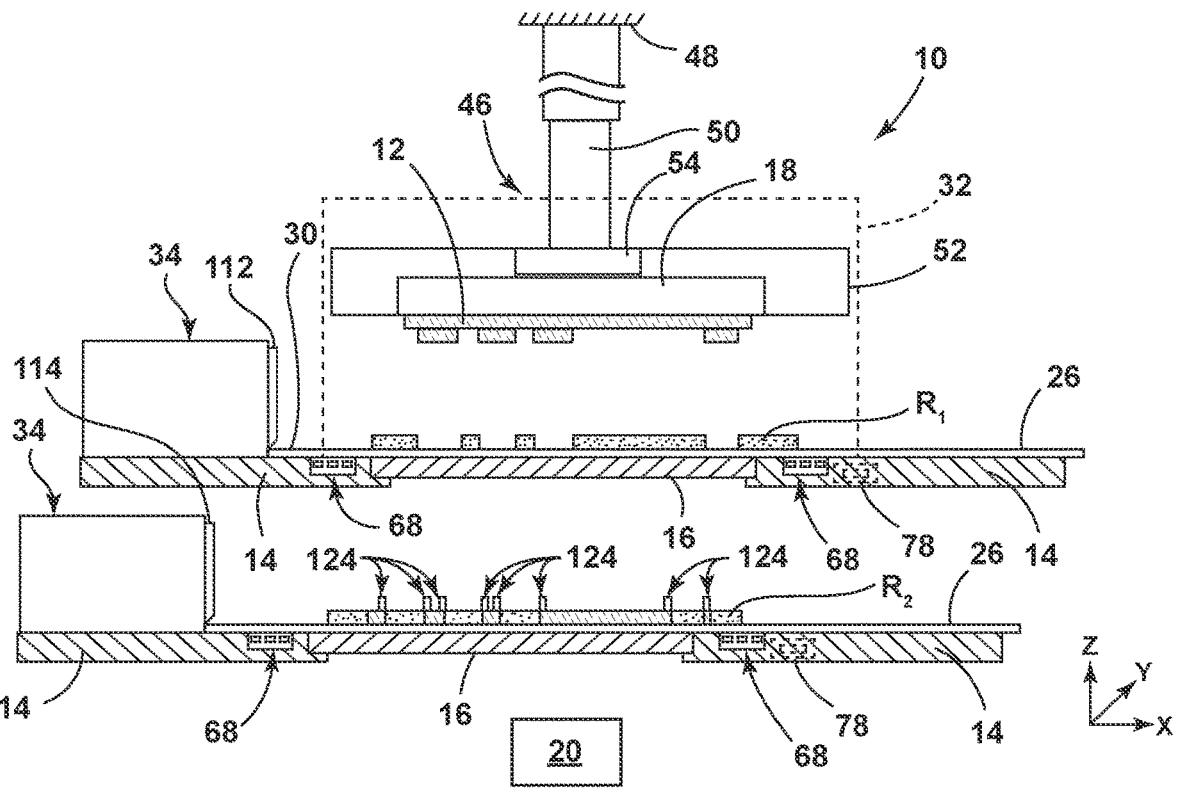

As shown in FIGS. 20 and 24, at step 510, the removal operation 500 can include separating the stage 18 and/or the component 12 from the second resin $R_2$ by altering a position of the stage 18 through the actuator assembly 46. As the stage 18 and/or the component 12 are separated from the resin support 26, at least a portion of the residual resin 124 may be retained by the at least partially cured portion (and/or the uncured portion) of the second resin $R_2$ on the resin support 26. In addition, the at least partially cured portions of the second resin $R_2$ may further adhere to the second portion 26B of the resin support 26.

With at least a portion of the residual resin 124 separated from the component 12, an additional layer of the uncured first resin $R_1$ may be positioned on the first portion 26A of the resin support 26 and an additional layer of the component 12 may be formed. Alternatively, with at least a portion of the residual resin 124 removed, the component 12 may be removed from the stage 18. Alternatively still, the removal operation 400 may be performed a second time to further remove any residual resin 124 remaining on the component 12. Alternatively still, additional removal operations 300, 500, 600, 700 may be performed to further remove any residual resin 124 remaining on the component 12.

Figure 25:
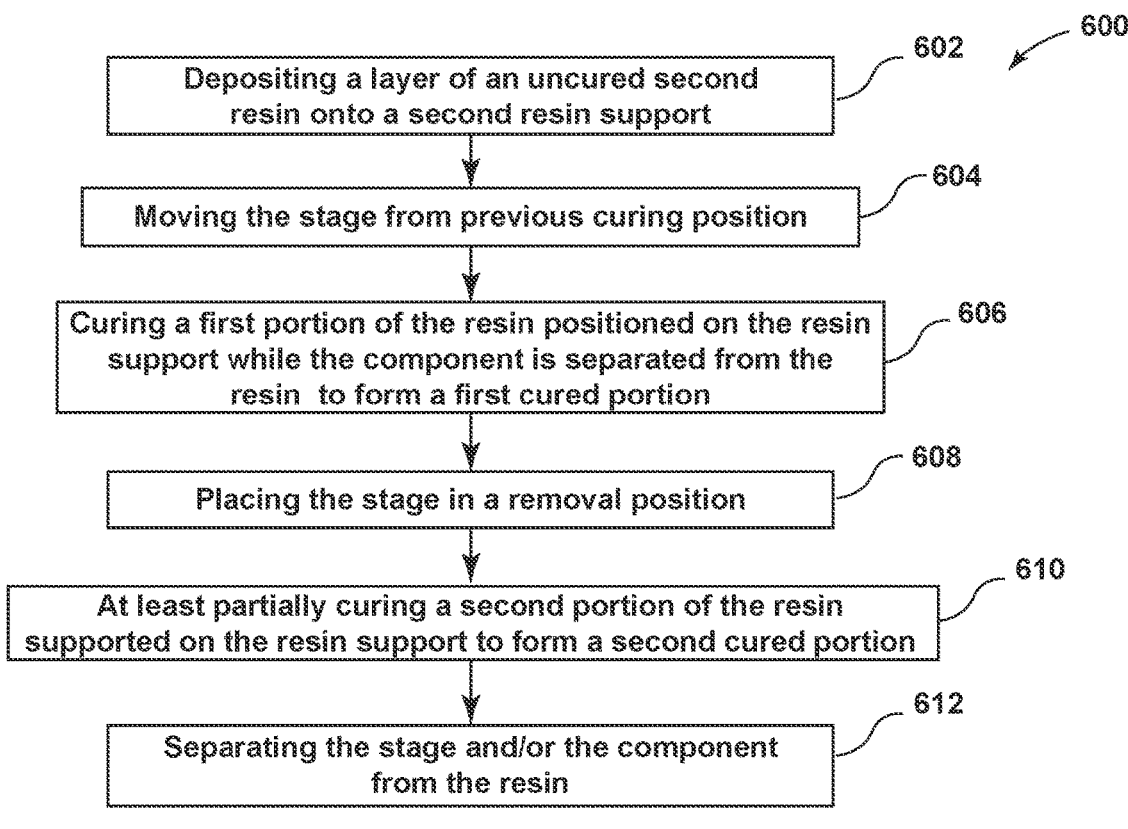
FIG. 25 is a method of operating the additive manufacturing apparatus in accordance with various aspects of the present disclosure.

With further reference to FIGS. 25-29, in some instances, the removal operation may include contacting the component 12 with a layer of at least partially cured resin R on the resin support 26. One such operation is shown in FIG. 25 and schematically illustrated in FIGS. 26-29. The removal operation 600 can be used to operate the additive manufacturing apparatus 10 or any other suitable additive manufacturing apparatus. It should be appreciated that the example operation 600 is discussed herein only to describe example aspects of the present subject matter and is not intended to be limiting. Any of the steps within FIG. 25 may be omitted without departing from the scope of the present disclosure. In addition, the removal operation 600 described in FIG. 25 may be combined with any other removal operation 300, 400, 500, 700 described herein. In such instances, the steps of the combined removal operations may be performed in any order or combination without departing from the teachings provided herein.

Figure 26:
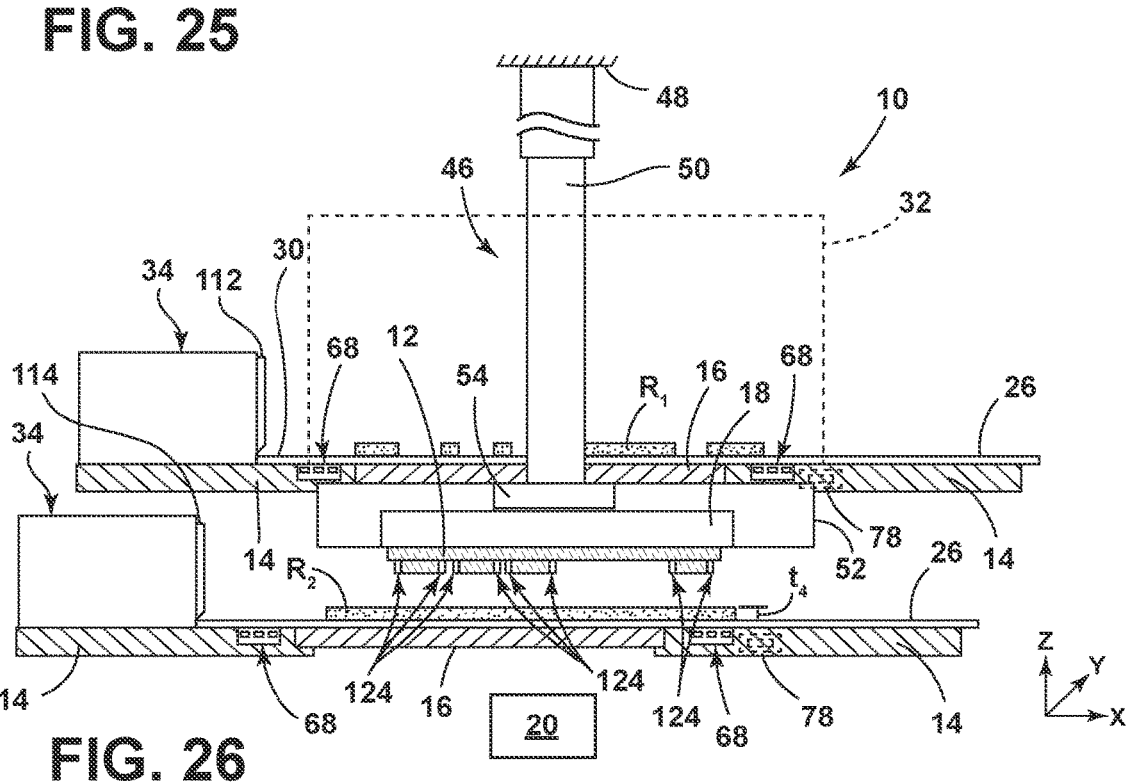
FIGS. 26-29 illustrate schematic views of the additive manufacturing apparatus during the method of operating the additive manufacturing apparatus described in FIG. 25 in accordance with various aspects of the present disclosure.

As shown in FIGS. 25 and 26, at step 602, the removal operation 600 can include depositing a layer of an uncured second resin $R_2$ onto a resin support 26. A fourth thickness $t_4$ of the layer of the uncured resin R may be defined by the thickness assembly 112. The fourth thickness $t_4$ may be generally equal to the first thickness $t_1$, the second thickness $t_2$, and/or the third thickness $t_3$ or different than each of the first thickness $t_1$, the second thickness $t_2$, and/or the third thickness $t_3$. While the resin R is deposited onto the resin support 26 and/or after the deposition of the resin R onto the resin support 26, the resin support 26 may be moved in an X-axis direction into a build zone 32. It will be appreciated that each of the thicknesses $t_1$, $t_2$, $t_3$, $t_4$ herein are described sequentially for clarity purposes. As such, it will be appreciated that various implementations can include any of the thicknesses without any others. For example, the apparatus 10 need not use a resin R of a third thickness $t_3$ prior to using the resin R of the fourth thickness $t_4$, and so on.

In addition, as shown in FIGS. 25 and 26, at step 604, the removal operation 400 can include moving the stage 18 from the previous curing position through activation of the actuator assembly 46.

Figures 27, 28:
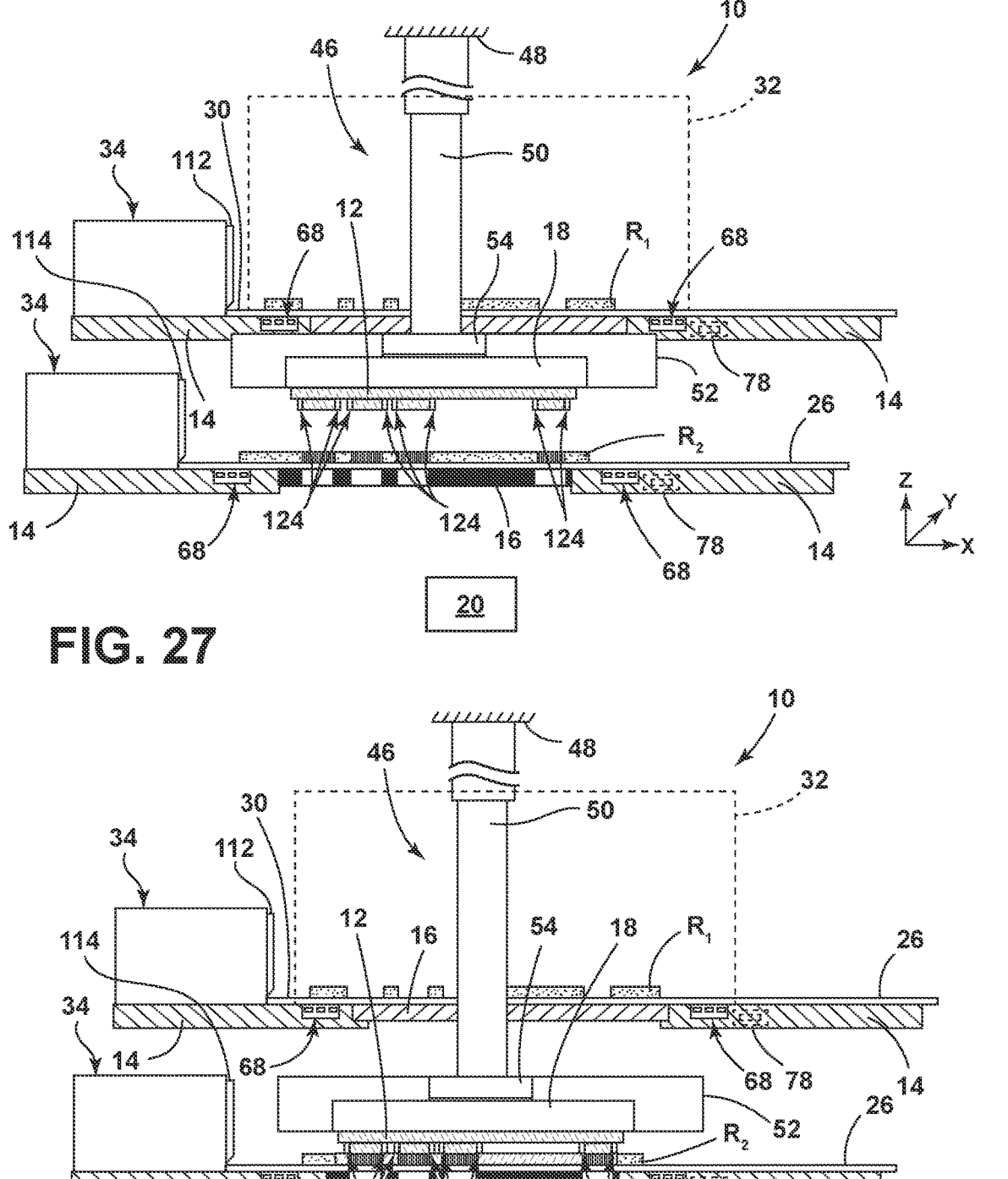

As shown in FIGS. 25 and 27, at step 606, the removal operation 600 can include curing a first portion of the second resin $R_2$ positioned on the second portion 26B of the resin support 26 while the component 12 is separated from the second resin $R_2$ to form a first cured portion. In some instances, a geometry of the first cured portion may generally align with the last formed layer (e.g., the layer formed in step 214 in FIG. 3) of the component 12. In some instances, the first cured portion of the second resin $R_2$ may be generally similar to the geometry of the last formed layer of the component 12 and may be offset in the X-axis direction and/or the Y-axis direction relative to the component 12. In various embodiments, the first cured portion may additionally or alternatively be any other design in which at least a portion of the second resin $R_2$ is at least partially cured.

As shown in FIGS. 25 and 28, at step 608, the removal operation 600 can include placing the stage 18 in a removal position by moving the stage 18 such that a working surface of the stage 18 and/or the component 12 retained by the stage 18 contacts the second resin $R_2$ on the resin support 26.

As shown in FIGS. 25 and 28, at step 610, the removal operation 600 can include at least partially curing a second portion of the second resin $R_2$ supported on the second portion 26B of the resin support 26 to form a second cured portion. In some instances, the second cured portion may be at least partially offset from the first cured portion. In various embodiments, the second cured portion may generally correspond to a negative image 64 or inverse of a geometry of the first cured portion. In other embodiments, the second cured portion may additionally or alternatively be any other design in which at least a portion of the second resin $R_2$ is cured with the working surface of the component 12 and/or the stage 18 in contact with the second resin $R_2$.

Figure 29:
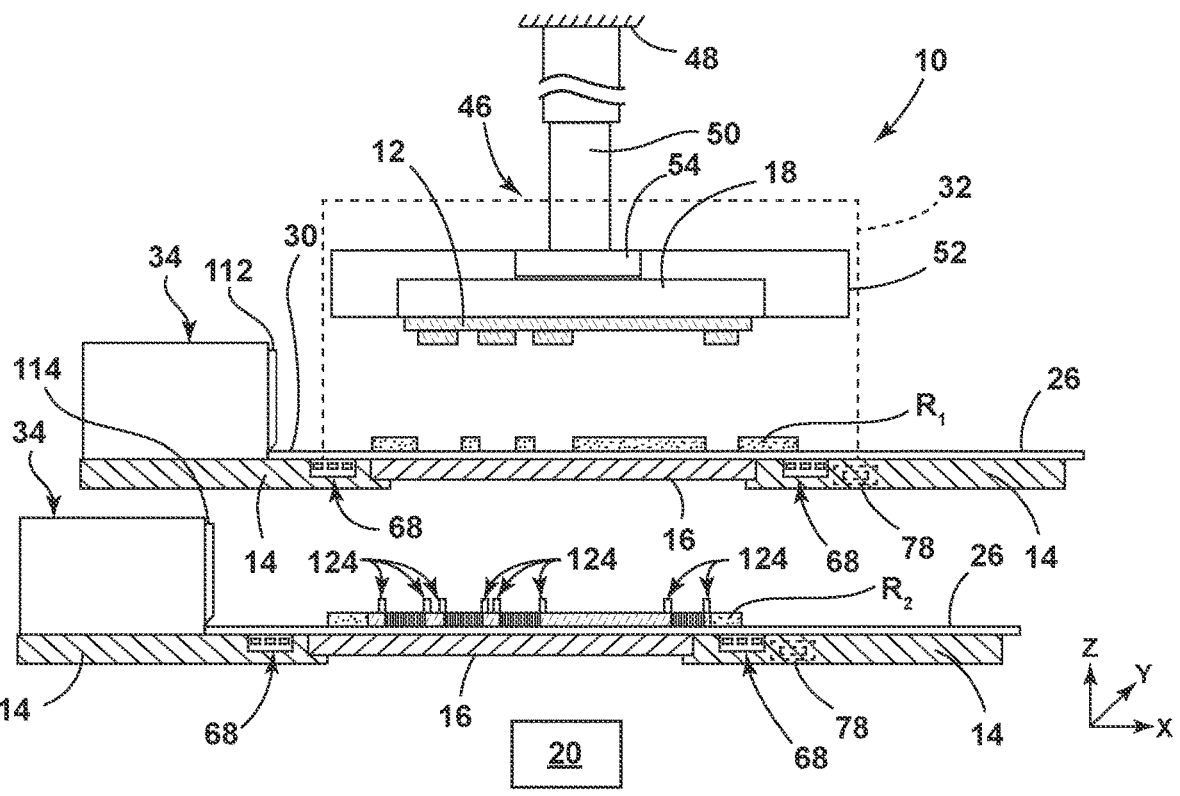

As shown in FIGS. 25 and 29, at step 612, the removal operation 600 can include separating the stage 18 and/or the component 12 from the second resin $R_2$ by altering a position of the stage 18 through the actuator assembly 46. As the stage 18 and/or the component 12 are separated from the second resin $R_2$, at least a portion of the residual resin 124 may be retained by the first cured portion, the second cured portion, and/or any uncured portions of the resin R on the resin support 26. In addition, the at least partially cured portions of the second resin $R_2$ may further adhere to the second portion 26B of the resin support 26.

With at least a portion of the residual resin 124 separated from the component 12, an additional layer of uncured resin R may be moved into the build zone 32 and an additional layer of the component 12 may be formed. Alternatively, with at least a portion of the residual resin 124 removed, the component 12 may be removed from the stage 18. Alternatively still, the removal operation 600 may be performed a second time to further remove any residual resin 124 remaining on the component 12. Alternatively still, additional removal operations 300, 400, 500, 700 may be performed to further remove any residual resin 124 remaining on the component 12.

Figure 30:
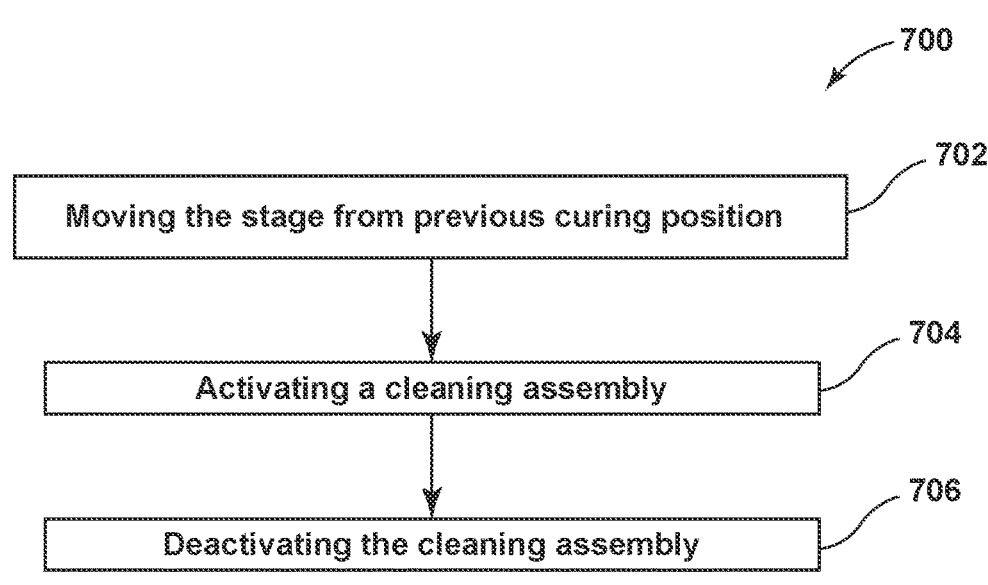
FIG. 30 is a method of operating the additive manufacturing apparatus in accordance with various aspects of the present disclosure.
Figure 31:
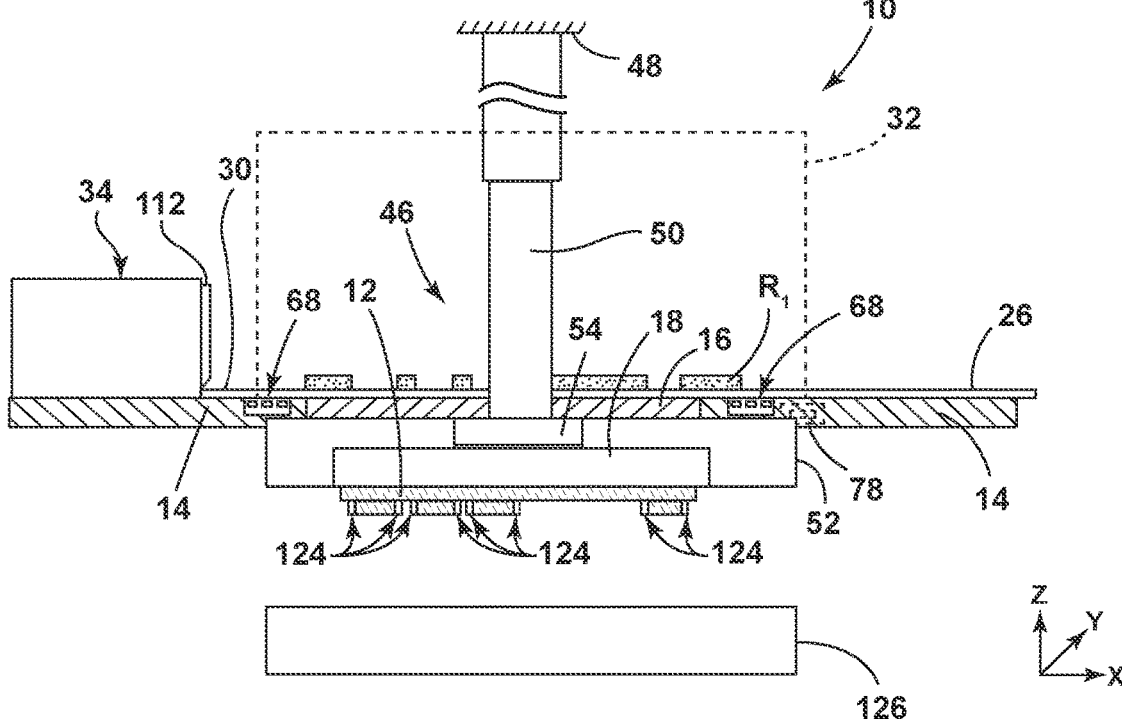
FIGS. 31 and 32 illustrate schematic views of the additive manufacturing apparatus during the method of operating the additive manufacturing apparatus described in FIG. 30 in accordance with various aspects of the present disclosure.
Figure 32:
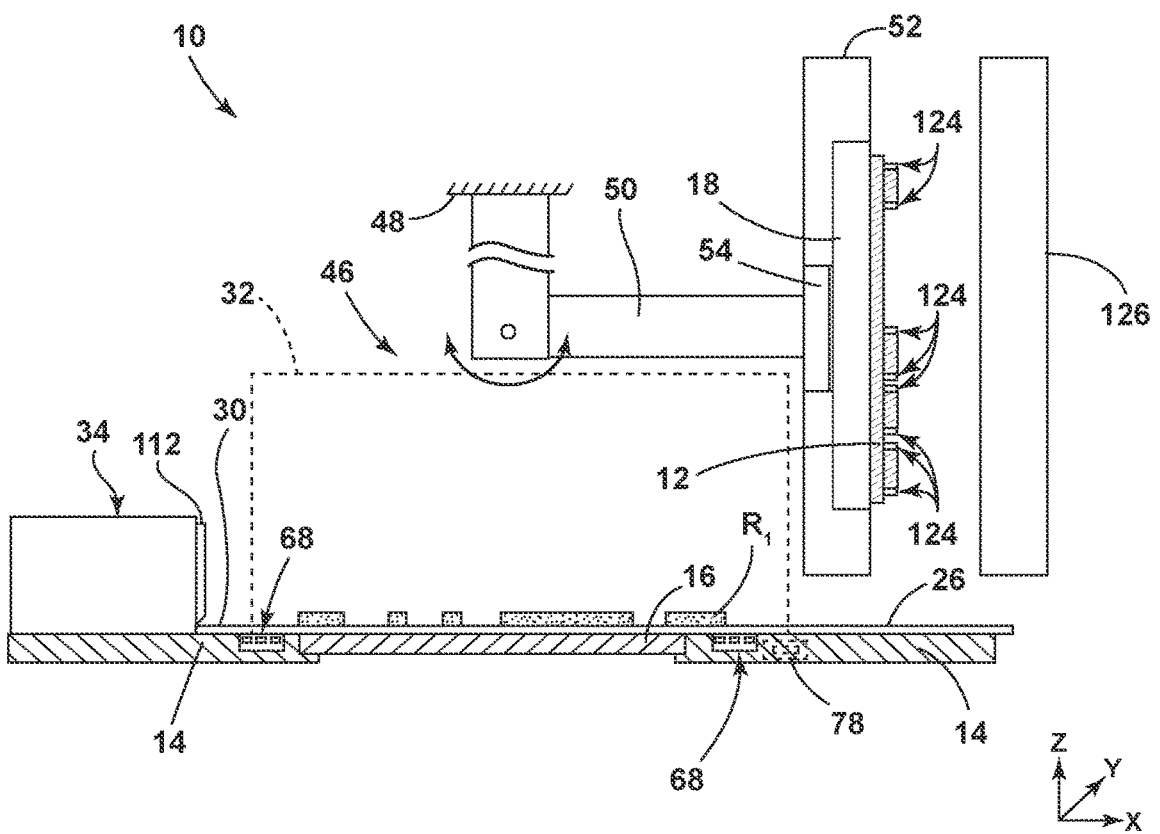

With further reference to FIGS. 30-32, in some instances, the removal operation may include actuating a cleaning assembly 126 to remove at least a portion of the residual resin 124 from the component 12. One such operation is shown in FIG. 30 and schematically illustrated in FIGS. 31 and 32. The removal operation 700 can be used to operate the additive manufacturing apparatus 10 or any other suitable additive manufacturing apparatus. It should be appreciated that the example operation 700 is discussed herein only to describe example aspects of the present subject matter and is not intended to be limiting. Any of the steps within FIG. 30 may be omitted without departing from the scope of the present disclosure. In addition, the removal operation 700 described in FIG. 30 may be combined with any other removal operation 300, 400, 500, 600 described herein. In such instances, the steps of the combined removal operations may be performed in any order or combination without departing from the teachings provided herein.

As shown in FIGS. 30-32, at step 702, the removal operation 400 can include moving the stage 18 from the previous curing position through activation of the actuator assembly 46. As shown in FIG. 31, in some instances, the stage 18 and/or the component 12 may be moved laterally (e.g., the Y-axis direction) relative to the movement direction of the first portion 26A of the resin support 26. Additionally or alternatively, as shown in FIG. 32, the actuator assembly 46 may rotate the stage 18 and/or the component 12 such that the stage 18 and/or the component 12 are positioned in a non-parallel orientation relative to the window 16 and/or the resin support 26.

At step 704, the removal operation 700 can include activating a cleaning assembly 126. In various examples, the cleaning assembly 126 may incorporate a pneumatic assembly 72 that is configured to generate a negative pressure to produce a suction or vacuum proximate to the component 12 such that the negative pressure removes the residual resin 124 from the component 12. The pneumatic assembly 72 may also apply a positive pressure on the component 12 to produce a pushing force on the component 12. The positive pressure may release the residual resin 124 from the component 12. Additionally or alternatively, the cleaning assembly 126 may include a contact device (e.g., a brush) that is configured to contact the component 12. It will be appreciated that the cleaning assembly 126 may include any other feature that may be used to remove at least a portion of the residual resin 124 from the component 12.

As shown in FIG. 30, at step 706, the removal operation can include deactivating the cleaning assembly 126. With at least a portion of the residual resin 124 separated from the component 12 by the cleaning assembly 126, an additional layer of uncured resin R may be moved into the build zone 32 and an additional layer of the component 12 may be formed. Alternatively, with at least a portion of the residual resin 124 removed, the component 12 may be removed from the stage 18. Alternatively still, the removal operation 700 may be performed a second time to further remove any residual resin 124 remaining on the component 12. Alternatively still, additional removal operations may be performed to further remove any residual resin 124 remaining on the component 12.

Figure 33:
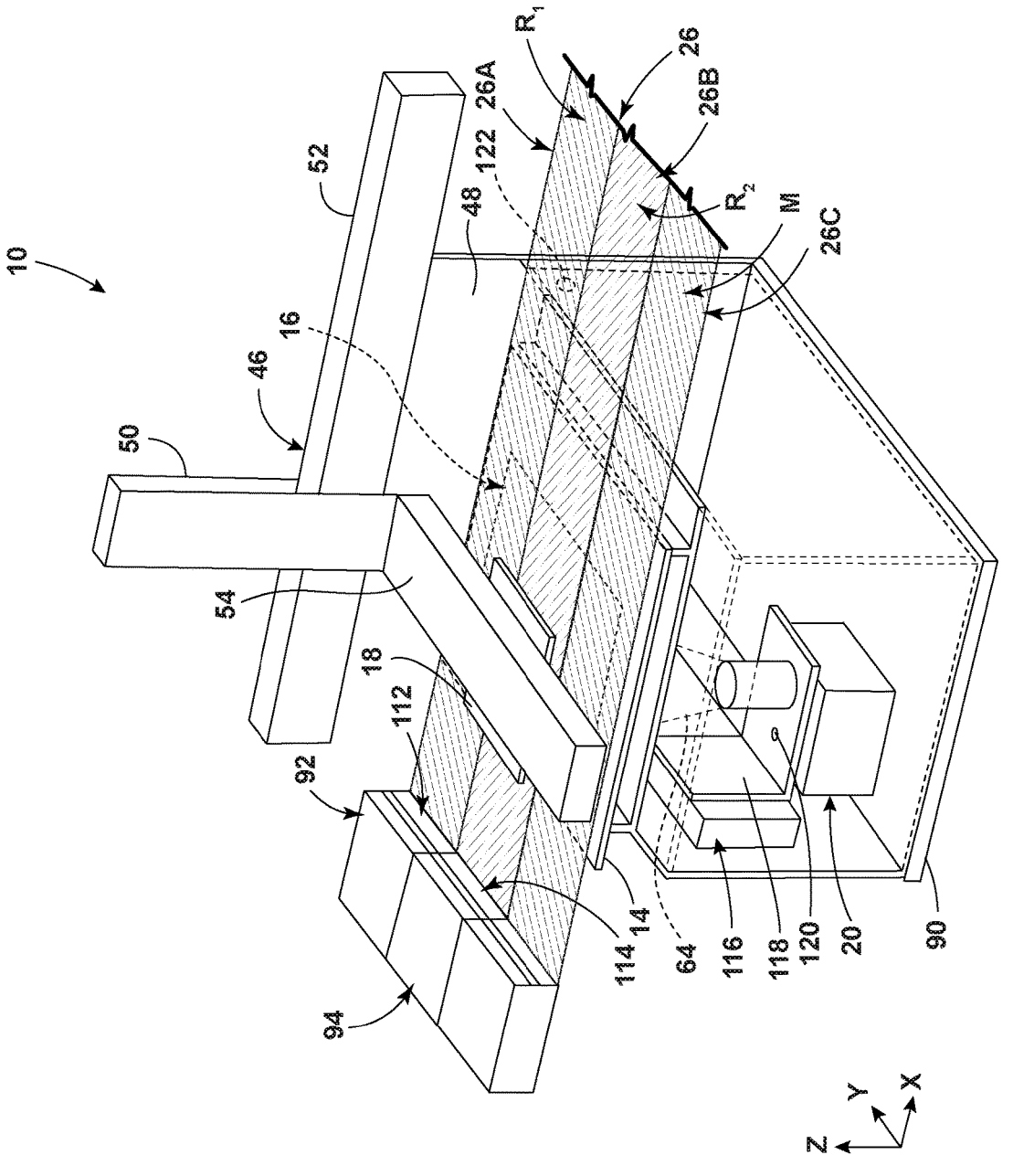
FIG. 33 is a front perspective view of the additive manufacturing apparatus in accordance with various aspects of the present disclosure.
Figure 34:
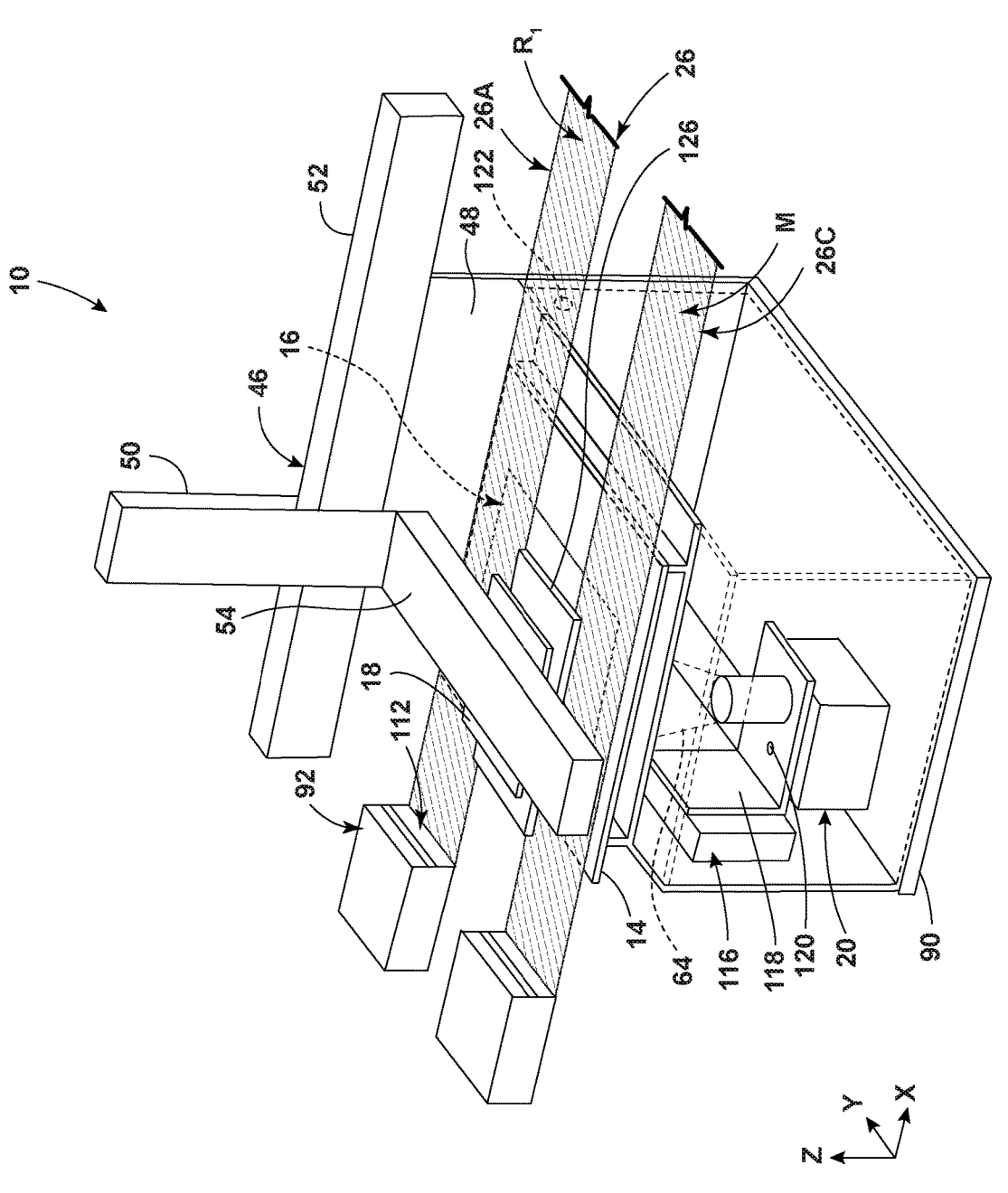
FIG. 34 is a front perspective view of the additive manufacturing apparatus in accordance with various aspects of the present disclosure.

Referring now to FIGS. 33 and 34, the apparatus 10 is exemplarily illustrated including a first material (e.g., a first resin $R_1$) positioned on a first portion 26A of the resin support 26 and a second material (e.g., a second resin $R_2$) positioned on a second portion 26B of the resin support 26. The second portion 26B of the resin support 26 being laterally offset (e.g., in the Y-axis direction) from the first portion 26A of the resin support 26. In addition, the apparatus 10 may also include a third material M (e.g., a third resin) positioned on a third portion 26C of the resin support 26 with the third portion 26C of the resin support 26 being laterally offset (e.g., in the Y-axis direction) from the first portion 26A of the resin support 26 and/or the second portion 26B of the resin support 26. Additionally or alternatively, the apparatus 10 may include a cleaning assembly 126 that is located in an offset position (e.g., in the Y-axis direction) from the first portion 26A of the resin support 26 and the second portion 26B of the resin support 26.

In the embodiments illustrated in FIGS. 33 and 34, any layer of the component 12 may be formed from the first resin $R_1$ on the first portion 26A of the resin support 26 and/or the second resin $R_2$ on the second portion 26B of the resin support 26. As such, the actuator assembly 46 may be configured to alter a position of the stage 18 and/or the component 12 based on the next layer and/or the next portion of the layer of the component 12 to be formed.

Once a layer and/or a portion of a layer is formed, the apparatus 10 may perform one or more removal operations, including each of the removal operations 300, 400, 500, 600, 700 described herein, utilizing either the third material on the third portion 26C of the resin support 26 and/or the cleaning assembly 126.

With further reference to FIG. 33, the third material M may be a resin that is used in the removal operation 300, 400, 500, 600, 700, which may be generally similar or different from the one or more resins (e.g., the first resin $R_1$ and the second resin $R_2$) used to form one or more layers of the component 12. Additionally, third material M may be a resin that is uncured, partially cured (e.g., below gel), cured to gel, and/or cured to beyond gel. Moreover, in some instances, when the third material M is a resin, the resin may be a loaded resin and/or an unloaded resin that is supported by the resin support 26. In some examples, the resin can be viscous and/or tacky. Therefore, the residual resin 124 may preferentially stick to the third material M rather than to the component 12. In various examples, a light penetration into a loaded resin can be less than in an unloaded resin. Thus, for a thicker cross section, the component 12 may be built in thin layers but could be cleaned through one or more removal operations 300, 400, 500, 600, 700 in thicker layers. Or, the thickness of the resin (e.g., the second resin $R_2$) utilized during the removal operations 300, 400, 500, 600, 700 can be thinner so there is less chance that the cleaning resin (e.g., the second resin $R_2$) will cure on to the component 12.

With further reference to FIG. 34, as provided herein, the cleaning assembly 126 may incorporate a pneumatic assembly 72 that is configured to generate a negative pressure to produce a suction or vacuum proximate to the component 12 such that the negative pressure removes the residual resin 124 from the component 12. The pneumatic assembly 72 may also apply a positive pressure on the component 12 to produce a pushing force on the component 12. The positive pressure may release the residual resin 124 from the component 12. Additionally or alternatively, the cleaning assembly 126 may include a contact device (e.g., a brush) that is configured to contact the component 12. It will be appreciated that the cleaning assembly 126 may include any other feature that may be used to remove at least a portion of the residual resin 124 from the component 12.

Figure 35:
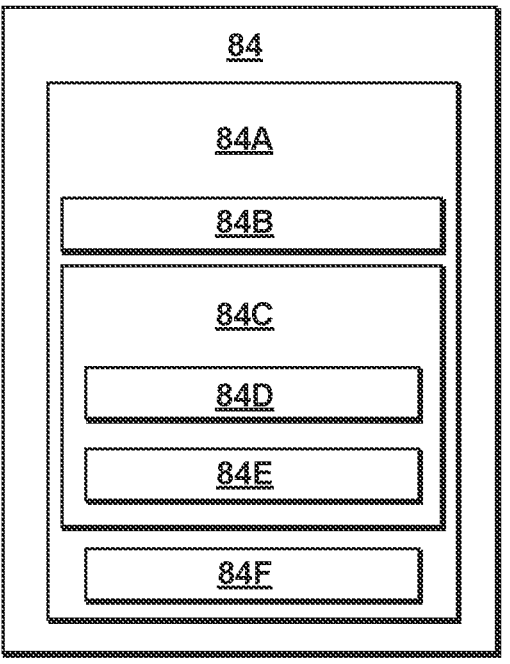
FIG. 35 depicts an exemplary computing system for an additive manufacturing apparatus in accordance with various aspects of the present disclosure.

FIG. 35 depicts certain components of a computing system 84 according to example embodiments of the present disclosure. The computing system 84 can include one or more computing device(s) 84A which may be used to implement the methods 200 and processes such as described herein. The computing device(s) 84A can include one or more processor(s) 84B and one or more memory device(s) 84C. The one or more processor(s) 84B can include any suitable processing device, such as a microprocessor, micro-controller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 84C can include one or more non-transitory computer-readable storage medium(s), such as RAM, ROM, EEPROM, EPROM, flash memory devices, magnetic disks, etc., and/or combinations thereof.

The memory device(s) 84C can include one or more computer-readable media and can store information accessible by the one or more processor(s) 84B, including instructions 84D that can be executed by the one or more processor(s) 84B. The instructions 84D may include one or more steps of the methods 200 and operations 300, 400, 500, 600, 700 described above, such as to execute operations at the additive manufacturing apparatus 10 described herein. The memory device(s) 84C can store instructions 84D for running one or more software applications, displaying a user interface, receiving user input, processing user input, etc. In some implementations, the instructions 84D can be executed by the one or more processor(s) 84B to cause the one or more processor(s) 84B to perform operations, e.g., such as one or more portions of the methods 200 and processes described herein. The instructions 84D can be software written in any suitable programming language or can be implemented in hardware. Additionally, and/or alternatively, the instructions 84D can be executed in logically and/or virtually separate threads on the processor(s) 84B.

The one or more memory device(s) 84C can also store data 84E that can be retrieved, manipulated, created, or stored by the one or more processor(s) 84B. The data 84E can include, for instance, data to facilitate the performance of the methods 200 and operations 300, 400, 500, 600, 700 described herein. The data 84E can be stored in one or more database(s). The one or more database(s) can be connected to computing system 84 by a high bandwidth LAN or WAN, or can also be connected to the computing system 84 through the network(s). The one or more database(s) can be split up so that they are located in multiple locales. In some implementations, the data 84E can be received from another device.

The computing device(s) 84A can also include a communication module or interface 84F used to communicate with one or more other component(s) of the computing system 84 or the additive manufacturing apparatus 10 over the network(s). The communication interface 84F can include any suitable components for interfacing with one or more network(s), including, for example, transmitters, receivers, ports, controllers, antennas, or other suitable components.

It should be appreciated that the additive manufacturing apparatus is described herein only for the purpose of explaining aspects of the present subject matter. In other example embodiments, the additive manufacturing apparatus may have any other suitable configuration and may use any other suitable additive manufacturing technology. Further, the additive manufacturing apparatus and processes or methods 200 and processes described herein may be used for forming components using any suitable material. For example, the material may be plastic, metal, concrete, ceramic, polymer, epoxy, photopolymer resin, or any other suitable material that may be embodied in a layer of slurry, resin, or any other suitable form of sheet material having any suitable consistency, viscosity, or material properties. For example, according to various embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein and may be generally referred to as "additive materials."

Further aspects are provided by the subject matter of the following clauses:

An additive manufacturing apparatus comprising: a support plate including a window; a stage configured to hold one or more cured layers of a resin to form a component, wherein each cured layer is formed with the stage in a respective curing position; a radiant energy device positioned on an opposite side of the support plate from the stage and operable to generate and project radiant energy in a patterned image through the window; and an actuator operably coupled with the stage and configured to move the stage between a curing position and a removal position, wherein the curing position is offset from the removal position.

The additive manufacturing apparatus of one or more of these clauses, wherein the stage is placed in the removal position during a removal operation, and wherein the removal operation is configured to remove at least a portion of residual resin coupled with the component.

The additive manufacturing apparatus of one or more of these clauses, further comprising: a resin support configured to support a resin; and a drive assembly configured to move the resin support in an X-axis direction.

The additive manufacturing apparatus of one or more of these clauses, wherein the removal position is laterally offset from the curing position in a Y-axis direction.

The additive manufacturing apparatus of one or more of these clauses, wherein the stage is parallel to the window in the curing position and non-parallel in the removal position.

The additive manufacturing apparatus of one or more of these clauses, further comprising: a material depositor configured to deposit a first resin on a portion of a resin support and a second resin on a second portion of the resin support, wherein the second portion of the resin support is at least partially laterally offset from the first portion of the resin support in a Y-axis direction.

The additive manufacturing apparatus of one or more of these clauses, wherein the first portion of the resin is a first thickness and the second portion of resin is a second thickness, and wherein the first thickness is different than the second thickness.

The additive manufacturing apparatus of one or more of these clauses, wherein the radiant energy device is configured to at least partially cure a portion of the second resin on the resin support with the component separated from the second resin.

The additive manufacturing apparatus of one or more of these clauses, further comprising: a cleaning assembly configured to remove at least a portion of residual resin from the component when the stage is in the removal position.

A method of operating an additive manufacturing apparatus, the method comprising: placing a stage in a first curing position such that a working surface contacts a resin; curing a portion of a first resin while the stage is in the first curing position to form a layer of a component, the portion of the first resin at least partially coupled to the working surface; separating the component from a resin support; and moving the component to a removal position that is offset from the curing position.

The method of one or more of these clauses, further comprising: conducting a removal operation to separate a residual resin from the component.

The method of one or more of these clauses, wherein the stage is a first distance from the resin support when positioned in the curing position and a second distance from the resin support when positioned in the removal position, and wherein the first distance is larger than the second distance.

The method of one or more of these clauses, further comprising: actuating a cleaning assembly during the removal operation.

The method of one or more of these clauses, wherein the removal operation further comprises: at least partially curing a portion of a second layer of resin with the working surface of the component in the removal position.

The method of one or more of these clauses, further comprising: separating the component from the second layer of the resin with at least a portion of the resin being retained by the second layer of the resin on the resin support.

The method of one or more of these clauses, wherein the removal operation further comprises: at least partially curing a first portion of the second layer of resin while the component is separated from the resin.

The method of one or more of these clauses, further comprising: at least partially curing a second portion of the second layer of the resin while the stage is in the removal position.

An additive manufacturing apparatus comprising: a resin support including a first portion configured to support a resin; a support plate including a window; a stage configured to hold one or more cured layers of the resin to form a component, wherein each cured layer is formed with the stage in a respective cure position; a radiant energy device positioned on an opposite side of the resin support from the stage and operable to generate and project radiant energy in a patterned image through the window; and a cleaning assembly positioned in an offset location from the first portion of the resin support.

The additive manufacturing apparatus of one or more of these clauses, further comprising: an actuator operably coupled with the stage and configured to move the stage between a curing position and a removal position.

The additive manufacturing apparatus of one or more of these clauses, wherein the stage is non-parallel to the resin support when in the removal position.

This written description uses examples to disclose the present disclosure, including the best mode, and also to enable any person skilled in the art to practice the disclosure, including making and using any devices or systems and performing any incorporated methods and operations. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing apparatus comprising:
   a resin support configured to support a resin;
   a drive assembly configured to move the resin support in an X-axis direction, which X-axis direction refers to a machine direction along a length of the resin support;
   a support plate including a window;
   a stage configured to hold one or more cured layers of the resin to form a component, wherein each cured layer is formed with the stage in a respective curing position;
   a radiant energy device positioned on an opposite side of the support plate from the stage and operable to generate and project radiant energy in a patterned image through the window; and
   an actuator assembly operably coupled with the stage and configured to move the stage independently of the radiant energy device between a curing position and a removal position, wherein the curing position is offset from the removal position in the X-axis direction, wherein the removal position is at least partially outside of a build zone of the additive manufacturing apparatus, wherein the actuator assembly comprises a first actuator for moving the stage along a Z-axis direction, a second actuator for moving the stage in the X-axis direction, and a third actuator for moving the stage in a Y-axis direction, wherein the Y-axis direction is generally perpendicular to the machine direction.

2. The additive manufacturing apparatus of claim 1, wherein the stage is placed in the removal position during a removal operation, and wherein the removal operation is configured to remove at least a portion of residual resin coupled with the component.

3. The additive manufacturing apparatus of claim 1, wherein the removal position is laterally offset from the curing position in the Y-axis direction.

4. The additive manufacturing apparatus of claim 1, wherein the stage is parallel to the window in the curing position and non-parallel in the removal position.

5. The additive manufacturing apparatus of claim 1, further comprising:

a material depositor configured to deposit a first resin on a first portion of the resin support and a second resin on a second portion of the resin support, wherein the second portion of the resin support is at least partially laterally offset from the first portion of the resin support in the Y-axis direction.

6. The additive manufacturing apparatus of claim 5, wherein the first portion of the resin is a first thickness and the second portion of resin is a second thickness, and wherein the first thickness is different than the second thickness.

7. The additive manufacturing apparatus of claim 5, wherein the radiant energy device is configured to at least partially cure a portion of the second resin on the resin support with the component separated from the second resin.

8. The additive manufacturing apparatus of claim 1, further comprising:

a cleaning assembly configured to remove at least a portion of residual resin from the component when the stage is in the removal position.

9. A method of operating an additive manufacturing apparatus, the method comprising:

placing a stage in a first curing position such that a working surface contacts a resin;

curing a portion of a first resin while the stage is in the first curing position to form a layer of a component, the portion of the first resin at least partially coupled to the working surface;

separating the component from a resin support; and moving the component independently of a radiant energy device to a removal position that is offset from the first curing position via an actuator assembly operably coupled with the stage, wherein:

the removal position is at least partially outside of a build zone of the additive manufacturing apparatus; and the actuator assembly comprises a first actuator for moving the stage along a Z-axis direction, a second actuator for moving the stage in an X-axis direction, and a third actuator for moving the stage in a Y-axis direction, wherein the Y-axis direction is generally perpendicular to the X-axis direction.

10. The method of claim 9, further comprising:

conducting a removal operation to separate a residual resin from the component.

11. The method of claim 10, wherein the stage is a first distance from the resin support when positioned in the first curing position and a second distance from the resin support when positioned in the removal position, and wherein the first distance is larger than the second distance.

12. The method of claim 9, further comprising:

actuating a cleaning assembly during a removal operation.

13. The method of claim 10, wherein the removal operation further comprises:

at least partially curing a portion of a second layer of resin with the working surface of the component in the removal position.

14. The method of claim 13, further comprising:

separating the component from the second layer of the resin with at least a portion of the resin being retained by the second layer of the resin on the resin support.

15. The method of claim 13, wherein the removal operation further comprises:

at least partially curing a first portion of the second layer of resin while the component is separated from the resin.

16. The method of claim 15, further comprising:

at least partially curing a second portion of the second layer of the resin while the stage is in the removal position.

17. An additive manufacturing apparatus comprising:

a resin support including a first portion configured to support a resin;

a support plate including a window;

a stage configured to hold one or more cured layers of the resin to form a component, wherein each cured layer is formed with the stage in a respective cure position;

a radiant energy device positioned on an opposite side of the resin support from the stage and operable to generate and project radiant energy in a patterned image through the window;

a cleaning assembly positioned in an offset location from the first portion of the resin support; and an actuator assembly operably coupled with the stage and configured to move the stage independently of the radiant energy device between a curing position and a removal position, wherein the actuator assembly comprises a first actuator for moving the stage along a Z-axis direction, a second actuator for moving the stage in an X-axis direction, and a third actuator for moving the stage in a Y-axis direction, wherein the Y-axis direction is generally perpendicular to the X-axis direction.

18. The additive manufacturing apparatus of claim 17, wherein the stage is non-parallel to the resin support when in the removal position.

* * * * *